United States Patent
Kashani

(10) Patent No.: US 7,032,115 B2
(45) Date of Patent: Apr. 18, 2006

(54) INFORMATION PROCESSING APPARATUS AND METHOD

(76) Inventor: Mehdi Kashani, Playas del Duque, Apartmento B406, Casas Cadiz, 29660 Nueva Andalucia, Malaga (ES)

(*) Notice: Subject to any disclaimer, the term of this patent is extended or adjusted under 35 U.S.C. 154(b) by 956 days.

(21) Appl. No.: 09/905,285

(22) Filed: Jul. 13, 2001

(65) Prior Publication Data

US 2002/0032875 A1    Mar. 14, 2002

Related U.S. Application Data

(63) Continuation-in-part of application No. 09/734,340, filed on Dec. 11, 2000, now abandoned.

(60) Provisional application No. 60/221,615, filed on Jul. 28, 2000.

(51) Int. Cl.
*G06F 15/63* (2006.01)

(52) U.S. Cl. ................................. 713/300; 395/161
(58) Field of Classification Search ................ 707/1, 707/3, 6, 315, 347; 713/300, 200; 395/161; 709/204

See application file for complete search history.

(56) References Cited

U.S. PATENT DOCUMENTS 6,002,850 A * 12/1999 Sumino et al. ............. 719/315
6,438,545 B1 * 8/2002 Beauregard et al. ........... 707/6
6,760,748 B1 * 7/2004 Hakim ....................... 709/204

OTHER PUBLICATIONS

EAGER: Programming Repetitive Tasks by Example, Allen Cypher, in Proceedings of CHI'1, New Orleans, Apr. 28-May 2, ACM, NewYork, 1991, pp. 33-39.*

* cited by examiner

*Primary Examiner*—Gregory A Morse
*Assistant Examiner*—Ellen C Tran
(74) *Attorney, Agent, or Firm*—William B. Ritchie

(57) ABSTRACT

An information processing apparatus and method consisting of the modules 1) peripheral control including power management resulting in increased battery life where a plurality of peripherals use a single power source to eliminate external power supplies, 2) universal conversion, an extensible system for taking any information as input and converting to any desired feasible output, 3) virtual user production, which creates a digital representation of a user through constant recording and analysis of completed work, which is disintegrated and stored in lists comprising tasks and related options. A list captures and represents the user's preferences. Dynamic and evolving lists define a virtual user capable of repeating any previously recorded task. A corresponding Web based communication provider automatically feeds additional tasks and options to the invention, which can grow substantially unassisted by the user.

13 Claims, 25 Drawing Sheets

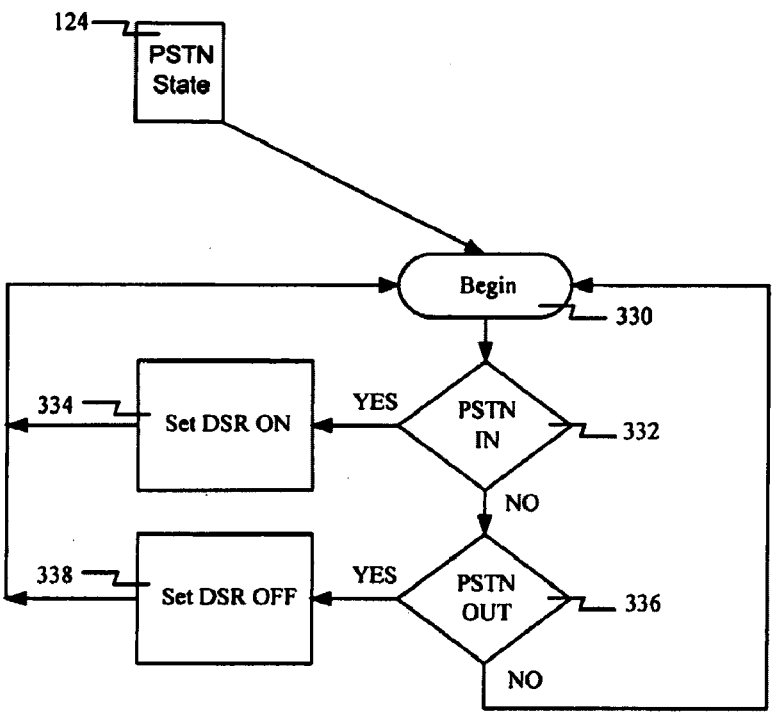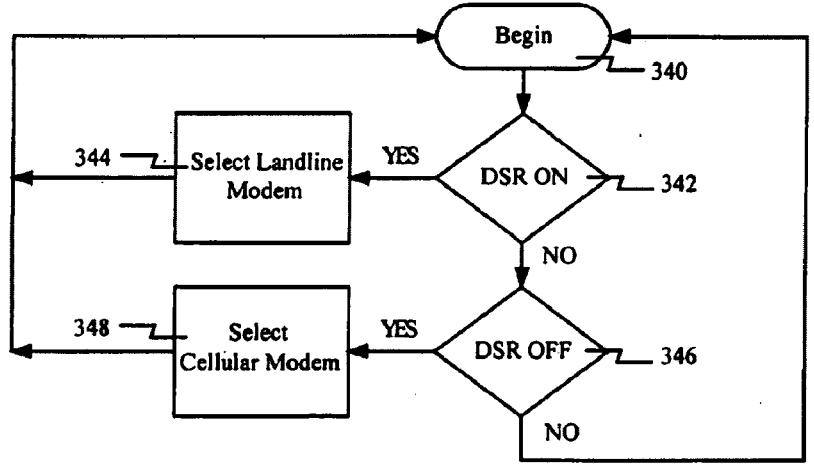
Fig. 5

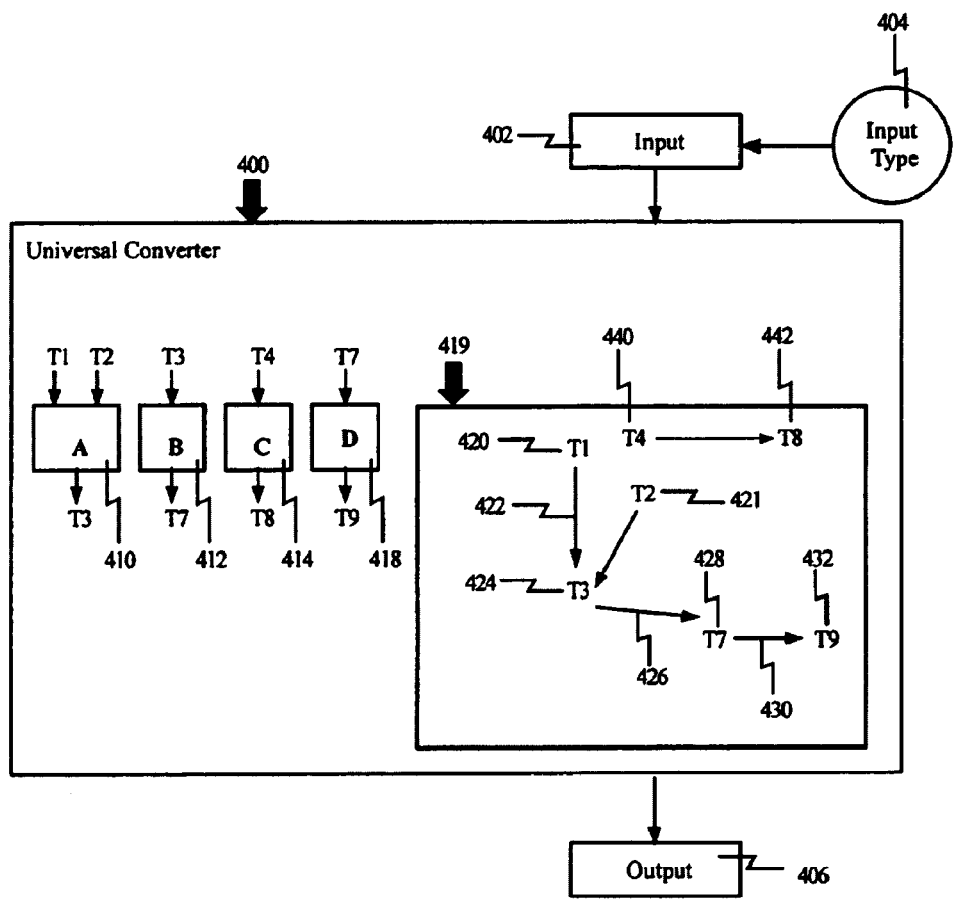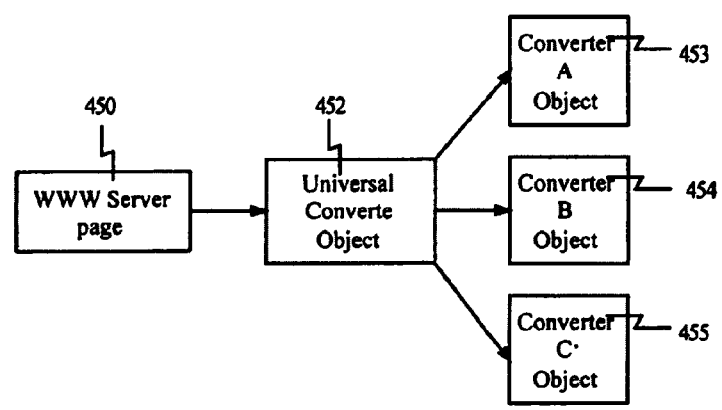
Fig. 11

INFORMATION PROCESSING APPARATUS AND METHOD

The present application is a continuation in part of parent application Ser. No. 09/734,340 which was filed on Dec. 11, 2000, now abandoned and claims benefit of provisional application 60/221,615 filed Jul. 28, 2000. The parent application was pending at the time of filing of the present continuation in part application.

BACKGROUND OF THE INVENTION

1. Field of the Invention

The present invention generally relates to a computer system that facilitates the completion of work through the creation and reuse of an evolving set of frequently used tasks. The invention permits sharing the tasks, representing captured knowledge, with a plurality of other users. To increase the invention's awareness of the user's actions, a universal conversion module and a peripheral control module are provided to communicate the user's selection of various input output options.

2. Description of the Prior Art

For many years mobile users have had to suffer the hardship of carrying excessively heavy baggage "loaded to the nines" with so called "portable" peripherals. These peripherals, while being portable collectively, still represent an uncomfortable weight. A significant proportion of the weight in any such peripheral is generally represented by power supply, either in the form of batteries or power supply adapters.

For those traveling on an international level, this burden is increased by the need to carry additional converters, which alter the power connector format of peripherals to match that of the domestic power supply of the country being visited. A European user traveling in Europe and certain other parts of the world has little extra burden. But one switching from the United States to Europe has a significant problem, namely how to supply devices which require 110VAC from a power supply equipped to feed 220VAC–240VAC. This typically means carrying additional step-down transformers in the guise of power converters.

Users that require portability often times do not require operation away from an electrical outlet. For example, business users simply move their laptop from the office to home and back again on a regular basis. However, the time involved in packing up all the power supplies and interconnecting cables often means that the whole thing is simply not worth the hassle, other than in extreme cases. As a result, the user will potentially carry the laptop home and leave the rest behind, reducing available functionality when reaching home.

When users are away from an electrical outlet, they often need the use of their portable computer, powered by batteries, for short periods of time. However, at those times, when the system is needed to operate away from the main power supply, typical peripherals such as printers, scanners, etc., even though such are designed to be easily transported, still require an electrical attachment to an outlet. At best, one or two peripherals have their own rechargeable batteries, but they again are a source of weight burden to the user.

What has not been addressed is the potential for utilizing the power supply, which can be furnished by the laptop computer itself. This can take two forms, firstly modern laptop computers are accompanied by a universal power supply, typically able to function from 90VAC to 250VAC, and secondly they are equipped with batteries that have an ever increasing life away from an electrical outlet.

There are not too many difficulties to overcome when drawing power from the universal power supply of a laptop computer, as the user is not really troubled by switching everything on when the laptop is switched on, and anyway everything would be switched off when the laptop power supply was disconnected from the electrical outlet. The real problems are encountered when trying to integrate the power supply requirements of all the connected peripherals such that they can all be powered from the laptop battery. Due to the light use of these peripherals, battery life would not be significantly affected, as long as the user remembered to constantly switch things off when they are no longer in use.

Many devices consists of power saving features by entering a standby mode, but several targeted at the laptop market appear to lack this functionality, and even in standby mode each peripheral still draws power so collectively the peripherals in standby still consume a proportion of battery capacity. Again, the only option for the user is to keep switching things on and off as their work flow progresses.

Power saving features seem to be focused at too large or too small a scale for the laptop user to benefit. For example, peripherals including monitors and printers typically have a standby mode which yields significant savings, and laptop devices consists of options for switching off specific chips, reducing the speed of the processor, e.g. INTEL SPEEDSTEP, but again these do not extend to manage external devices which are all potentially serviced from a single battery source.

U.S. Pat. No. 5,905,900, issued to Combs et al. on May 18, 1999, discloses a mobile client computer and power management architecture. This reference discloses an energy management control program having a plurality of cooperating components permitting a designer to choose from among a plurality of foci for energy management.

U.S. Pat. No. 5,796,982, issued to Iwami on Aug. 18, 1998, discloses a switching regulator, information processing apparatus and a control method for same. The switching regulator is controlled by a feedback voltage, which is selected to be of minimum value from amongst the various power lines present. Although this invention succeeds in minimizing output voltage based on a minimum required voltage from a plurality of feedback voltages, this invention fails to completely shut off voltage from a peripheral computer module not presently in use.

Another area of frustration for mobile users is communication and again some of these frustrations emanate from a lack of close integration. A modem which is completely self-contained in terms of having cellular capabilities (the same as a mobile phone) and land line capabilities such as any traditional modem for use by an IBM COMPATIBLE PC is not found in the prior art. Of course, many laptop modems have optional kits which permit connecting the laptop modem to the user's mobile phone, but then this restricts use of the phone to the task of laptop communication, and moreover the constant connection and disconnection of data cables.

Even if such connection problems are dismissed, when a user wishes to utilize a cellular modem, when typically the landline modem is the default for Web connections, the user must, with extreme care, manipulate system settings in order to instruct the laptop to utilize a cellular modem. When use of the cellular modem has ceased, then the settings must once again be manipulated to bring the landline modem back into operation. Prior art has not addressed the need of the user with respect to automatically switching between landline and cellular communication while simultaneously adjusting system settings to correspond with available communication methods.

A final source of difficulty is the lack of close integration of voice audio features when multiple modems are in use. This feature is supported by a surprisingly small number of modems. The difficulty here is the diverse range of audio levels encountered when switching from one modem to another, causing the user to constantly alter software volume controls.

Interference problems arise when a cellular modem, such as the SIEMENS M20T, is integrated with an audio device and both share a common power supply. For example, if the modem was connected with an in-car audio system, to facilitate integration between the voice-communication features of the modem and the audio inputs/outputs of the in-car audio system, due to the fact that both devices share a common power supply (namely the car battery), interference is known to travel along power connections shared by the two devices. Annoying interference bleeds from the cellular modem and manifests itself on the audio output of the device to which it is connected, thus audio quality and intelligibility are grossly affected.

The general trend in consumer electronics today is toward the integration of communicating and computing facilities into a single unit. Examples are laptops wirelessly connected to remote hosts (e.g. PDA/PC at home), personal communicators that combine a phone, an organizer, and many more functions into a single electronic device, etc. This integration of wireless communications and computing raises potential problems with Electromagnetic Interference (EMI) and Electromagnetic Compatibility (EMC).

During wireless transmission, radiation from a transceiver interferes with the processors and other electronics in the computing section of the device. This is especially the case for high instantaneous power, discontinuous transmission as found in time division multiple access (TDMA) communications (e.g., GSM, D-AMPS, DECT). Transmission takes place in a burst format with short, but repetitive bursts with high energy levels. Cross-talk between the transceiver and the computing electronics will likely disturb the signal levels in the digital electronics, giving rise to errors in the computing process. Other access methods that use continuous transmission (FDMA, or CDMA) can use lower instantaneous power levels, which are less likely to interfere with the computing electronics.

During wireless reception, the transceiver is opened to receive the burst from the antenna. However, now any electromagnetic radiation from the computing electronics can disturb the reception. This is especially a problem in high-speed, digital electronics, where steep edges and spikes at the signal level transitions can produce considerable radiation. With the ever-increasing clock frequencies of digital electronics, radiation from the computing electronics to the receiving unit will become more and more of a problem, irrespective of the kind of access method used (TDMA, FDMA, CDMA, etc.).

If future integrated communications/computing devices continue to use TDMA wireless cellular communications now implemented worldwide, then an efficient means of suppressing the mutual interference between transceiver and computing electronics must be found.

One attempt to reduce such interference is disclosed in U.S. Pat. No. 5,842,037, issued to Haartsen on Nov. 24, 1998. This invention provides for an interference reduction in TDMA-communications/computing devices. First, an interrupt signal is sent from a transceiver to a computing device when the transceiver is about to transmit or receive information. In response to the interrupt signal, the computing device stacks current status and enters an interrupt routine; the computing device is then released from the interrupt routine after the information has been transmitted or received. Although this invention works to reduce the interference, because there is only an interrupt signal and not a complete isolation of the TDMA ground return from the Computer system ground return, an elimination of audio interference is not accomplished. Therefore, there exists a desire in the art for a novel circuit construct to reduce the effect of this unwanted noise by isolating the TDMA (e.g. GSM) ground return from the Computer system ground return.

In order to significantly ease the life of laptop users particularly when traveling, a single unified device is needed that integrates the power supply requirements of peripherals and improves the integration of cellular and landline communication while harmonizing audio features of integrated modems. This method is not presently found in the prior art.

System interoperability and data compatibility have long been an issue in the field of Information Technology. To answer this problem, utility vendors have produced devices that can translate information output from one program and change it into a form compatible with another, where the program may be a graphics system or word-processor and the like. However, these conversions are restricted in the number of types of output they can provide, basically because they were devised with a single purpose in mind, for example, to take a document from one word-processor and re-write it so it is compatible with another word processor, e.g. convert a WORD-PERFECT document so it can be loaded by MICROSOFT WORD.

When this software was developed, it was not envisaged to have the potential to be made part of a larger network of converters. Therefore, it is not easy for a user to take a document and pass it through successive conversion processes. In order to do this, a user typically has to load information into one device and execute the conversion process, then load the information into the next device and so on, until the final product is reached. This is beyond the capability of all but the most expert users.

During the 1990's, the emergence of the Web as a means of exchanging information has given rise to an explosion of data availability. This information is expressed in an immensely diverse manner. Due to the nature of the Web, little has been done to introduce standards, which are widely adopted by information authors, other than HTML.

Technologies and standards such as XML provide a means of transmitting information where the information contains a description of the format of its content. Day-to-day web explorers will seldom come into face-to-face contact with information in this form, as it is generally used as a means of providing interoperability between web based systems.

A more widely understood method of transmitting information using an easily recognizable format is to add a file extension to the end of the filename. For example, a document called "Sales Report" will typically have an extension of "DOC" giving a total filename of "SalesReport.DOC". Many users seeing this filename will immediately assume it is a MICROSOFT WORD document, if they are using the WINDOWS operating system, but other users of systems such as APPLE MAC would naturally assume that the information was formatted for their use.

For these reasons, confusion occurs so the ever increasing need for users to exchange information on a corporate as well as global scale lacks truly universal support.

Some current art is designed to integrate with other devices, the most common example being a speech recognition package, such as DRAGON NATURALLY SPEAKING integrating with MICROSOFT WORD for the purpose of allowing a user to dictate documents. However, the close integration of such devices is rare and examples of voice driven systems are currently rare, in terms of day-to-day use by a reasonable number of users. However, such devices are ideal input methods, which enable a user to collect information. What is needed is a means of forwarding the collected information to other devices, which can usefully manipulate the information. This, again, causes us to return to the core problem of compatibility and the user needing to know how to render the information compatible with other devices.

One surprising example, described in further detail during the detailed discussion of the related drawings, is a particular web service that can translate text in English to either Spanish or French, but may lack the ability to translate from Spanish to French and vice versa. The use of an inter-lingua, such as English, is known. However, the quality of multi-step translations executed in this manner while far from perfect, are still perfectly understandable.

One only has to examine the work of the JPEG group, which provided a method of compressing photographic images, to see that an over zealous compression, while eliminating much of the source information, can still render an image that is easily recognizable, even though the size of the resultant data file containing the image has been significantly reduced. Similarly, AUDIO CODECS, which can provide a means of compressing and decompressing audio information, can speed up the transmission of audio signals by reducing quality. Again, the point here is that the information when received is still intelligible by its human recipient. Therefore, translations, conversions and the like which employ "lossy compression" are easily paralleled with multi-step conversion processes where some sensibility is lost, but the usefulness to the user remains substantially unaffected.

While a static language inter-lingua is known, a dynamic universal "inter-lingua" that permits conversion from a spoken Italian message to an ADOBE ACROBAT English message involving many steps and various "inter-lingua" intermediaries yet requiring only a one initial step by the user is not known in the prior art.

The theory of self-actualization hypothesizes that a human's normal behavior is to satisfy the basic needs of food and shelter first, and then to move on to satisfy more complicated needs. As soon as complicated needs are fully satisfied, a human can then move to a state of self-actualization, which is to become all that a human is capable of being. Self-actualization is a difficult process. In fact, most humans never reach self-actualization, in part, because of their inability to utilize the entire capacity of the brain coupled with the demands of fulfilling basic needs first.

A machine that can assist a human toward self-actualization is not known in the prior art. However, if a computer could learn the user's procedures utilized to satisfy basic need, and assist in that need directed process through enhancement of the senses and intellect, the computer would increase the speed at which the user could grow and self-actualize.

Thus, by definition such a computer would self-administer to the user. By functioning essentially as the user's virtual representative, a digital stand-in, the computer is the user's alter ego . . . keeping track of and performing the user's tasks whether simple or complex, either with or without the direct involvement of the user.

Thus, a symbiotic relationship is created. The virtual representative learns from the user through analysis of daily tasks, which are constantly recorded and analyzed, such that the procedures selected by the user to fulfill basic needs become evident. In this way, the user and the virtual together, would be able to accomplish a substantial increase in the number and complexity of tasks per day that otherwise could not be accomplished with the user's unassisted abilities and time constraints.

The abilities of the virtual would grow with the user. As the user grows and becomes more experienced, so would the virtual. Additionally, if the virtual is able to find more efficient methods for the completion of tasks, the move towards self-actualization would thus be accelerated.

Typically, 80% of a user's work is accomplished through repeated use of only 20% of their software's available features. This is commonly referred to as Pareto's Rule, with the 20% commonly referred to as the "vital few".

The current state of the art has attempted to a much lesser degree to fulfill a user's need for fast and efficient access to frequently used procedures. However, the prior art incorrectly attempts to solve this problem by creating macros, icons, unfamiliar gesture systems, scripting languages and the like.

One attempt to correct this problem is disclosed in U.S. Pat. No. 5,805,167, issued to von Cruyningen on Sep. 8, 1998. This patent discloses a popup menu with directional gestures. Using this invention's capabilities, the computer operator can design menus containing most frequently used commands and use these menus with existing applications without revising the applications. Thus, menus with many items are managed by scrolling or by progressive disclosure of the menu items. Although this invention allows for user-specific menu options, the inherent problem still exists; the user must design these menus using their "vital few". Where the user will only be able to create these custom menus using their "vital few", the remaining 80% of the software's capabilities, including those capabilities that may dramatically increase the user's efficiency, will be unknown to the user.

U.S. Pat. No. 5,974,413, issued to Beauregard on Oct. 26, 1999, discloses a semantic user interface, wherein a user is allowed to enter "commands" in his/her everyday natural language in order to control the operations of the computer. All commands are language-based and user-defined. These commands can be entered from any context of the user's computer (any application or operating system workspace). The commands allow a user to launch applications and navigate within applications by using language rather than clicks from a pointing device such as a mouse. It also allows the replacement of keystrokes with stored words or keystrokes. The system also keeps a complete archival record of all the text content the user provides as input, regardless of which application program or operating system window the user is operating in at the time. The combined set of all user defined commands and the memory of all the input text that is stored in the archive constitutes the personality profile and is transportable from one computer to another. However, as the personality profile is unique to each user, it is not a standardized form capable of transferring expertise across an international group of users utilizing disparate software packages.

Technicians have for many years sought artificial intelligence, which is without doubt the "Holy Grail" of the field of information technology. Artificial intelligence generally attempts to deliver a method of building a system that "thinks".

Automation is shown in many forms of prior art. The most popular of these, in modern software, is referred to as a macro. The user identifies in advance that a particular sequence of keystrokes, mouse clicks and the like, are likely to be frequently executed. The user then indicates to the system in use that macro recording is to begin, and after the sequence of keystrokes and other inputs is complete indicates that recording is to end. If a keystroke is omitted the user has little choice but to begin the recording process all over again, hopefully not making any mistakes on the next attempt.

This form of macro is inflexible, and is merely a "parrot style" system of repeating input to a system. There is often no flexibility to apply a macro in combination with other macros or with other forms of input, or even to vary the use of the macro in any sense. The next problem arises when users try to remember how to trigger macros. Often they are assigned to obscure combinations of key presses, such as CTRL-C and CTRL-V, system defined macros which copy and paste items. There are no set rules or even many recommendations as to how macros should be organized on one's keyboard.

Predefined macros such as CTRL-C and CTRL-V, as described above, often contain many strange and disturbing inconsistencies, which frustrate the novice user. For example, MICROSOFT WORD has a predefined macro for centralizing text by pressing CTRL-E, but this same combination does not centralize text in MICROSOFT EXCEL, rather when CTRL-E is pressed in MICROSOFT EXCEL an uninformative bleep is emitted by the software. So, inconsistent organization and application of macros is evident in current art.

Systems have also been suggested and devised which are operable by instructions issued in plain English, not very helpful for speakers of other languages. However, this is still a move in the right direction, i.e. closer to the domain of the user and away from the domain of computer jargon and confusing screen layouts.

Customizable screens are now the mode in all modern software comprising toolbars, yet another task that the user has to do before a personalized and ergonomic system becomes available. The most frustrating aspect of toolbar customizations is that they are not carried from application to application. Again, MICROSOFT WORD carries many toolbars that the user can fine tune, or the user can even create empty toolbars and arrange commonly used tools one by one to appear on them. However, when moving to other MICROSOFT programs the same toolbar cannot be employed, despite the fact that many identical buttons exist in related programs. The user has to repeat the steps of customization all over again, in the case of every application in use, a task, which most users will find intolerable.

An interesting development, which came further into public view in the year 2000, was the work occurring in the field of OPEN AGENT ARCHITECTURE. This art proposes an expandable collection of agents, each having special abilities, which operates under the control of a governing device, which acts as an interface between the user and the collection of agents. The user expresses a desire to have a task completed and the agents are described as being organized in order to fulfill the goal of the task. This requires that the user makes the task request on each occasion and no form of expertise appears to be captured or learned by the collection of agents.

Another trend, popular in modern software, is that the software should consists of a specialist programming language which users are expected to learn in order to extend the functionality of the software in use. This is obviously time consuming and therefore, beyond the scope of novice users and those not concerned with programming in general. However, the inclusion of VISUAL BASIC FOR APPLICATIONS, MACRO PROGRAMMING LANGUAGES, JAVA SCRIPTS and the like have all been created at some time or another to plug a gap. That gap is special to every user, which operates a software package, in other words it is impossible for any software system to cater for all the specialist needs of 100% of the user base. It is extremely likely that less than 5% of users utilize such programming features, leaving the other 95% to share the cost of developing those features not utilized by the majority.

Many users have tried and failed to automate their software using the aforementioned art, resulting in junk accumulating within their software, in the form of abandoned macros, forgotten code snippets and the like, being accrued in the software to which they relate.

The next group of prior art related to the invention is that of task scheduling. This traditionally involves executing a computer program, such as a virus scan followed by a backup, at predetermined times. The scheduling process will happily allow the backup program to execute, even though the virus scan found a virus. This situation is clearly undesirable in the eyes of any computer operator. Execution schedulers are, therefore, found to be unsuitable in automating the day-to-day tasks of users, over and above those that execute once per day etc.

Users above all else tend to face an ever-growing learning curve as burgeoning software, unkindly referred to by the computer press as bloat-ware. More and more features are added in order to out-do the competition in a features war. This does the user no favors at all and just leads to ever increasing sequences of dialogs, more "are you sure" message boxes and increasingly large drop down lists of fonts, font sizes, and other information which must be sifted through in order to find the desired option.

Some art is adopting a "most used appears first" philosophy for lists. For example, commonly used fonts are placed at the top a list, as opposed to being in alphabetical order. This is used so rarely as to be inconsistent and, therefore, increases user frustration as this rather desirable feature now appears out of place. Users are not able to restrict the number of choices in system-defined lists and are often not able to assign default values. What would be more useful is if the context of work defined which tools and which options were available, and in what order they are displayed. Users would then be presented with a more refined interface, sensitive to context and responsive to their unique patterns of work.

Therefore, a self-adapting, self-optimizing system, that constantly records and optimizes tasks and their related tools and options, comprising a method of sharing expertise, while providing a way to automatically re-enact any task(s), according to desired options and external constraints, is not found in the art.

SUMMARY OF THE INVENTION

It is an aspect of the present invention to provide an information processing apparatus and method having a smart power system that automatically senses the use and non-use of a plurality of peripherals and either increases, decreases or eliminates the voltage to the plurality of peripherals accordingly.

It is another aspect of the present invention to provide an information processing apparatus and method having an internationally mobile, one-package portable office, comprising high functionality and low weight burden.

It is a further aspect of the present invention to provide an information processing apparatus and method having a one-package portable office that includes a personal computing device, a cell phone, fax, photocopier, scanner and printer, GPS, camera, etc. functioning as an integrated unit.

It is another aspect of the present invention to provide an information processing apparatus and method having a circuit that reduces the effect of interference noise experienced when using a cellular and a landline modem connected to an audio device (PC-Sound card etc.) when sharing a common power supply.

It is another aspect of the present invention to constantly save as much time and effort for the user when completing their tasks, regardless of location, through creating a virtual representative and increasing automation by utilizing contemporary technology and the virtual representative to lessen the work burden on the user of the invention.

It is another aspect of the present invention to provide the most ergonomic and dynamic interfaces and front ends in the user's chosen language along with the utmost automatic adaptation and personalization capabilities.

It is another aspect of the present invention to provide the shortest possible learning curve for the user to learn, operate and be kept updated combined with a dynamic, interactive and intuitive training method.

It is another aspect of the present invention to provide an efficient turnkey, long life, robust and reliable product (integrated and tested in a harmonized environment), which is economical to operate and maintain while being supported by a dynamic auto-update system.

It is another aspect of the present invention to provide a substantially indestructible memory to store and protect the user's lifetime personal, work, environmental and other information and data, allowing it to exist theoretically indefinitely.

It is another aspect of the present invention to provide an information processing apparatus and method that facilitates an ergonomic work environment through the elimination of repetition and the optimization of work patterns.

It is another aspect of the present invention to provide an information processing apparatus and method having a universal conversion module that can convert any format of information such as e-mail, fax, application data file, etc., to any different format with a single button click.

It is a further aspect of the present invention to provide an information processing apparatus and method that enables the user to access the World Wide Web to locate optimized work procedures and teaching mentors.

It is the final aspect of the present invention to support an integrated software application external to, but interacting with, the invention in order that the software application can be self-adapting to the users needs with regard to streamlining the user interface, providing personalization and one-click access to all basic needs.

The invention is an information processing apparatus and method intended to function in harmony with an operation model. An operation model is any software To application, which can function, or can be modified to function with the invention such A that work done with the operation model can be automatically recorded and re-enacted by the invention according to the styles, abilities and principles of the user. As such the invention, by analyzing the user's tasks, related options, documents and other data into coded form instructions (CFI), formulates a digital autobiography of the user.

The apparatus facilitates a high degree of awareness of what the operation model is being instructed to do by its user, based on modules, which ensure the user has every possibility to use the invention regardless of physical location or information formats being sent and received. To this end, support for the power requirements of a plurality of peripherals, even in a mobile context is featured. The user will have the highest availability of equipment, and the highest possibility to complete work through the invention at all possible times.

A universal converter is included, capable of changing any input to any output that is sensible and feasible, e.g., speech to text, text to speech, fax to speech, language translation and the like. This is supported by a network of translation utilities and diverse services, which are brought together in harmony to facilitate a path from any input to any output where possible.

The invention is self-optimizing for a particular user in that the user's operation of the apparatus, in other words, the sequence of application buttons and predefined input fields and work items that are selected to accomplish a task, are recorded and stored in an operation log containing usage information of the corresponding operation model.

A task list, comprising the basic needs of the user, is formed and continually updated and optimized dynamically by extracting frequently used tasks from the operation log. Further, a corresponding server, which maintains a comprehensive and evolving list of all possible tasks and options, published by all users of the apparatus, facilitates the transference of expertise, experience and best practice in a harmonized fashion.

Further, additional options for the input fields can be obtained from the server or other corresponding servers. The user is provided the option of executing sequential or parallel tasks from the task list either immediately or according to a predetermined time schedule or system events occurring within the apparatus itself or the corresponding operation model. The execution of the tasks can occur with or without interaction from the user where all input values are known for the task. Thus, the invention functions as a virtual representative of the user, functioning according to the principles and styles learned from the user.

Additionally, the user can project and review different task models to ultimately determine a personal set of preferences, which are recorded and stored in a preference list. The preference, of course, will be unique to a particular user. Notifications in accordance with the selections are provided when a task is executed with an altered set of input fields and a deviation has occurred from the task model that was based upon a task stored in the user's personal preference list.

The apparatus supports personalization of all options and input methods, facilitating the reduction of burdensome option lists containing a multitude of values.

Other aspects, features and advantages of the present invention will become obvious from the following detailed description that is given for one embodiment of the present invention while referring to the accompanying drawings.

BRIEF DESCRIPTION OF THE DRAWINGS

FIG. 5 is an illustration depicting interaction the peripheral control module and corresponding application software with regard to monitoring the presence of a PSTN connection.

FIG. 11 is a diagram depicting the flow of information through and within the universal converter module.

DETAILED DESCRIPTION OF THE INVENTION

Overview

Figure 1:
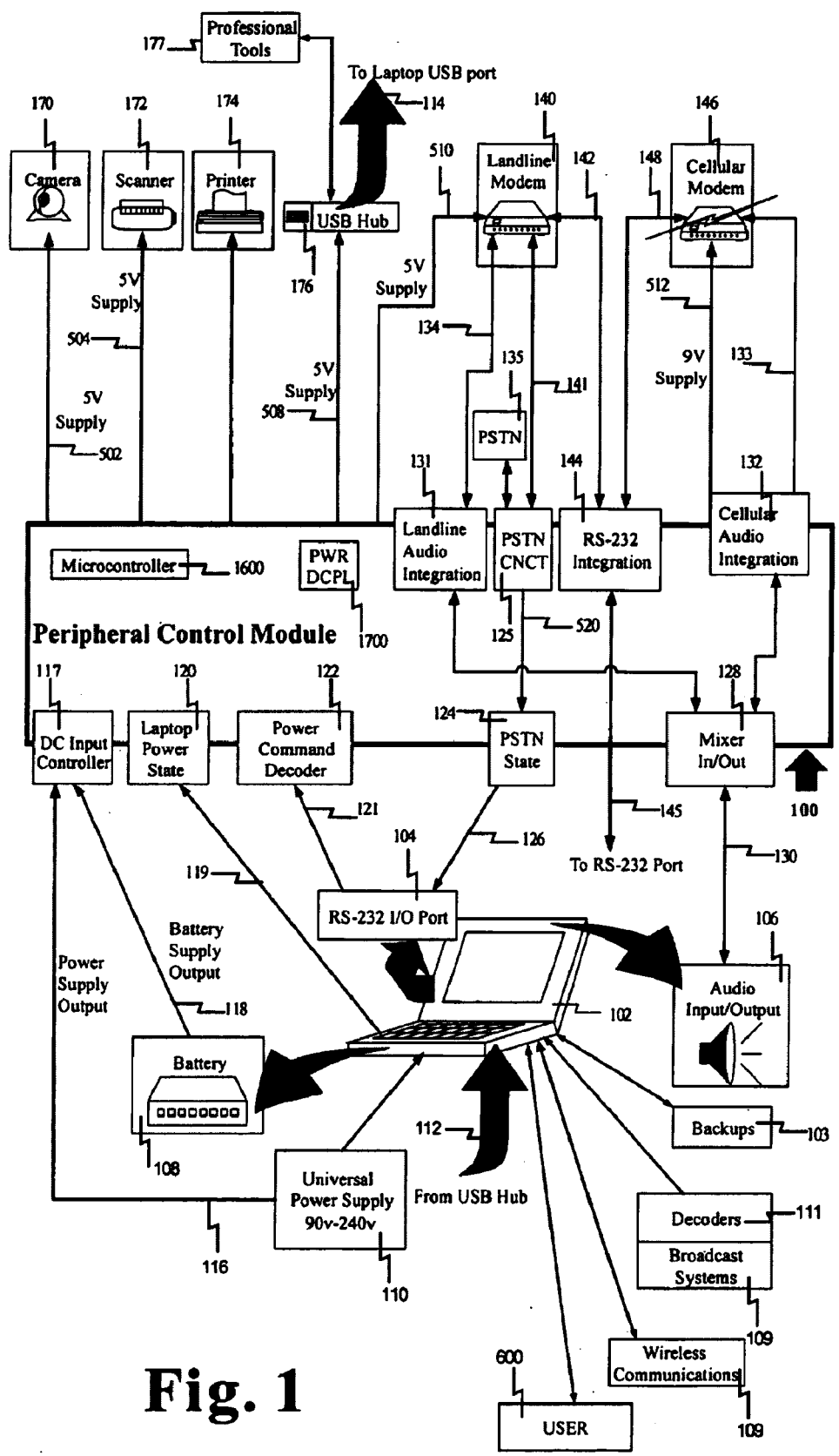
FIG. 1 is an illustration of the peripheral control module depicting the interconnections between the module, a notebook computer and plurality of peripherals.

Philosophically, the invention can be best appreciated by studying the works of Charles Darwin. See, Darwin's Dangerous Idea, Daniel C. Dennett, Simon & Schuster, New York, 1996, page 43. Applying the theory that Darwin formulated for his explanation of the Origin of Species, it is apparent that this concept can also be used to describe so many different people having so many different needs and strategies that must be met by their respective computers and software. The principle of natural selection is the unifying insight into the inventor's approach to his information processing apparatus and method.

By having a large variety of inheritable skills (through storage in computer systems), which constitute recorded procedures in the invention; these different procedures will tend to have different payoffs for different individuals and subgroups of the user population. Under Darwinian Theory, these different individuals and subpopulations would tend to diverge, each pursuing their favored sort of excellence until, eventually, there is a distinct division. With biological systems, transference of inheritable characteristics implemented by DNA mutations and modifications is possible only from parent to child and even then, is frequently "hit or miss". Mutation in this field is often viewed as random, unstructured and survival appears to be by pure chance and by no means permanent, as far as a species is concerned.

However, by using the inventor's methods, this random and unstructured divergence is eliminated since the entire optimized skill set is "inheritable" by one computer communicating with another computer or with the user.

In essence, this method provides a new modality for increasing man's knowledge exponentially in volume and in speed of transference from one individual or subpopulation to another.

When newborn, a human could not survive without instinct, reflex and care. Therefore, the inventor has envisaged provision for basic tasks (instinct) corresponding to the initial needs of the user. Fundamentally as those instinctive tasks, and other tasks, are used the invention self-optimizes (reflex) according to the manner in which the user completes work. Further, by seeking expertise captured by other users, the invention is able to gain additional knowledge, which directly relates to caring for the user's virtual, helping it to grow and accumulate more tasks and related choices, applicable to the user's work.

The present invention features a method of computerized self-expansion and self-optimization. Any compatible software package, such as MICROSOFT OFFICE, is defined herein as an operation model. However, to be defined as compatible, the software must adopt interconnection standards dictated by the invention.

In other words, an operation model represents compatibility, where a software package, or suite of software packages, is customized by their vendor to comply with the invention. This enables a mutual flow of information from an operation model to the invention and vice versa.

The invention restricts the amount of delivered functionality to that which is relevant to the operation model as used by the user on a daily basis. This is all that is necessary for the vast majority of individuals. However, operation models interact to augment each other; this is evident in office type applications where spreadsheets can be embedded in word-processor documents.

The invention is complemented by the peripheral control module, which increases the functionality offered to the user in terms of hardware, whether static, in an office based context, or mobile, even in an international context. The peripheral control module provides the utmost convenience, increasing portability by reducing weight burden and eliminating energy waste encountered by peripherals in standby mode and other energy saving modes.

An aspect of the invention is to deliver a system that allows an operation model to work in its own context and with respect to the user's own language. Therefore, the invention views all activity of the operation model as being abstract, without meaning. But, by implementing a foundation based on the analysis of frequency of use, related to all elements of the operation model, immense amounts of information flowing into the invention can be fed back to an originating operation model as concise coded instructions referred to as procedures, tasks and operations. The operation model, and of course, the user are the only bodies able to assign meaning to any work, the invention simply facilitates the recording, expansion, classification and automatic re-enactment of any work.

The coded instructions consists of a great deal of flexibility in relation to any user-selectable option, which changes during each iteration of a work item being created or worked upon by the user. The invention is constantly and automatically seeking patterns, habits and consistency in order to provide automation, and where automation is not completely feasible, optimization reduces the number of manual inputs from the user in order to complete any work in the shortest possible time.

The universal conversion module is included in the software system, which is capable of incorporating existing conversion programs to leverage a plurality of conversion methods, in order to find a path of conversion from a known input to a known output. Information stored as a raster image, such as a received fax or scanned document, can readily be converted to a text document, which in turn can pass through a text to speech conversion and so on. Wherever it is sensible and feasible to provide such a feature, the functionality has been put in place to support this philosophy.

To achieve the same functionality that is provided by the invention, the user would have to spend enormous amounts of time and money selecting and installing dozens of individual software and hardware devices, though many of them will simply fail to interact on any appreciable level if unassisted by the invention.

The invention is designed so that it continuously monitors the user's interactions with the invention and seeks ways to support an operation model in the goal of providing an ergonomic user environment. Tasks, which were not envisaged at the time of software development, can be described by the user or can be gained from other users. The invention provides an open interface, which welcomes structured forms of disclosure from operation models, which require activity to be recorded.

If a task is frequently used, the system can automate such procedures and execute them without further need for interaction with the user. Thus, the user appears to exist "virtually" in many places, simultaneously, as tasks are executed in parallel, perhaps, in diverse locations. Further, the user can predetermine the time of execution, the frequency of execution and even the triggers that will cause the execution of any task. A "virtual existence" is gradually established as the system takes over tedious or burdensome tasks that would normally require the close attention of the user. For example, complex sequences of dialogs, requiring a plethora of input fields to be populated and selected can be reduced to a single click, in most cases, enabling the user to get to the point of constructive work in the shortest possible time.

The invention, in addition to providing all of the above benefits, also allows the user to seek a mentor via corresponding Web Communication Providers (WCP).

Mentor is defined as a person or digital representative with specialized knowledge, which can be shared in digital form.

The mentor can be located anywhere in the world, again, as long as there is at least one corresponding method of communication available to reach them. A mentor is not restricted to the form of a physical being. A software system containing the procedures of an expert, behaving as a digital representation of the expert, becomes possible. Such mentors are provided or facilitated by a corresponding infrastructure, that is, another apparatus having the same capabilities and design configurations of the invention. Consequently, the user is able to draw from the source of expert procedures that have been based on the knowledge of those who are recognized as the best in their field. Such procedures can emanate from other users of the invention, or from any other source of information, i.e. operation model, as long as the operation model conforms to certain protocols in accordance with the invention.

Description of the Preferred Embodiment

Referring now to FIG. 1, peripheral control module 100 is required for the integration between notebook 102 and a plurality of commonplace peripherals all operating from a single power source. Module 100 includes microcontroller 1600, described in FIG. 9.

Notebook 102 is a standard portable laptop computer such as a DELL INSPIRON 7000, having a sound card, internal microphone, memory, central processing unit, floppy drive, hard disk drive and a plethora of external inputs and outputs further including external microphone, external line-in, speaker output and USB PORT and the like.

Module 100 acts as a power supply for a plurality of peripherals, while drawing power from a source automatically selected from either battery 108 or universal power supply 110, found in notebook 102.

The plurality of peripherals includes camera 170 (e.g. Conexant USB Camera), scanner 172 (e.g. Avigramm Mini-Doc USB), printer 174 (e.g. Citizen PN60), USB hub 176 (e.g. ADS Docking Station USBH-803), landline modem 140 (e.g. Conexant Socket Modem) and cellular modem 146 (e.g. Siemens M20T). Within schematic drawings the term "GSM" occurs due to the fact that cellular modem 146 in the preferred embodiment is the Siemens M20T, which adopts the European GSM standard, therefore, the terms GSM and cellular modem are interchangeable.

The plurality of peripherals can optionally consists of professional tools 177 representing any specialist equipment that can be connected to HUB 176 or any other port on notebook 102, broadcast receivers 109 with corresponding decoders 111 (equivalent to GPS, TV and RADIO etc.), wireless communication 113 (equivalent to BLUETOOTH, X10, INFRARED etc.) or other methods of information exchange which will increase the ability of user 600 to stay in touch with the invention substantially continuously.

Connectors 114 and 112 depict the physical USB connection between hub 176 and notebook 102.

Module 100 takes a DC input voltage from battery 108 through connection 118 and if connection 116 is present then module 100 additionally takes a DC input voltage from supply 110. These are now analyzed in DC input controller 117, where power is drawn from supply 110 if connector 116 is present otherwise supply is drawn from battery 108. Therefore, module 100 is able to meet the power requirements of the plurality of peripherals with or without a mains connection, providing battery 108 holds sufficient charge.

Figure 6:
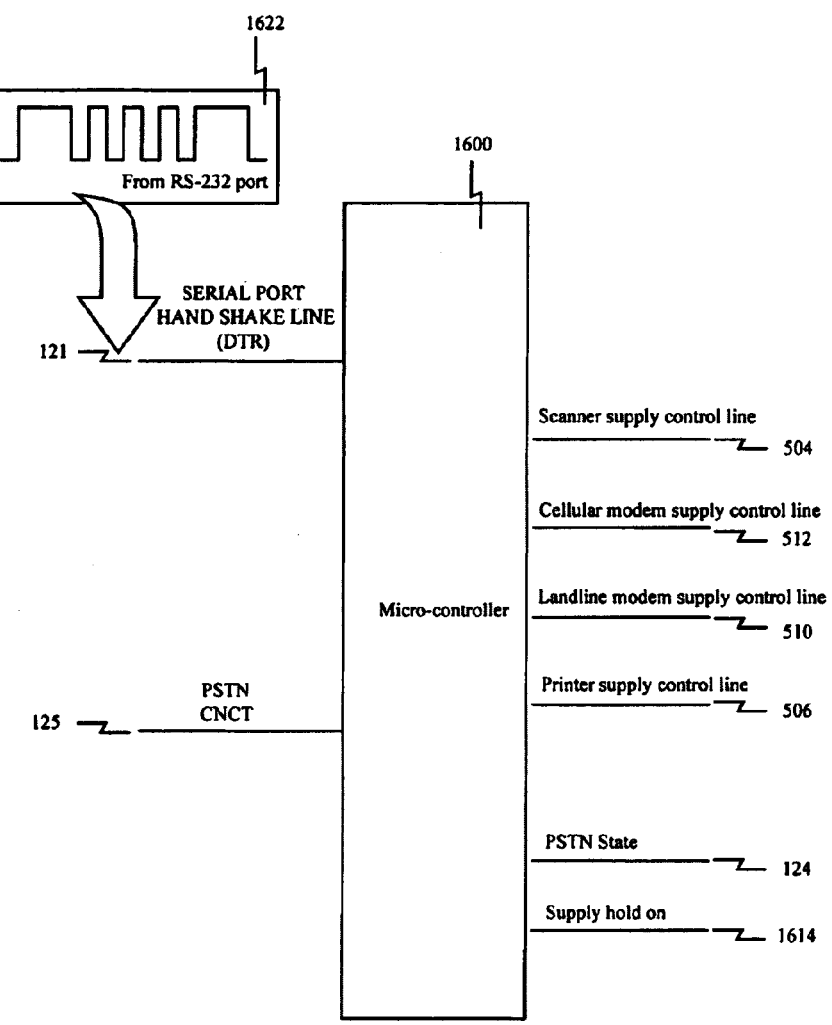
FIG. 6 is a block diagram summarizing relevant inputs and outputs of the microcontroller, which governs the state of power supply to the connected peripherals.

FIG. 6 further describes the selection process contained in module 100 in order to choose between supply 110 and battery 108 as its source of power.

It is essential that when notebook 102 is powered-off, or enters a state commonly referred to as HIBERNATION, where the state of executing software is preserved on hard disk before notebook 102 switches off, that the plurality of peripherals is also powered-off. For this purpose connector 119 is hardwired between notebook 102 and laptop power state 120 and enables module 100 to sense when notebook 102 is powered-off. Therefore, when notebook 102 is powered-off, either manually or through means of operating system software, the plurality of peripherals is also powered-off and finally module 100 is powered off. Connector 119, when joining to notebook 102 can do so at any point where a voltage is present so long as the voltage is only present when notebook 102 is in a power-on condition.

Module 100 includes a set of power outputs further comprising 5V (five volts) supply 502, 5V supply 504, 9V supply 506, 5V supply 508, 5V supply 510, 9V supply 512, each being a unique power supply line which operates under the control of microcontroller 1600, and can therefore, be switched on and off by module 100 under the control of OM.

The power supplies of camera 170 and hub 114 are not illustrated in this preferred embodiment as being under the control of module 100 as the embodiment serves to illustrate the management of power supply to the plurality of peripherals which could consists of camera 170, hub 114 or any other peripheral, if so desired. This can be enabled by using a microcontroller with additional capacity for power supply select lines similar to those having power outputs. Even though the power supply condition of hub 176 and camera 170 are not related to microcontroller 1600, module 100 still ensures both are powered-off when notebook 102 is powered-off.

Aforementioned power outputs are only enabled when OM instructs module 100 to either apply or remove power from a specific peripheral. At initial power-on, i.e. when notebook 102 is powered-on, the plurality of peripherals can be all off, all on or in a mixed state where some peripherals are on and others are off. This is possible through instructions contained in the firmware of microcontroller 1600. In other words, when notebook 102 is powered-on microcontroller 1600 can place each peripheral in a default power condition, being either on or off.

Figure 2:
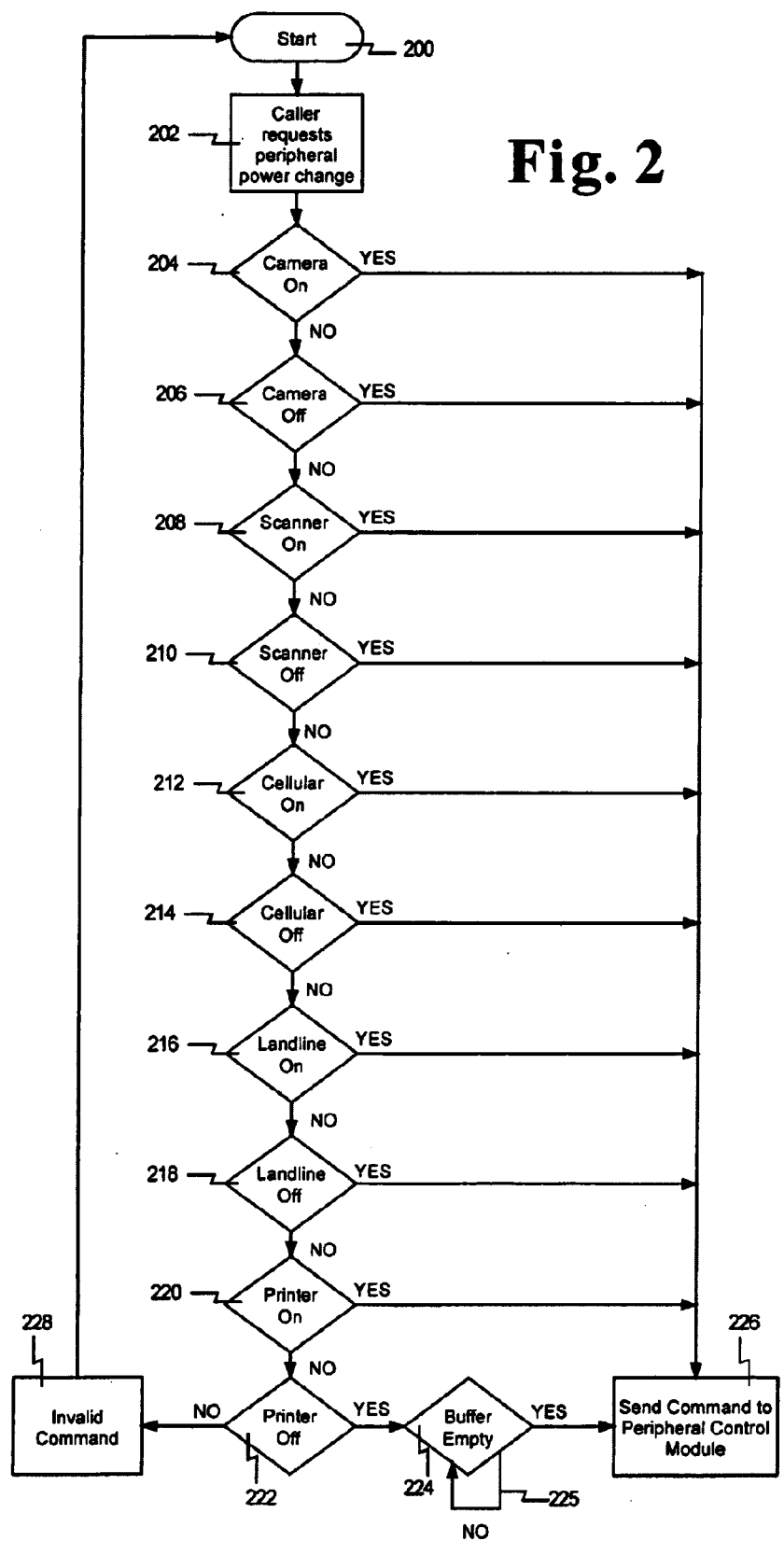
FIG. 2 is an illustration of a subroutine being called within software corresponding with the invention, in order to effect a change in power state of any connected peripheral.
Figure 3:
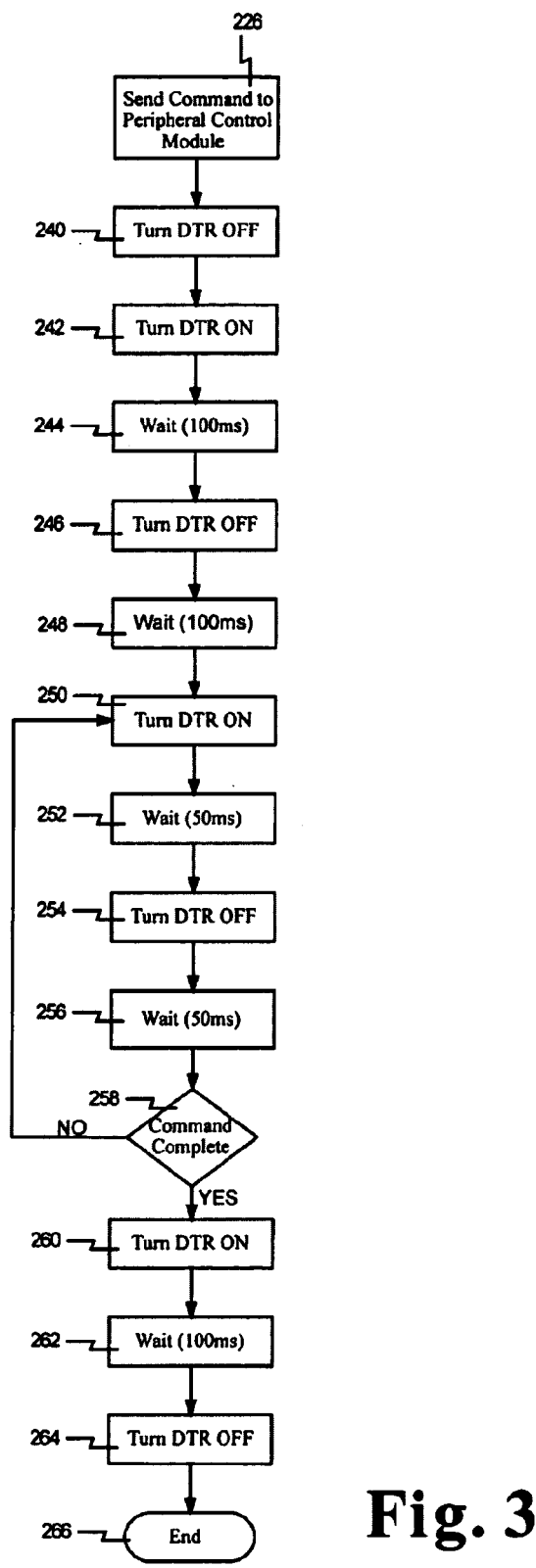
FIG. 3 is an illustration describing the execution of a power state change command.
Figure 4:
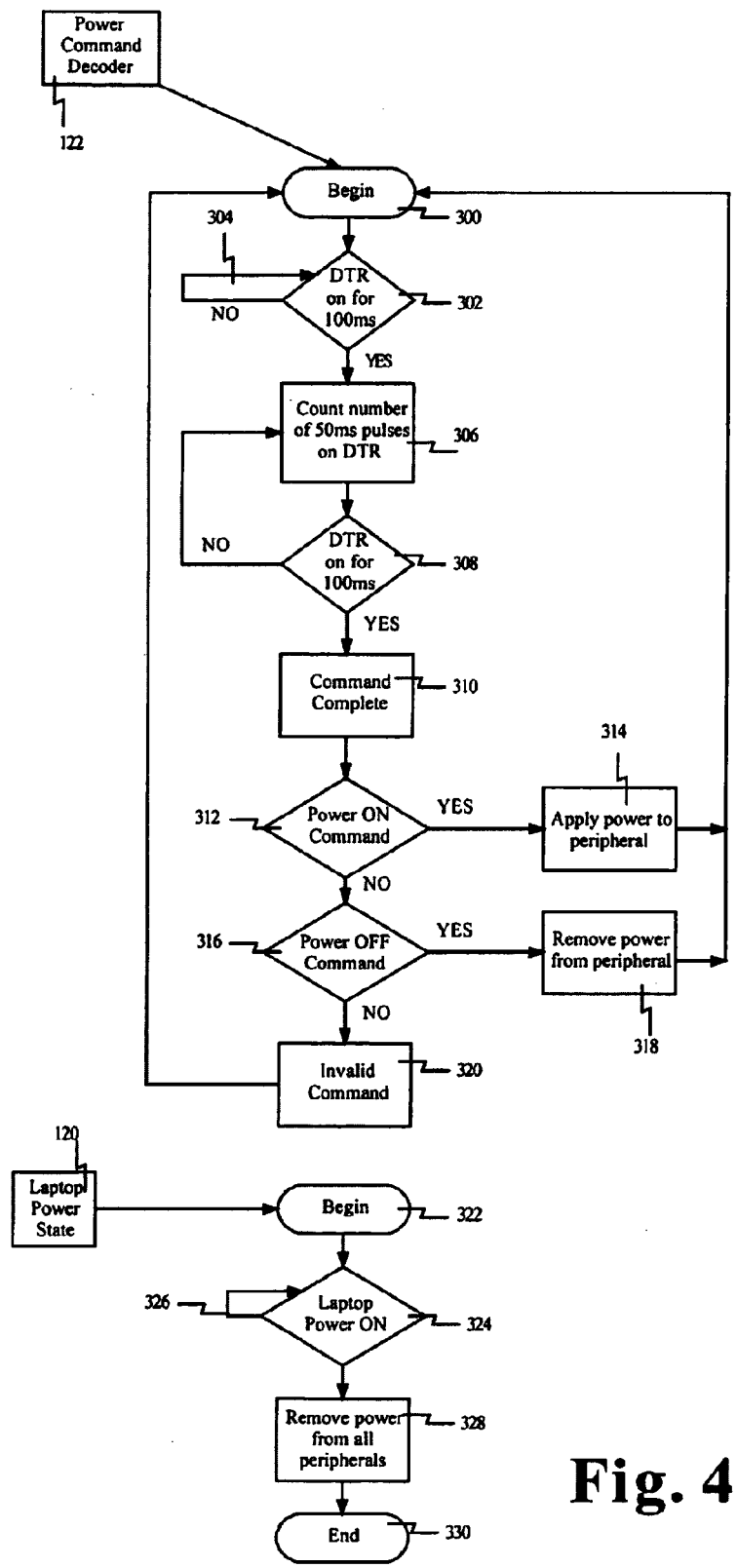
FIG. 4 is an illustration describing the logic present in the hardware of the peripheral control module as it monitors for incoming power state change commands.

When OM, running on notebook 102, requires any peripheral from the plurality of peripherals to be powered on or off an appropriate power state change command must be emitted from notebook 102 via RS-232 Port 104 along connection 121 to power command decoder 122, an operation which is further described in FIGS. 2 through 4.

It is known that power state change commands could also be issued via other types of communication port, including but not restricted to RS-232, RS-422, PARALLEL PORT or USB and USB connected communication ports and the like.

It known that hub 176 can be a USB HUB which directly draws power from the corresponding USB PORT on notebook 102, therefore, when notebook 102 is powered off the USB HUB, and those peripherals connected to the USB HUB if powered by the USB HUB, would also be powered-off automatically. However an inherent restriction on the amount of power that can be supplied by the USB PORT on notebook 102 is imposed to avoid overloading notebook 102. For example, when connecting a USB CAMERA to a USB HUB, the USB HUB typically requires either a main power supply or that the USB CAMERA includes a separate supply (e.g. batteries).

Referring now to the integration of notebook 102, landline modem 140 and cellular modem 146, this occurs in two distinct senses:

First, the RS-232 channels of both Modem 140 and Modem 146 come directly to RS-232 integration 144 through their respective connections, being connector 142 and connector 148, such that a single RS-232 channel is presented to notebook 102 either by connecting connector 145 directly to a serial port on notebook 102 or through a USB TO SERIAL CONVERTER, known in the art, which can be having hub 176 or can be connected to hub 176. Either will result in a single RS-232 data-path between notebook 102 and modem 140 or modem 146, which ever is powered-on at the time. By only allowing one of modem 142 and modem 146 to be powered on at any moment, OM can effectively multiplex one RS-232 port related to notebook 102 to two modems. The preferred embodiment illustrates this feature when considering a mobile user that at times will have a connection from module 100 to Public Switched Telephone Network (PSTN) 135 and at other times will not, for instance while driving in a car.

Therefore, module 100 includes PSTN CNCT 125, further consists of micro switch 520 (see FIG. 9), which is depressed when a PSTN connecting cable is inserted into PSTN CNCT 125. When PSTN CNCT 125 is connected to the PSTN 135 then PSTN STATE 124 will have a condition of ONE indicating to OM that a physical connection to PSTN 135 is present. When the physical connection is removed then PSTN STATE 124 will have a condition of ZERO and OM is informed of the connection state via connector 126, which modifies the condition of the DSR signal contained in serial port 104.

Landline modem 140 is connected to PSTN CNCT 125 through connector 141 in order to be able to transmit and receive data over PSTN 135.

Figure 7:
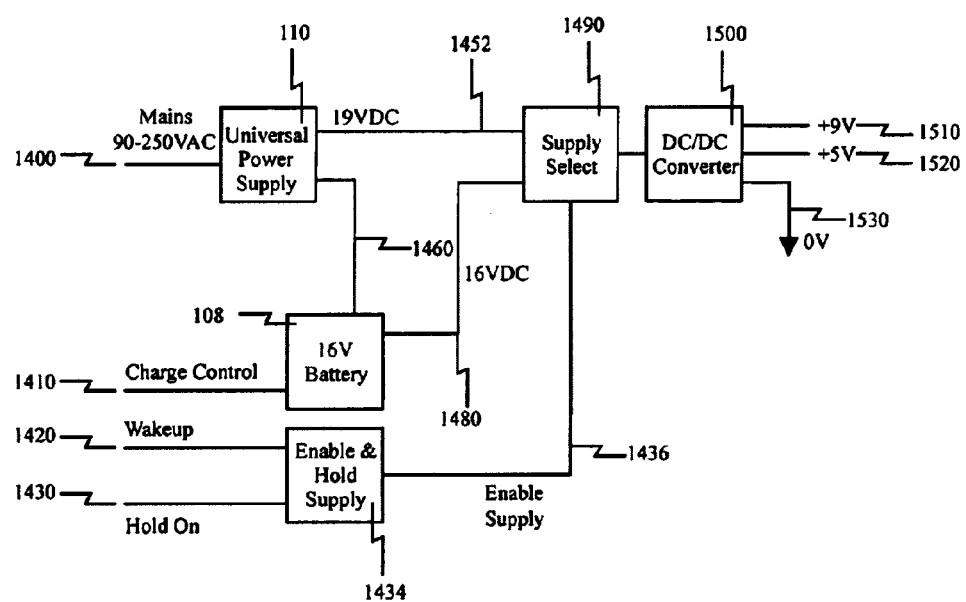
FIG. 7 is a block diagram depicting a function of the peripheral control module, which selects power supply source from battery or universal power adapter.

Secondly, the audio inputs and outputs of modem 140 and modem 146 are brought through their related audio connectors (connector 134 and connector 133) to a related set of simple audio amplifiers, namely landline audio integration 131 and cellular modem audio integration 132, which are configured to match the audio input/output levels for notebook 102 when connected to the modems (further disclosed in FIG. 7).

Cellular modem 146 includes an audio input/output interface, which can be connected to any external interface. For example, in a vehicle application, cellular modem 146 can be connected to an in-car audio system to facilitate hands-free communication while driving. The cellular modem and the in-car audio system, as described, will share a common power supply, namely the car battery. Similarly, in the preferred embodiment a common power supply exists for notebook 102, module 100 and cellular modem 146 as they are all interconnected.

When cellular modem 146 is connected to, and shares a common power supply with any audio device, interference leaks from cellular modem 146 into the connected external audio system.

In order to suppress this interference, module 100 includes the interference elimination circuit PWR DCPL 1700 (further disclosed in FIG. 8), where the ground connections of cellular modem 146 are isolated from the rest of module 100, and interference from cellular modem 146, which travels along ground connections of power supply lines to audio input/output 106, is substantially eliminated. Therefore, the quality of audio signal through connector 130 is substantially improved.

The preferred embodiment uses COM1 for the purposes of communicating with the modems, and COM2, manifested by a serial port on hub 176, is utilized by the power state change command system. The COM2 includes two signals of interest to the invention, one input signal called Data Set Ready (DSR), used to indicate the state of PSTN STATE 124 and one output signal called Data Terminal Ready (DTR) used by OM to transmit power state change commands to power command decoder 122.

It is known that an additional USB TO SERIAL CONVERTER would allow notebook 102 to concurrently support modem 140 and modem 146, though the aim of the preferred embodiment is to teach a method of constructing module 100 with a minimum of hardware and therefore, maximum power efficiency, but it is also logical to assume that when the user has furnished module 100 with a connection to PSTN 135 that cellular modem 146 will no longer be in use, and can, therefore, be powered-off reducing power consumption.

The preferred configuration of notebook 102 includes 128 MB RAM, 20 GB HARDDISK, FLOPPY DRIVE, DVD DRIVE, PENTIUM III or equivalent, TFT COLOUR DISPLAY 14.1" or similar, PC-CARD capability, ETHERNET capability, at least one RS-232 PORT, at least one USB PORT, at least one PARALLEL PRINTER PORT, at least one INFRARED PORT. Input devices which can be contained in notebook 102 are CD/DVD drives, joystick, joy pad, document scanner, unified sheet feeder, touch pad, PDA, finger print scanner, keyboard, graphics tablet, chronograph, touch screen, electronic ID card reader, microphone, removable media, camera, mouse, sensors for smell, taste, touch, light, temperature and air composition. Output devices which can be contained in notebook 102 are display, removable media, printer and or Braille printer, speakers, PDA, emitters for smell, taste, touch, light, temperature and air composition.

Notebook 102 can support communication via telephony via a landline systems such as modems V90, K56FLEX, ISDN, DSL and others, cellular modems, PC-cards supporting connection to mobile telephones and the like. Notebook 102 has the capacity of simultaneous reception and or transmission of both landline and cellular data all over the world without the user needing to change any of the related settings, either in software or in hardware. Notebook 102 includes physical connections through standard ports and connectors such as USB, serial, parallel, mouse and keyboard, interface cards, audio in/out, video in/out and the like.

A corresponding "Black Box" recorder, being a substantially indestructible, detachable, robust, reliable and extendible lifetime memory with multiple connectivity options for notebook 102. The black box stores all dynamic data for the invention including but not restricted to the user's personal, work and environment data and provides extensive storage space for operations models further disclosed in the figures.

It is recommended that Notebook 102 be connected to at least a suitable backup device 103, for example a ZIP DRIVE, TAPE STREAMER or other form of backup device. Backup device 103 can be a memory device, which can be wirelessly connected to notebook 102. Backup device 103 contains a differential backup such of outstanding Items changed since the last full system backup.

User 600 and notebook 102 can exchange information via local interfaces comprising keyboard, touch screen membrane, display, mouse, microphone, speakers, camera, electronic ID card, graphics tablet, joystick, joy pad, document scanner, or by compatible interfaces comprising telephone (tone and pulse dialing), mobile telephone, fax, thin clients such as remote personal computer, smart mobile telephone (WAP, GPRS, 3G etc.), PDA, television with web T.V. and the like.

Local interfaces and compatible interfaces provide substantially continuous access to notebook 102 and the invention in whole or in part, also facilitating communication with Web facilities and the World through the ability to receive and transmit audio, visual and data information in analogue or digital forms.

The invention benefits user 600 by being highly mobile and portable, offering detachability of any component when feasible, while maintaining the highest available level of functionality.

The screen brightness and screen image magnification can be adjusted automatically according to light level, user's sight and distance from the display by comprising distance measuring equipment based on INFRARED emissions which enable the invention to judge the distance between notebook 102 and user 600.

Notebook 102 by comprising such a diverse range of peripherals, local interfaces and compatible interfaces has provision for connections to all sensors and emitters, in order to duplicate human senses and to simulate any environment. Such sensors can perceive a broader spectrum than human senses alone and therefore, increase the user's sensory capabilities.

As a multipurpose device interconnected with many peripherals notebook 102 serves as a mobile or fixed workstation, for any profession, whether user 600 is stationary or is moving around the world, as it includes all commonly needed hardware, software and subscriptions, providing the user with instantaneous and multiple access options to his workstation through the local interfaces or the compatible interfaces.

As a multifunction device notebook 102 has all functions of the most popular devices and appliances, used in day-to-day domestic and professional activities, as well as access to the powerful features afforded by information technology systems and applications, i.e. personal computer with a Global Internet Access, PDA, graphics tablet, document and finger print scanner, printer and Braille printer, CD player, DVD player, camera, video camera, audio recorder, audio player, juke box, video recorder, audio/visual and data media streams, telephone, mobile telephone, answering machine both for land line and mobile telephones, e-mail, facsimile, group video conferencing, photocopier, television, radio, Work and Domestic Security Applications and Devices, remote control for domestic devices and appliances, alarm clock, calculator, global positioning system (GPS), magnetic media and CD recorder, sensors, emitters and others.

Referring now to FIG. 2, a decision tree that must exist within OM is shown. The decision tree is defined as power decision comprising blocks 204, 206, 208, 210, 212, 214, 216, 218, 220 and 222.

Flow begins at block 200 when a calling subroutine in OM, for example, a subroutine designed to print a document, calls upon power decision to effect a change in power state for a peripheral having the plurality of peripherals, in this example printer 174 (see FIG. 1).

Power decision seeks to discover the exact power command that was provided by the calling subroutine, in this example block 220 indicates that printer 174 is to be powered-on. Therefore, flow moves to block 226 where the power command is constructed and transmitted to power command decoder 122 (see FIG. 1)

At least one block in power decision must yield a "YES" condition. If power decision fails to yield a "YES" response then block 228 is reached and flow returns to block 200, due to the fact that the calling subroutine specified an out of range value as a power command.

The simple example of changing printer 174 to power-on condition illustrates a basic example of using power decision to effect a power state change. However, exemplifying printer 174 also highlights a further possible difficulty when turning any printer off, that of potentially loosing data contained in the printer's data buffer, a problem known in the art. In the present example this would result in an incomplete document being rendered by printer 174. Therefore, to address this problem power decision includes a loop, depicted by block 224 where OM can query the operating system to see if all print jobs for printer 174 have been completed. If this yields a "YES" response, indicating all jobs are complete then a preset time delay is entered within block 224, where a loop iterates through connector 225 until the preset time delay has elapsed. The preset time delay should be set at a sufficient period to allow printer 174 to fully empty its data buffer, typically a value of ten seconds should suffice, though in extreme cases (when printing graphics) in excess of a minute may be necessary.

Referring now to FIG. 3 the steps contained in send command 226 is illustrated. Send command 226 is a sub routine, which transmits a power state change command to power command decoder 122 (See FIG. 1).

The preferred embodiment features a method of sending power state change commands via RS-232 data signals, i.e. DTR and DSR. Therefore, FIG. 3 depicts the order of changes in the signal referred to as DTR, which is directly connected to power command decoder 122.

Block 240 shows that DTR is turned off (ZERO condition) to ensure that power command decoder can see a clear transition from ZERO to ONE. Subsequent blocks now show that DTR should be modulated in a reasonably precise manner so that power command decoder 122 will recognize the power state change command.

At block 242, block 244, block 246 and block 248, DTR is set to a ONE condition for 100 milliseconds and then set to a ZERO condition for 100 ms. Power command decoder 122 recognizes this change and length of time as being the start of a power state change command. Through the blocks DTR has moved from a ONE condition to a ZERO condition within a preset period of time.

At block 250, block 252, block 254 and block 256 the DTR signal is again modulated from ZERO to ONE and BACK to ZERO with a frequency of 50 milliseconds. At block 258, an internal counter keeps tally of the number of 50 millisecond ONE/ZERO transitions that have occurred thus far and if the counter matches the identity of the power state change command itself then block 260 is reached, otherwise flow returns to block 250 and so on until the correct number of 50 millisecond pulses are transmitted to power command decoder 122.

Finally at block 260, block 262 and block 264 the DTR signal again moves from ZERO to ONE for 100 milliseconds then returns to a ZERO condition, thus the end of the power state change command is transmitted and flow ends at block 266.

To summarize, the power state change command has a numerical identity, where identity value of one means Camera On, two means Camera off, three means Scanner on etc. The sequence of 50 millisecond pulses is sandwiched between two pulses of 100 milliseconds, being start and end of command indicators. The pulses are detected by the Power Command Decoder and acted upon accordingly.

Figure 9:
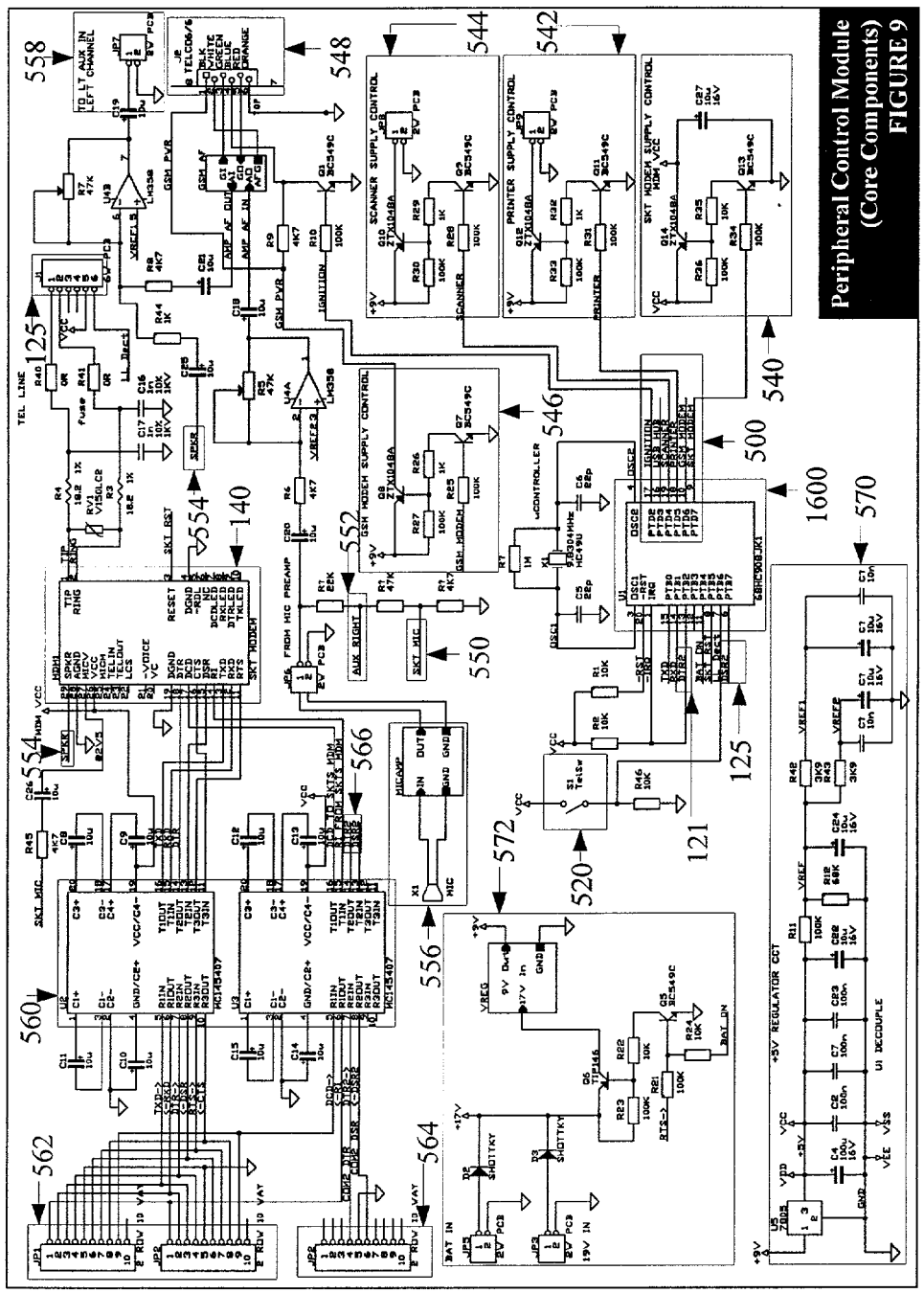
FIG. 9 is a schematic diagram of the microcontroller, audio integration, RS-232 integration and power management circuits of the peripheral control module.

Referencing now to FIG. 4, the corresponding power state change command decoder logic is illustrated, and is contained in Microcontroller 1600, (see FIG. 9 MOTOROLA 68HC908JK1). Microcontroller 1600 is used to store and execute a program, typically referred to as FIRMWARE. FIRMWARE in microcontroller 1600 is depicted in FIGS. 4 and 5.

Several other compatible forms of microcontroller are available from MOTOROLA and can be used to extend the capacity of module 100 by providing the ability to control additional peripherals.

The DTR signal of an RS-232 port (COM2 in the preferred embodiment) is brought directly to microcontroller 1600 which monitors the DTR input signal for transitions in state i.e. ZERO to ONE or vice versa. FIG. 4 shows how power command decoder 122 includes the analysis of these transitions and recognizes the start of command (100 ms pulse), command pulses (50 ms pulses) and end of command (100 ms pulse) conditions indicated by the state of the DTR signal.

Flow begins at block 300, which is the start point of a substantially infinite loop, which runs inside microcontroller 1600 as long as the invention is powered-on. Block 302 will not yield a "YES" response unless the DTR line changes from ZERO to ONE and holds for a period of 100 milliseconds (ms), finally changing back to ZERO for 100 ms. This signals the start of the power command being input from the RS-232 serial port under the control of OM. Loop connector 304 causes flow to stay within block 302 until such time as this 100 ms ONE condition is detected.

After the first ONE condition of 100 ms comes a sequence of 50 ms pulses, which are counted at block 306 until such time as a pulse with a length of 100 ms occurs, detected by decision block 308.

When decision block 308 detects the 100 ms pulse flow is diverted to block 310 where the incoming command is complete. Flow then moves to block 312 and block 316 in turn, where a decision is made as to whether a peripheral is to be powered-on or powered-off. Flow continue to block 314 where a peripheral is powered-on or block 318, where a peripheral is powered-off, and accordingly the power state change command, identified by the number of 50 millisecond pulses, is effected. Block 320 is reached if an invalid command is received and flow returns to block 300.

A further power condition is monitored by microcontroller 1600 and this is depicted as connector 119 and laptop power state 120 (see FIG. 1). The presence of a voltage on connector 119 informs microcontroller 1600 that Notebook 102 is powered-on. When this voltage disappears, Microcontroller 1600 begins a shutdown sequence turning off the plurality of peripherals and finally powering off module 100.

This monitor process is depicted at the flow beginning with block 322 where flow moves to block 324 where a substantially infinite loop begins and is maintained through connector 326 so long as the voltage is present on connector 119. The instant that the voltage drops to zero on connector 119 flow moves to block 328 and the plurality of peripherals and module 100 are powered-off and flow ends at Block 330.

As shown in FIG. 5, two corresponding flows are depicted. The first of these begins at block 330 and the second at block 340.

FIG. 5 illustrates the fact that PSTN STATE 124 includes a flow, which constantly monitors the presence of a physical connection to PSTN 135. This is done by monitoring the state of the aforementioned micro-switch, which is embedded in PSTN Connector 125. The micro-switch is depressed as a physical connector enters and is locked in PSTN connector 125. When the micro-switch is depressed block 332 diverts flow to block 334 where DSR, a signal utilized from RS-232 port 104, is set to a ONE CONDITION. When the connection is removed from PSTN CNT 125 then block 336 diverts flow to block 338 where DSR is set to a ZERO condition.

The monitoring loop then continues as flow returns once again to block 330.

OM must monitor this change in the state of DSR and will know immediately if the physical connection to PSTN 125 is in place or not. OM means operation models 610 or GSAM 612 (see FIG. 10) or any other software, which is compatible with the invention for the purpose of recording and re-enacting tasks carried out by the user.

This monitoring loop, which must be contained in OM, begins at Block 340 and flow moves to block 342, which tests the DSR state for a ONE CONDITION and if this yields a "YES" response then flow moves to Block 344, where example behavior is depicted by OM powering-off Cellular Modem 146 and powering-on Landline Modem 140 (see FIG. 1).

Decision block 346 detects when DSR changes to a ZERO condition and a contrary example is depicted in block 348, where cellular modem 146 is powered-on and landline modem 140 is power-off.

The modulation of DTR and the monitoring of DSR conditions can easily be achieved using VISUAL BASIC version 4.0 or similar and utilizing the comprised MICROSOFT COMM CONTROL (used for serial communication). Other development environments such as JAVA and C++ could also be used.

Referring to FIG. 6, a summary of the relevant inputs and outputs of microcontroller 1600 is shown. These inputs and outputs provide the interface between the OM and power supply control.

Microcontroller 1600 corresponding to U3 in FIG. 9, monitors DTR, depicted as connector 121 (see FIG. 1) which is modulated by OM. OM issues a combination of pulses 1622 (as described in FIG. 3), representing a unique command which is decoded and acted upon by microcontroller 1600.

The second input monitored by microcontroller 1600 is PSTN CNCT 125 (see FIG. 1). This input has a corresponding output in the form of PSTN STATE 124 (see FIG. 1).

Supply control lines are made available by microcontroller 1600, the state of which is governed by power command instructions issued by OM through modulation of DTR. Power control Lines include scanner supply control line 504, printer supply control line 506, landline modem supply control line 510 and cellular modem supply control line 512 each drive a corresponding transistor pair which act as an on/off switch between DC input controller 117 and the related peripheral. As shown in FIG. 9, block 540, refer to Q7, Q8 and associated resistors as a representative example of a transistor pair.

Supply hold on 1614 enables the supply pass transistor Q6 so supply is maintained while power is available, corresponding with hold on 1430 (see FIG. 7).

An acknowledgement of power state change commands can be provided by microcontroller 1600 to signal back to OM that instructions have been accepted and acted upon. This could be done by connection through a serial communication port utilizing another handshake line, such as DSR or RTS. Alternatively, the DSR line, which is already under the control of microcontroller 1600, could be modulated to indicate PSTN STATE 124 and power command acknowledgement, which would affect the logic depicted in FIG. 5.

Referencing FIG. 7, universal power supply 110 typically is shown accepting an input voltage between 90VAC and 240VAC. This voltage is rectified and converted from AC input 1400 to a 19V DC output. The 19VDC output is taken through connector 1460 to charge battery 108 and further is taken through connector 1452 as an input to supply select 1490.

The 16VDC output of battery 108 is connected through connector 1480 and presented to supply select 1490, which must have at least one of 19VDC through connector 1452 or 16VDC through connector 1480.

If universal supply 110 is not connected, then connector 1452 represents zero volts. Therefore, the 16V supply from connector 1480 is utilized to power module 100. If universal supply 110 is connected, then the greater voltage being 19VDC (as oppose to the 16VDC from battery 108) is selected as the power source for module 100.

If universal supply 110 is not connected and connector 1480 represents 0VDC, then battery 108 has insufficient charge or has failed, therefore, module 100 will not function nor will notebook 102.

DC/DC converter 1500 now takes the supply voltage from supply select 1490 and further provides outputs of 9VDC 1510 and 5VDC 1520. Connector 1530 represents the ground connection of converter 1500. Modification of DC/DC converter 1500 would enable module 100 to provide a plethora of voltages compatible with the plurality of peripherals.

Charge control 1410 is derived from notebook 102 and controls battery charging related to battery 108.

Enable and hold supply 1434, with corresponding inputs wakeup 1420 and hold on 1430, determines if the system has returned from a power down or sleep mode and restores the supplies that are active according to previous requests by OM when enable supply 1436 is set to a ONE condition. This function is supported by Q5, Q6 and associated discrete components (see block 572 FIG. 9)

Figure 8:
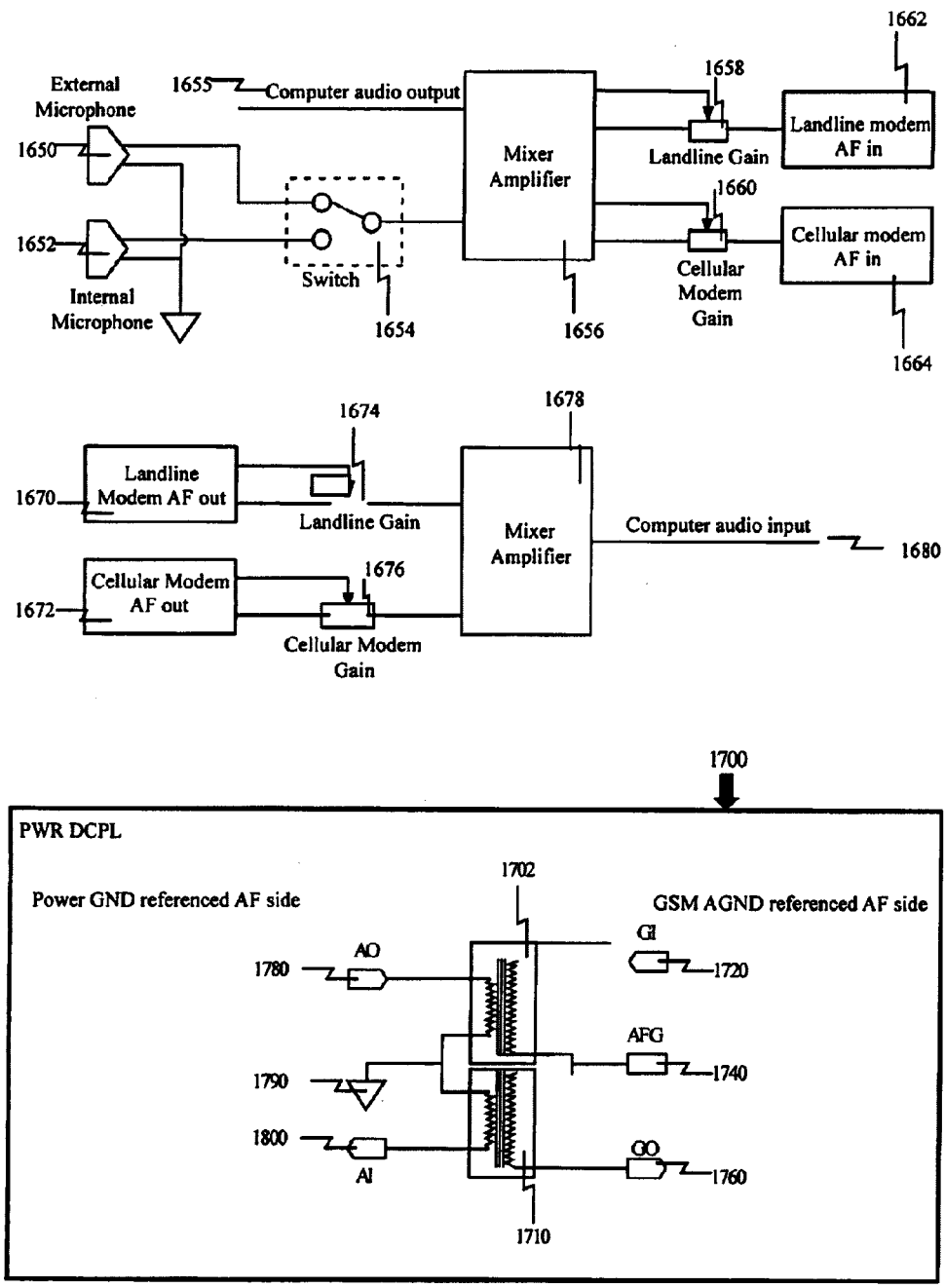
FIG. 8 is a block diagram of audio integration provided by the peripheral control module in order that audio requirements of modems and a notebook computer are matched.

As shown in FIG. 8, the term modems includes landline modem 140 and cellular modem 146.

FIG. 8 illustrates the integration of audio functionality between microphones, notebook 102 and modems. This is necessary to support full-duplex audio where any sound coming from either external microphone 1650, internal microphone 1652 (having notebook 102), or notebook 102 are mixed and presented to the audio input of modems.

Internal microphone 1652 facilitates hands free telephony but does not provide sufficient audio quality necessary for voice recognition systems to function correctly. In order to support voice recognition, external microphone 1650 is connected through a jack socket containing switch 1654, such that when external microphone 1650 is connected internal microphone 1652 is disconnected from mixer amplifier 1656. The purpose of mixer amplifier 1656 is to mix audio from the microphones with computer audio output 1655 and present these mixed audio signals to the landline modem AF in 1662 and cellular modem AF in 1664. The input level of landline modem AF in 1662 is controlled through landline gain 1658 to ensure a matching signal is provided for landline modem 140. The input level of cellular modem AF in 1664 is controlled through cellular modem gain 1660 to ensure a matching signal is provided for cellular modem.

Therefore, mixer amplifier 1656 in conjunction with landline gain 1658 and cellular modem gain 1660 collectively govern audio levels inbound to modems.

Modems also have corresponding audio outputs. Landline modem AF out 1670 is presented through landline gain 1674 and Cellular Modem AF out 1672 is presented through cellular modem gain 1676, to mixer amplifier 1678 which mixes the input audio signals and provides an output which goes to the computer audio input 1680.

Therefore, mixer amplifier 1678 in conjunction with landline gain 1674 and cellular modem gain 1676 govern inbound audio levels from the modems to computer audio input 1680.

The integration described in FIG. 8 is necessary when multiple modems are integrated with a single computer audio input and output, each modem having unique audio characteristics. Furthermore, when multiple microphones are used it is necessary to provide a switching mechanism to support microphone selection, as provided by switch 1654.

Multiple modem support can be provided by the MICROSOFT TELEPHONY APPLICATION PROGRAMMING INTERFACE (TAPI), but many modems exist which do not fully support TAPI. The only solution to this problem is an audio integration as described above.

Referring now to block 1700, an apparatus is illustrated for eliminating interference that is manifested when cellular modem 146 and notebook 102 share a common power supply, either battery or universal power supply.

GI 1720 (cellular modem audio in) and audio frequency ground AFG 1740 are connected to AO 1780 (Mixer/Amplifier 1656 in FIG. 8) and ground 1790 using transformer 1702, wound with a 1:2 ratio.

GO 1760 (cellular audio out) and AFG 1740 are connected to AI 1800 (Mixer/amplifier 1678 in FIG. 8) and ground 1790 using transformer 1710, wound with a 1:1 ratio.

The circuit described in FIG. 8 substantially reduces audio interference, which breaks into notebook 102 from cellular modem 146.

The configuration of transformers depicted will eliminate interference in any application where a cellular communication device induces interference into any connected audio device due to the sharing of a common supply.

Referring to FIG. 9, a schematic diagram showing an electrical circuit associated with module 100. To more clearly show the electrical functionality contained within module 100, areas of FIG. 9 have been highlighted using blocks such as block 540. Furthermore, as the bulk of FIGS. 2 to 8 are concerned with a detailed description of these electronics, related FIRMWARE and OM, it remains only to be shown how functionality depicted on the overview chart (FIG. 1) corresponds to the schematic configuration detailed on FIG. 9.

Cellular modem 146 is not depicted on the schematic, as this is a sealed component well known in the art, which only requires connections for audio, power and reset, all included in block 548.

Microcontroller 1600 monitors two inputs, the first being block 121 having the DTR input signal and corresponding to connector 121 on FIG. 1, and the second being block 520 having a micro-switch indicating the presence of a landline connection as detailed in FIG. 1.

When modulation of DTR occurs, the signal in RS-232 connector block 564 passes through CMOS drivers block 560 and arrives at microcontroller 1600 at block 121. Correspondingly, microcontroller 1600 decodes the modulated signal using FIRMWARE subroutines and alters the state of power control lines included in block 500 (block 500 represents a plurality of supply control lines). One of the power control lines in block 500 will be altered (i.e. changed from ON to OFF or from OFF to ON) according to the format of the modulated signal carried by DTR.

When micro-switch 520 is closed, a voltage is placed at pin 7 of microcontroller 1600 and, correspondingly, the DSR signal, in connector 564, is set at CONDITION ONE through the application of a voltage emanating from block 125 (pin 6 of microcontroller 1600).

Landline modem supply control 540 contains a pair of transistors (Q14 and Q13) and other discrete components, being an electronic switch, which is operated by pin 9 of microcontroller 1600. Thus microcontroller 1600 can place a 5V supply to modem 140 at the request of OM using DTR modulation as previously described.

The plurality of power control lines included in block 500 each has a corresponding transistor pair, illustrated as printer supply control block 542, scanner supply control block 544 and cellular modem supply block 546. Accordingly, this plurality of electronic switches can individually apply a supply voltage to its corresponding peripheral.

Block 566 depicts a connection from CMOS drivers 560 to microcontroller 1600.

Figure 10:
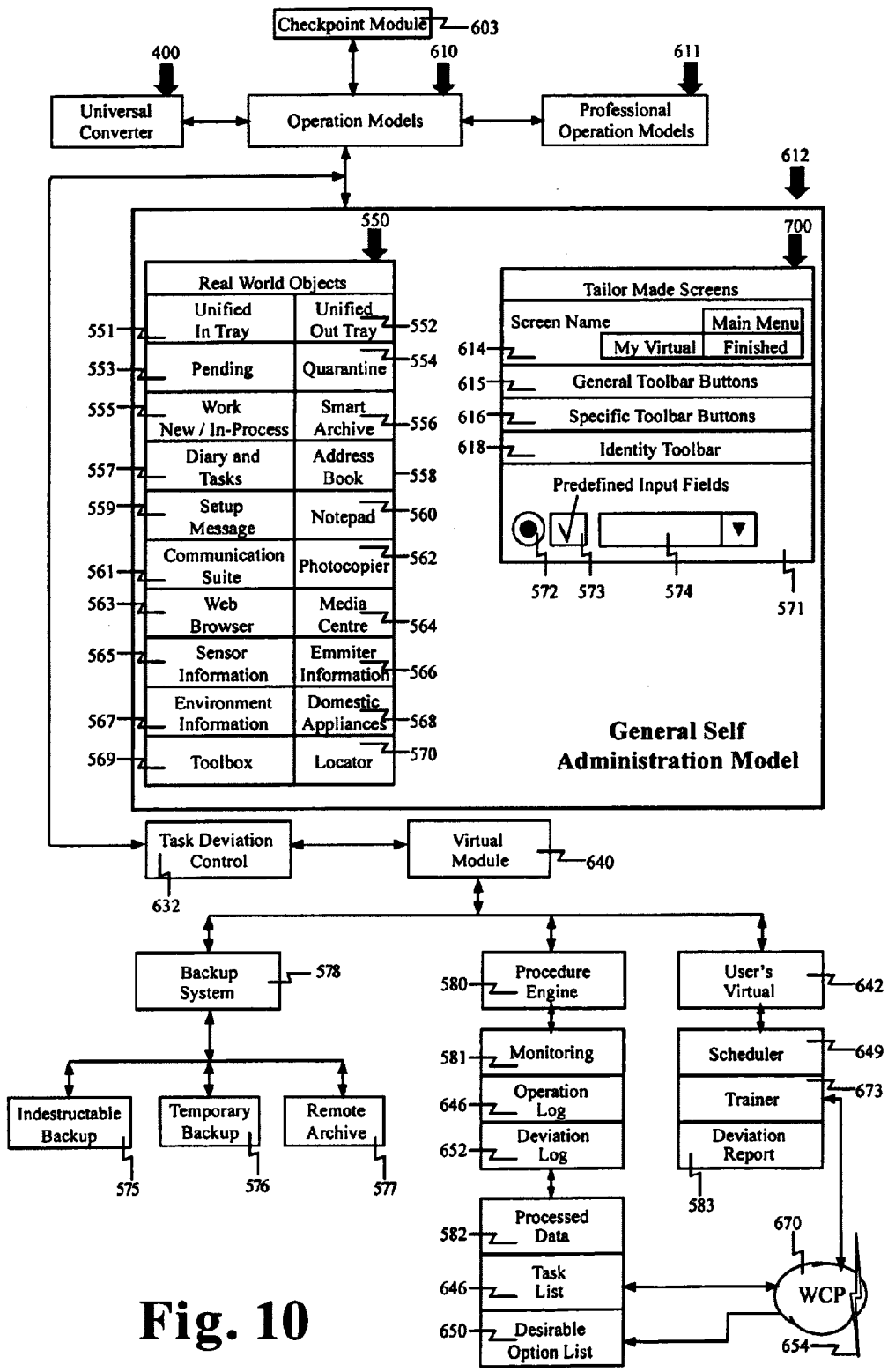
FIG. 10 is an illustration of the general self-administration module.

As shown in FIG. 10, the connections between operation models 610, checkpoint 603, universal converter 400 and professional operation models 611 is depicted.

At least one device in operation models 610 is required to communicate with virtual module 640 in order that virtual module 640 has inbound messages to record as described below.

Consequently, operation model is an abstract base class from which can be derived many specialized implementations, depending upon the design goals of the application being built or modified.

All data to and from operation models 610 is shown as passing through checkpoint module 603, comprising security checks, confidentiality checks, virus checks, data compression and encryption. The security checks are designed to validate the identity of user 600 or to authenticate persons or systems wishing to communicate with the invention or user 600, and consists of techniques including, but not restricted to, voice recognition, facial recognition, retina recognition, fingerprint recognition, security card recognition being magnetic-swipe or proximity cards, and the like. The confidentiality checks prevent user 600 from publishing or forwarding any confidential information to any person other than a contact in address book 558 marked as an authorized recipient.

Each device included in operation models 610 have bimodal communication with each other and with professional operations models 611 and virtual module 640. Operation models 610 may request universal converter 400 to manipulate incoming or outgoing information in order to render it compatible with some device, as described in FIG. 11.

All devices in operation models 610 are seen as extending each other. Functionality available in one can be made available to all, enabled in the preferred embodiment as a collection of ACTIVEX INTERFACES which allow other devices to discover the capabilities of each.

Professional operation models 611 are held in the collective of operation models 610 and therefore, extended by other co-resident devices. Professional operation models 611 corresponds with professional tools 177 (see FIG. 1) being peripheral devices required by user 600 to function in a specific professional role.

Operation models 610 are delivered with basic tasks (instinct), which are the minimum required by the user. Instinct is defined to mean preconfigured tasks stored in task list 648 which are generally required by all users of a particular device in operation models 610.

The required contract, to be adopted by any device corresponding to the invention, is defined as: a) the device will know the start and end point of any work carried out by user 600, b) the work will be translated into CFI, c) the CFI will represent constant parts of a task using the symbol B, variable parts of a task including assignments to the variable using the symbol O and item references will be represented with the symbol I, d) the CFI are emitted such that the invention can record them, e) the CFI will be accepted, such that the invention can cause the device to re-enact any previously recorded task represented as CFI, e) the device will make known to the invention which B and O are significant.

The term "significant" is defined as those B and O which dictate a method of work, in the case of B, commonly represented as verbs and specifically excluding all user actions which are considered navigation or otherwise not important to the completion of work. Correspondingly, insignificant means any B or O, which if not recorded, re-enacted or otherwise taken into consideration, with respect to a completed task, will not affect the merit or complete nature of the task. These meanings should be taken in the following context: if significant B or O are omitted, a task will be incomplete or will have a different merit, where omitting insignificant B or O will not affect the merit of a task and the task will still be complete.

When a device has fully implemented the contract, the device is fully compatible with the invention. Failure to implement any part of the contract may render the device incompatible with the invention. By fully implementing the contract, any device can be held in the collective of operation models 610, being a group of partially compatible devices, potentially capable of interoperability, extending each other, and being diverse in nature, not necessarily in the same physical location, not necessarily being purely software systems and not necessarily comprising a user interface and being a mixture of single-user and multi-user devices.

The invention honors its part of the contract by recording all emitted CFI and causing the device to re-enact any previously recorded sequence of CFI. The preferred embodiment views the contract as being with a software application used in the context of computerized administration though this is not the only use of the invention.

In CFI, significant B, significant O and I are referred to as task components. Where multiple tasks consist of the same task components, in any sequence, they are said to have the same merit; only the values assigned to task components, or their sequence differs, the task components and their number has to be the same.

For example, if a task sends a message by e-mail to a contact, then it can be changed to deliver a message by FAX to the same contact, therefore, the merit of the task is said to be "sending a message to a contact", and is not concerned with how the item is delivered, or to whom.

Non-mandatory standards, which can be adopted by any device in operation models 610 are: a) as user 600 completes work through the device, the work is disintegrated into tasks with a known start and end point, b) application screens shall set aside an area for consistently displaying toolbars, c) standard buttons will always be in view regardless of work context enabling the user to execute parallel tasks and invoke the invention's ability to re-enact tasks, d) that predefined input fields are used consistently to represent choices available to user 600 and f) that an operation model should have a corresponding WCP 670.

The core of interactivity between operation models 610 and the invention is formed around CFI and that these must conform to an agreed structure to ensure the highest degree of compatibility between interacting parties.

In most software applications, a procedure for completing a specific task is a specific combination of clicking application display buttons, selecting and entering values for input fields, combined with an existing or newly created document, being the content of a data file or data stream (item).

Compatible items is defined as data files or data streams of the same type. Task description means a verbose explanation of what a task is meant to achieve. Knowing the task description means one understands what is achieved by the execution of a task.

If a task is assumed to maintain the same merit for compatible items, then significant B and significant O will not change, where significant B are mostly verbs in the task description, all other parts of the task description are represented by insignificant B, insignificant O or I.

The first button, option or item used by user 600 to begin a task is referred to as the task initiator (TI). Many buttons in a task can often be reduced to a single command, which when initiated will complete a unit of work according to the task's procedure, without the necessity for the user to click more than once. Buttons that are frequently used during the creation or editing of an item are unlikely to accumulate.

The flexibility that the invention provides in interpreting CFI can succinctly be described by several short equations. In order to formulate equations that one ordinarily skilled in the field of computer programming can relate to, the following relationships are disclosed between equations and software terminology.

In the following equations, B and O represent only significant buttons and options and TI relates to any manner of beginning a sequence of work. B, therefore, represents any immutable information in a task, O represents any variable data in a task and I represents zero or more items of work such as documents and other information.

Option groups consists of all methods of input in predefined input fields 571, including but not restricted to COMBO BOXES and LIST BOXES.

The term $\Delta_{O1}$ relates to a specific list of values in a COMBO BOX contained in OM where only one value may be selected.

The term $C_1^{\Delta O1}$ relates to a specific field in predefined input fields 571, such as a LIST BOX contained in OM, which facilitates the selection of at least one value.

The term $\Delta_I$ directly relates to an item with a type classification specified by OM, for example, a video item, sound item or text document and the like.

Therefore, a simple procedure, being a coded form of instruction, binds together task components and can be expressed as one TI plus selections from option groups plus zero or more items:

Procedure=$TI$+$\Delta_{O1}$Option+$\Delta_I$Item

A task can consist of several option groups and several items, expressed as:

Task=$TI$+$\Delta_{O1}$Option+$\Delta_{O2}$Option+ . . . +$\Delta_{I1}$item+ $\Delta_{I2}$Item+ . . .

A more complex task will consist of multiple values extracted from a single field, i.e. a LIST BOX comprising multiple selections, e.g.

Task=$TI$+$\Delta_{O1}$Option+$C_1^{\Delta O2}$Options+$\Delta_{I1}$Item

For example, the above algorithm could be mapped to the act of sending e-mail to a recipient and copying the same e-mail to several other recipients, where:

TI corresponds to a button click, which initiates creation of a new e-mail message.

$\Delta_{O1}$ Option Corresponds to selecting one person, e.g. as the main recipient.

$C_1^{\Delta O2}$ Options Corresponds to selecting many people to be copied, i.e. CC list in e-mail terms.

$\Delta_{I1}$ Item Corresponds to the text of the e-mail including any related attachments.

The coded form of instruction emitted by OM when the act of sending e-mail is executed by user 600 would therefore, be:

$$B_1 + O1.1 + (O2.1, O2.2, O2.3) + I = 100$$

Where:

Option groups are abstracted as $O_N$ and their values are abstracted as ON.X, for example $O_2$ has corresponding values O2.1, O2.2 etc.

O1.1 Means option group $O_1$ (recipients) has been assigned value O1.1 (specific recipient).

(O2.1, O2.2, O2.3) Means $O_2$ has multiple values O2.1, O2.2 and O2.3 (all equivalent to contact names, thus forming a CC list).

Ultimately the notation for tasks comprising many option groups and items can be expressed thus:

$$\text{Task} = TI + \Sigma C_1^{\Delta O} O + \Sigma C_1^{\Delta I} I$$

Algorithmic expressions are then possible which describe many tasks being combined to form a single operation, where an operation includes at least one task and the product of one task can be presented as input to the next:

$$\text{Operation} = \Sigma \text{TASK}$$

Finally the work of user 600 being work, i.e. the sum total of all tasks, can be expressed thus:

$$\text{Work} = \Sigma \text{Operation}$$

The term "procedure" is defined as the common denominator of tasks, operations and work, and frequency, as described later, is defined as the common denominator of procedures.

An abstract Procedure, $P_N$, is simply a means of describing the way in which a task consists of task components. For example:

$$P_N(B_1 + B_2 + B_N + O_1 + O_2 + O_N + I_1 + I_2 + I_N)$$

$O_1$ through $O_N$ relate to option groups in OM, so for example:

$O_1$ is an option group called resolution 870

$O_2$ is an option group called color depth 874

$O_N$ is an option group called file format 878

CFI are formed by OM as the invention does not need to assign any meaning to the instructions emitted by OM, i.e. it does not need to know that the term $O_2$ means "CC recipients", nor that the values O1.1="Jim" and O2.2="Jack" etc.

CFI are emitted by OM when user 600 has completed a task, and are received by virtual module 640, which records them. Virtual module 640 also sends recorded CFI back to OM.

Task deviation control 632 monitors user 600 and user's virtual 642, while either is executing a task, and by referring to desirable option list 650, detects deviations occurring during the completion of a task and notifies OM (Digital Conscience).

The term "digital conscience" is defined to mean that where deviation from a predefined preference is detected, either as user 600 or user's virtual 642 execute tasks, then notification is given, and stored in deviation log 652, to bring to the attention of user 600 that a predefined constraint has been violated.

Deviation log 652, which contains a record of all deviations and applied corrections, can be used to monitor growth of user 600. Analysis of the user's frequent "deviations" can lead to tailor made training packages, which will described in detail below.

To clarify, using task modeling 630 (see FIGS. 24 and 25) allows user 600 to state preferences for selections, but though a preference is stated it is not necessarily enforced by operation models 610. Therefore, it is possible for user 600 to use values other than stated preferences and virtual module 640, by comprising task deviation control 632, has the ability to bring such "deviations" to the user's attention.

CFI must be encoded and decoded by operation model 610 and must at least be decoded by virtual module 640. Encoded means OM formulates CFI by assigning abstract symbols such as $B_1$ and $B_2$ etc. to all buttons, $O_1$ and $O_2$ etc. to option groups, O1.1 and 1.2 etc. to all values of option groups and finally assigns $I_N$ to all related items, where N uniquely represents a specific item. Decoded means that virtual module 640 must examine each task component in any received CFI using a method known as string parsing, and OM must similarly decode CFI which is received from virtual module 640 in order to re-enact any previously recorded task.

As can be seen from the above equations, many combinations of buttons, options and items can occur, but of the infinite possibilities that exist within an application, pragmatically only a small number are valid or will happen. Furthermore, abstracting button clicks, input field selections and references to data files is an efficient way of communicating information in a language independent manner. By adding abstract references together, the CFI is formulated.

String parsing can be utilized by taking sections out of strings, in this case CFI, assigning meaning to each section and acting accordingly. Acting accordingly in terms of CFI either means for virtual module 640 to count the frequency of use, or for OM means re-enacting a specific button click or assignment of a value to an option group.

WCP 670 is reached via connection 654 such that information, put there by a plurality of users 600, can be downloaded and stored by the invention or user 600.

WCP 670 includes universal tasks 674 and universal options 676 (see FIG. 12) and dynamically explores for updates to tasks 674, options 676 and corresponding OM, in order that user 600 can select the most ideal and contemporary of all possible updates in order to further personalize the invention.

WCP 670 includes common hardware related to web communication such as a RAS Server, voice cards, e-mail server, web server, database server, router, hub etc. WCP 670 can also support software modules from the invention such as universal converter 400, and virtual module 640.

WCP 670 includes at least a dial-up access server, e-mail server, Web server, database server and a fixed connection to the Web.

On Line and Automatic Technical support, through secure access to the invention's data registries, can perceive a good view of any problems encountered by user 600, which results in fast maintenance services.

All WCP 670 subscriptions, and others, such as, mobile phone connection, global Web access, IP faxing and telephony account, local telephone and fax numbers, and others are available at all times and are billed according to utilization and presented as a single invoice. The user will be notified periodically of their on-going costs.

The construction of a web communication system is within the basic abilities of one skilled in the art to provide basic database access over a Wide Area Network, which is all that WCP 670 represents, in addition to some basic services.

The invention ultimately aims to optimize all operations for all operation models 610, such that any operation can be completed by a single click or other form of initiation, therefore, the user's lifetime tasks, operations and work can be repeated by a single command. The invention does not restrict tasks and operations from spanning between different operation models 610.

Dialogs 700 keep all functions related to an operation together in one dynamic screen, making it easy to deliver the most ergonomic presentation; one screen, one click away for all basic needs of user 600.

Dialogs 700 are produced by applying non-mandatory standards comprising use of general toolbar 615 relating to all real world objects 550, specific toolbar 616 which provides functions that are specific to the use of particular real world objects 550 and identity toolbar 618 which includes specific properties related to a document or other item being worked on by user 600. Identity toolbar 618 is largely omitted from the drawings to abbreviate the discussion.

Dialogs 700 further consists of screen title 1256 and work area 617 both being dynamically configured dependent on work context. Dialogs 700 further consists of predefined input fields 571, including but not restricted to RADIO BUTTONS 572, CHECKBOXES 573 and COMBO BOXES 574.

Some dialogs 700 work with a single item, e.g. when user 600 is creating a new e-mail message, other screens like unified in tray 551 display many items using an input field known as a grid.

General Self Administration module (GSAM) 612 fully implements the contract and all non-mandatory standards which satisfies the inventions requirement for a short learning curve, and enables devices to be utilized and manipulated ergonomically by user 600.

So that user 600 can utilize technology ergonomically, GSAM 612 has friendly, voice-activated, tailor-made front ends in the user's own language. In GSAM 612, dialogs 700 are configured according to real world objects 550 and have a consistent look and feel, all utilizing the user's personal glossary. Text is preferred as oppose to pictorial or iconographical symbols.

In GSAM 612, Dialogs 700 are adapted based on a user introduction process comprising an interview, allowing it to auto-adapt and dialogs 700 to match the level of user 600, in terms of expertise and familiarity. Predefined input fields 571, when represented by LIST BOX and the like are automatically sorted, optimized and categorized. Thus, front ends will simulate the user's private and work related recent habits and environments.

GSAM 612 is a robust, reliable, comprehensive, optimized and harmonized integration of third party SDK'S and provides comprehensive editability and annotation for all manner of documents and facilitating the logical organization of the user's day-to-day communications, tasks, growth etc, while considering location and environment.

GSAM 612, conforming to operation model standards, uses consistent screen design throughout all dialogs 700 and utilizes a minimum number of overlaid windows, while consistently using the same area of screen space for toolbars.

After user 600 has logged into GSAM 612, passing layered security in checkpoint 603, a portal screen (main menu) is displayed, which reflects the current season and time of day, being a further move away from cold technology and closer to the real world environment of user 600.

GSAM 612 is designed to meet the general computerized administration needs of a wide audience, including user 600. GSAM 612 includes real world objects 550 which further includes: unified in tray 551 where all in-bound communication and notifications are stored, pending 553 where all items which require further attention from user 600 are held, work new/in process 555 permits user 600 to create a new item of work or continue working with an item which is as yet incomplete (e.g. creating a word processor document and refining it during the course of many days), diary and tasks 557 which tracks the meetings and outstanding tasks of user 600, setup message 559 allows user 600 to create a new outgoing message, communication suite 561 is a harmonious integration of all methods of communication such as e-mail, fax and telephone usage and video conferencing, web browser 563 which provides web browsing, sensor information 565 is a monitor and recorder of sensory communication such as taste and smell, environment information 567 which utilizes sensors to track the environmental conditions surrounding user 600, toolbox 569 which contains miscellaneous screens for system configuration including the personal details of user 600, unified out tray 552 which holds items scheduled for transmission, quarantine 554 which holds any problematic items identified by checkpoint 603, smart archive 556 used to organize large quantities of documents in a structured archive system, address book 558 containing all contact details of individuals and businesses in communication with user 600, notepad 560 where user 600 can store notes similar to a desktop blotter, photocopier 562 allows user 600 to scan and print documents thus making a physical copy, media center 564 harmoniously integrates all forms of computer based entertainment, emitter information 566 allows user 600 to control settings of devices in the invention and the environment which have an output that relates to a physical sense such as touch and smell or air conditioning etc, domestic appliances 568 holds details and permits control of devices owned by user 600 such as television and video recorders which are either X10 or BLUETOOTH compatible, locator 570 which discloses the actual geographical location of user 600 through the use of GPS and finally other dialogs being minor screens which GSAM 612 contains that are specialized to the type of work being executed by user 600.

Within the specific context of GSAM 612, real world objects 550 relate to the normal day-to-day objects found in the work place and home of user 600. GSAM 612 is optimized for the purposes of efficient computerized administration. Therefore, real world objects are similarly found to be related to administration, as can be seen from the use of terms such as "in tray" and "out tray", terms which would be recognized by all office workers.

GSAM 612 includes communication module, which interacts closely with peripheral control module 100. Through utilization of communication module and universal converter 400, user 600 can receive any communication item, from any of the plurality of peripherals which corresponds with unified In-Tray 551, with the ability to convert it to any other format of communication item and send it to multiple physical devices in any other location along with any new work items, as well as transparent rerouting of incoming communications to alternative devices such as answering machines and auto fax-reception contained in GSAM 612.

Communication Suite, comprising Standard, IP, PC-to-PC telephony and point-to-point video conferencing, places all related data and information within one click encouraging the user to utilize cheap contemporary communication. Communication costs are reduced by automatically using IP telephony and faxing as well as reduced telephone rates.

Media Center includes a single media browsing interface, which allows easy perusal of Web data, audio and visual streams, such as TV, Radio and newspapers as well as entertainment devices such as CD player, DVD, etc.

Set-Up Message includes scanned letterheads (digital letterheads) and signature to enable color faxing by using e-mail transmission, Web browser connected to multi-search engine that resides on the corresponding WCP 670, a proprietary smart archive backed up by a remote archive, address book that automatically extracts all new addresses from in-tray documents, diary and notepad.

Other features include environment information icons, toolbox, which further includes a calculator, which automatically is updated for currency rates.

Location controller synchronizes with one click, all application settings corresponding to any new location, including settings for global web access, routing of international outbound faxes and national and international telephone prefixes.

GSAM 612 is one device in the collective operation models 610, being an example of a single operation model. GSAM 612 includes basic tasks as its instinct, to satisfy the needs of the average user.

All information created or received by GSAM 612 is stored in smart archive 556.

GSAM 612 exposes activities of user 600 to the invention as CFI, where the activities consists of many tasks carried out involving the creation and manipulation of items, communication and leisure. The aforementioned will typically include tasks such as writing letters, creating video recordings and watching streaming television broadcasts from the Web. These diverse tasks when carried out in accordance with an operations model will result in the build-up of information recorded by the invention in operation log 646 (See FIG. 12).

GSAM 612 is a multi-function software application and can be formed by integrating components, often referred to as ACTIVEX components, such as TXTEXT control, FARPOINT SPREAD control and the like, all of which form core modules in any data processing application.

The information included in virtual module 640, being tasks, options and the like, is built up over a period of time (possibly a lifetime) and must therefore, be protected as it is potentially beyond reconstruction if damaged. Therefore, a multi-backup approach is utilized by the invention and managed by backup system 578, operating under the control of user 600 and virtual module 640, and which routes data to indestructible backup 575, temporary backup 576 or remote archive 577.

Indestructible backup 575 is a device for making backups of the black box, producing an exact copy of all dynamic information stored by the invention, and corresponding to CD-ROM, CDRW, tape backup and the like.

Temporary backup 576 contains only the data, which has been changed since the last backup to device 575. Data for temporary backup 576 is typically placed on a high-speed, possibly portable device, e.g. MP3 players and developing credit card sized wireless connected memory devices, which are all suitable candidates for temporary backup data storage. Remote archive 577 can be facilitated by WCP 670 as a location where data can be stored at a distant location away from the invention. This is often referred to as remote storage and can utilize communication methods such as FTP in order to move information between geographically divers locations utilizing the Web.

The invention includes a harmonized, robust and reliable integration of the following main elements being OM, a corresponding WCP 670 and any hardware capable of supporting at least OM coupled with virtual module 640, such as a PDA, desktop computer, notebook 102 and the like. OM and virtual module 640 may also be deployed as a multi-user system existing on a network, Web server, mainframe or other forms of single/multi-user computerized system.

As user 600 utilizes any OM such as GSAM 612, CFI are emitted to virtual module 640 which includes backup module 578, procedure engine 580 and user's virtual 642.

Tasks executed by user 600 and user's virtual 642 are constantly and seamlessly monitored and recorded to save an authentic, chronological digital copy of the lifetime work of user 600 contained in operation log 646.

Virtual module facilitates the utmost dynamic, auto-adapting, auto-optimizing and auto-personalization features for any OM.

Monitoring 581 registers all tasks executed by user 600 or virtual 642, together with related task components, in operation log 646. Documents and other forms of information are archived by the relevant OM and are backed-up under the control of virtual module 640.

Deviation log 652 contains notifications from deviation control 632.

Any other information and data such as what user 600 has done and has learned as well as the style and schedule used in carrying out each task are extracted by procedure engine 580 from operation log and dynamically sorted according to frequency of use, optimized and stored in task list 648.

Figure 21:
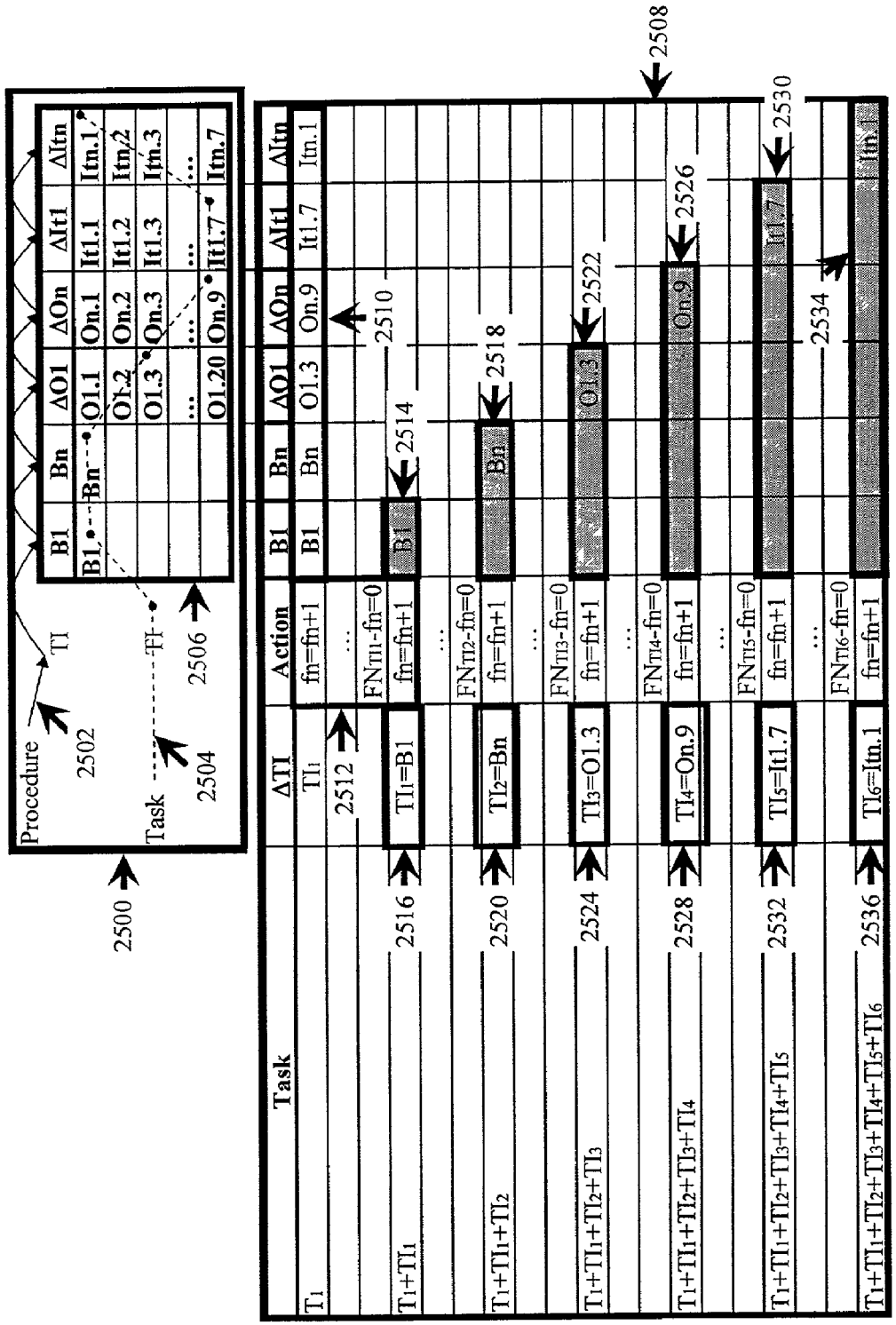
FIG. 21 is an illustration of a typical task list.

Processed data 582 analyses operation log 646 and copies frequently used tasks into task list 648 (see FIG. 21).

Figure 13:
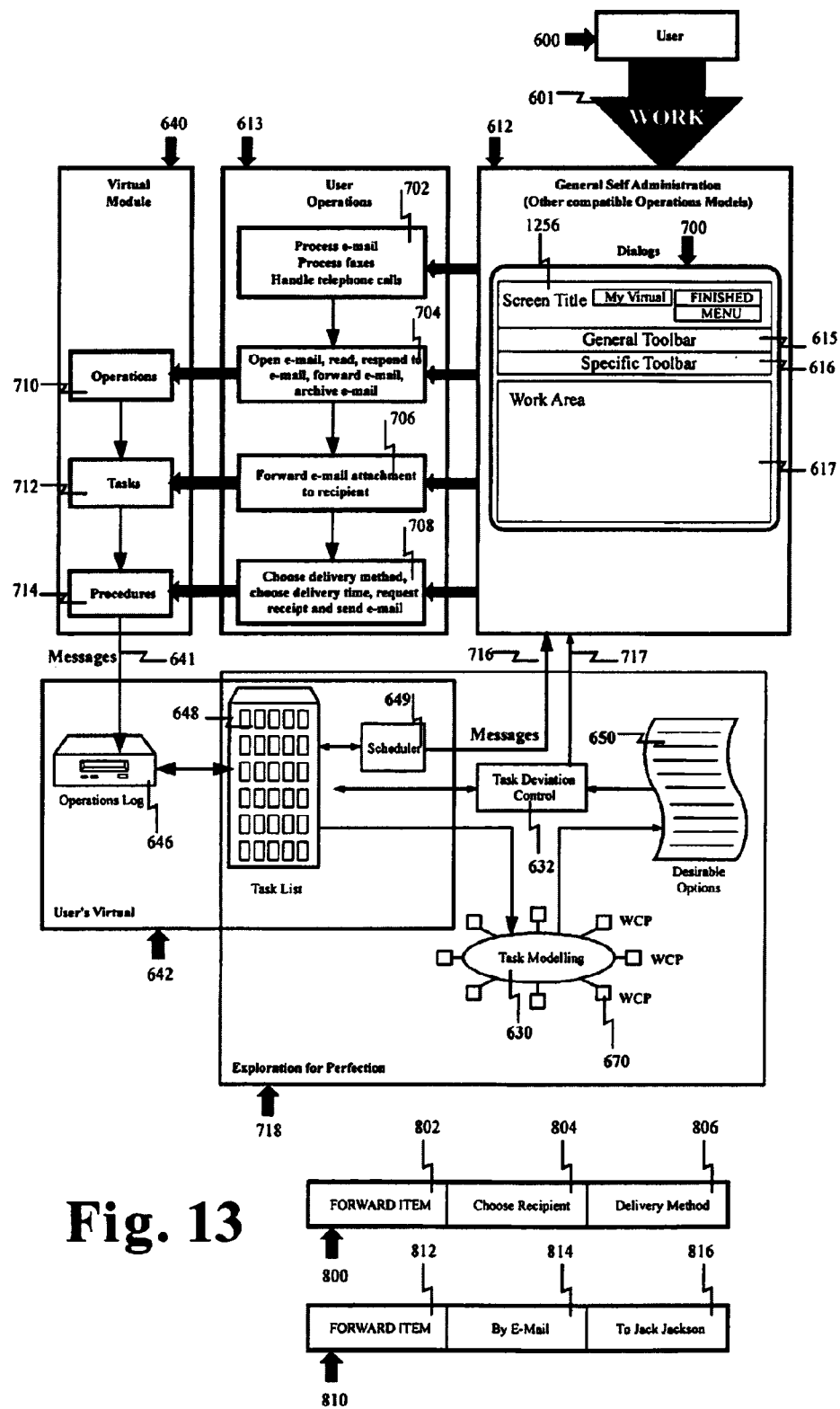
FIG. 13 is an illustration of the functionality within the virtual module.

Desirable option list 650 is populated by task modeling 630 (see FIG. 13).

User's virtual 642 is the digital representative of user 600 (see FIG. 12) and utilizes scheduler 673 in order to re-enact tasks automatically at set times or according to set events occurring in OM. Trainer 673 assists user 600 with teaching materials corresponding to information arising in deviation report 583 which is based on notifications listed in deviation log 652.

The basic purpose of OM is to be able to monitor and copy the actions of user 600, such that the actions can be replayed, substantially automatically repeating any work performed by user 600. The subsequent diagrams distinguish between the rigidity of macros and other existing art and the present invention.

Referring now to FIG. 11, the flow of information is shown via universal converter 400.

One goal of universal converter 400 is to empower OM with the widest available spectrum of communication where sensible and feasible. When user 600, defined as the sender, wishes to communicate with other parties, defined as receiver, incompatibilities may occur. Sender and receiver both have a preference for the form of communication they utilize, however form is sometimes governed by the content of the to communication. For example, it is not sensible or feasible to try and send a sound by facsimile machine. However, it is sensible and feasible to translate received facsimiles into text and have them read by a speech synthesizer, as is common for blind users. The novelty of universal converter 400 is that it makes many more conversions possible by linking conversion processes together, where the output of one conversion process becomes the input of another conversion process. These conversion processes can be chained in many ways so long as any output has at least one compatible input.

FIG. 11 now illustrates that input 402 having an input type 404 can by some means be converted to output 406 through the utilization of universal converter 400.

Universal converter 400 is a module, which permits computer data to pass through a plurality of processing stages. The processing stages can involve typical information processing activities such as language translation, data format translation (e.g.: WORD to WORDPERFECT document translation), virus scanning and a diverse collection of web based services.

The utilities are described in abstract terms to illustrate the possible use of a wide variety of prior art. Universal converter 400 has the principal aim of acting as a conduit for a disparate and substantially incompatible group of devices.

As embodied, converter 400 utilizes MICROSOFT ACTIVEX technology to bring together conversion utilities, which expose COM INTERFACES and other methods of controlling software. Converter 400 could operate through non-ACTIVEX technologies using techniques such as WINDOWS MESSAGES, SUBCLASSING or JAVA ROBOTS, all of which provide the potential to control another application, which is a separate entity to that which includes converter 400.

Universal converter 400 includes a group of conversion utilities A 410, B 412, C 414 and D 418. Each of the conversion utilities has at least one input and at least one output, therefore, having the potential to convert from one known information type to another. The utilities, while being illustrated as a means of converting information, also include utilities such as spelling checkers, content filters and the like, as universal converter 400 acts a conduit allowing the user to leverage a disparate collection of utilities in order to achieve the goal of gaining information in a desired format, with a desired content.

Information is defined as any form of computer data or real world artifact such as sound, print media or visual media and the like which can be reduced to binary format. Format as used here is defined as a specific structure imposed on Information such that modules wishing to interact with the Information will have knowledge of the content and its layout. Content is defined as meaning Information contained within a file or group of files, which can be subjected to conversion, and filtering. The term "Conversion" is defined to mean when Information is changed from one type to another, such as spoken word being changed to text. The term "Filtering" is defined as the selective elimination of certain Information, obvious forms of this include VIRUS SCANNING and the removal of profanity from messages, which may originate from the Web.

Conversion utility A 410 has two inputs, namely T1 420 and T2 421 and has a corresponding output of T3 424. Ergo, T1 420 and T2 421 can now be converted to T3 424. The abstract terms (being T1, T2 and T3 etc.) will be related to real world information types and the conversion utilities A 410 and B 412 etc. will be related to existing art which converts the known forms of information.

A sparse network 419 is formed by connecting compatible outputs with compatible inputs. The term sparse network is used as "orphan" connections can occur such as that which exists between T4 440 and T8 442, where no other connected inputs and outputs are found other than that provided by conversion utility C 414. If another party develops a conversion from T2 421 to T4 440 then the previously "orphaned" converter C 414 will become part of the larger network, rather than operating in a stand-alone fashion.

Universal converter 400 is extensible, meaning that it can discover new conversion utilities as they become available, due to the fact that each corresponding conversion utility is described in an associated database, such as the MICROSOFT WINDOWS registry. When the universal converter begins execution, it reads the details of all available conversion utilities, taking note of the input and output types that are processed by each conversion utility. The sparse network 419 is gradually formed, e.g. conversion utility A 410 has an output T3 424 which is connected to conversion utility B 412 having a compatible input of T3 424, and so on until all conversion utilities have been read from the database and interconnected where possible.

Connector 422, connector 426 and connector 430 all represent conversion processes where an input is converted to a different form and presented as an output which can move forward still further through the conversion process.

Now, to relate this to real world examples, conversion utility A 410 is now assumed to be a speech recognition tool such as DRAGON NATURALLY SPEAKING, which converts spoken word to text. It is assumed that this speech recognition process occurs using the English language. Type T1 420 is now named as "voice" and output T3 424 is now named as "text in English"; conversion utility A 410 therefore, converts speech to English text. The sparse network 419 illustrates T1 420 being connected to T3 424 through conversion process 422, the aforementioned voice to text in English conversion. Type T7 428 is now named as "text in German" and can be reached through conversion utility B 412 where channel 426 represents the conversion from text in English to text in German. Type T9 432 is now named as "synthesized voice", which is a known utility that converts text to speech using a device known as a speech synthesizer, e.g. as provided by MICROSOFT AGENT. Channel 430 now represents the translation process from German text to synthesized voice using conversion utility D 418. Therefore, as described, English speech received by sparse network 419 is now output as German speech using a network of conversion utilities.

Language translation features are supported by software utilities such as MULTILIZER and VISUAL RESOURCE TRANSLATOR. Similar functions are also provided by web sites such as WWW.BABELFISH.COM. All this prior art is recognized and can become a conversion utility, similar to those labeled as D 418 etc. The method illustrated through FIG. 11 should not be taken to be those specific translations etc, but rather the method provides the potential for all known methods of translation, conversion and data manipulation to be brought together in one dynamic framework where all data incompatibilities can be substantially eliminated.

For example, one device known in the art, being a specific resource provided by ALTAVISTA, is WORLD.ALTAVISTA.COMTR?DOIT=DONE&TT=URLTEXT. This device as it existed on 8 Jun. 2001 was able to convert English text to Spanish and vice versa, English text to French and vice versa, however no conversion from Spanish text to French text appeared to be available. Therefore, the preferred embodiment of universal converter 400 was extended to make two executions of the aforementioned URL in order to convert French to Spanish and vice versa. The steps used were to first convert French to English then English to Spanish, thus facilitating a translation from French ultimately to Spanish, a feature which was not provided by the resource as supplied by ALTAVISTA. It is recognized that some loss of sensibility occurs when such translations are executed repeatedly; however the purpose of universal converter 400 is to simply facilitate such conversions, not to judge the quality of output. In tests executed utilizing the aforementioned steps, universal converter facilitated an on-line chat using the Web where one speaker only spoke Spanish and the other spoke French, and as described no translation was available using the specified Web based resource.

This illustration is simply used to point out that diverse translation and conversion methods using the invention can involve convoluted routes from source to destination and the users do not have to be aware of this fact. The user simple provides an input and specifies a desired output. In other words, during conversion, sparse network 419 may often use several intermediate conversion steps in order to achieve the goal specified by the user.

It is known that a diverse range of conversion utilities exists for use by computer software developers, including COMCACHE FILE CONVERTER SET, which facilitates translation of data files, e.g. MICROSOFT WORD to WORDPERFECT and MICROSOFT EXCEL to LOTUS 123. Other utilities such as DOC2HTML convert MICROSOFT WORD to HTML format, commonly used in web pages.

Simple conversion utilities can be embodied by using MICROSOFT VISUAL BASIC to develop ACTIVEX DYNAMIC LINK LIBRARIES (referred to as DLL's or ACTIVEX OBJECTS) in conjunction with aforementioned prior art to form numerous conversion utilities shown in the group comprising converter A ACTIVEX 453, converter B ACTIVEX 454 and converter C ACTIVEX 455.

These conversion utilities are then registered for use in sparse network 419, which can be built using known methods called MAPS or TREES which are populated by reading entries from the MICROSOFT WINDOWS REGISTRY created by each conversion utility when it is first installed on a computer system.

Universal converter 400 can then be embodied as a further ACTIVEX OBJECT, universal converter object 452, which collects the conversion utilities and forms the sparse network 419.

Universal converter 419, when embodied as an ACTIVEX OBJECT, is then known to function with numerous third party platforms such as web servers, which can support ACTIVEX controls using web server pages 450, or any package supporting VISUAL BASIC FOR APPLICATIONS or the ACTIVEX standard.

It can now be seen that many types of information can act as input forms and be delivered in new output forms, and that by utilizing diverse output utilities such as speech synthesizers, fax, telephony devices and the like, numerous incompatible devices now become compatible. Further known conversions are emerging such as gesture recognition, where a user utilizes a camera connected to a computer system to translate hand gestures to text. The universal converter, as demonstrated, can then the hand gestures to written text, for example. As long as the gesture recognition system is feasible, it can be used an "input" to obtain a desired "output".

The MICROSOFT ACTIVEX framework promotes the defined extensibility of universal converter 400 and the reusability of such ACTIVEX OBJECTS in many supporting applications, development environments and hardware platforms.

Other platforms differing from MICROSOFT WINDOWS provide similar features through techniques known as dynamic loading or libraries.

Conversion utilities may exist on geographically widespread computer servers creating a "client/server" architecture, which supports conversion requests from diverse locations, such as, that embodied as a web browser and web server.

The conversion process can occur as a single coherent transformation in real time, or can be executed in steps with each step occurring potentially on different computers with time delays between each step.

The entire conversion process can be speeded up by parallel execution, where multiple conversion processes are used in a linked manner, where it is only necessary for partial completion of a step in order for the next step to begin, using a buffered approach.

Batch conversions, where a single input is simultaneously converted to many outputs, are an optimal use of the conversion process, as any repetitions of initial conversion steps, common to each target output format, can be eliminated. For example, T1 is to be converted to outputs T10, T11 and T12 and to get to output some intermediate conversions are required through T2, T3 and T4, ergo to get from T1 to T11 requires conversions of T1 to T2, T2 to T3, T3 to T4 and finally T4 to T11, similarly to get from T1 to T12 requires T1 to T2, T2 to T3, T3 to T4 and finally T4 to T12, so this batch of conversions can be viewed as T1 to T4, a process that occurs only once, then a series of conversions of T4 to each of T10, T11 and T12. Furthermore, as disclosed, the conversion of T4 to each of T10, T11 and T12 can be executed substantially simultaneously.

Figure 12:
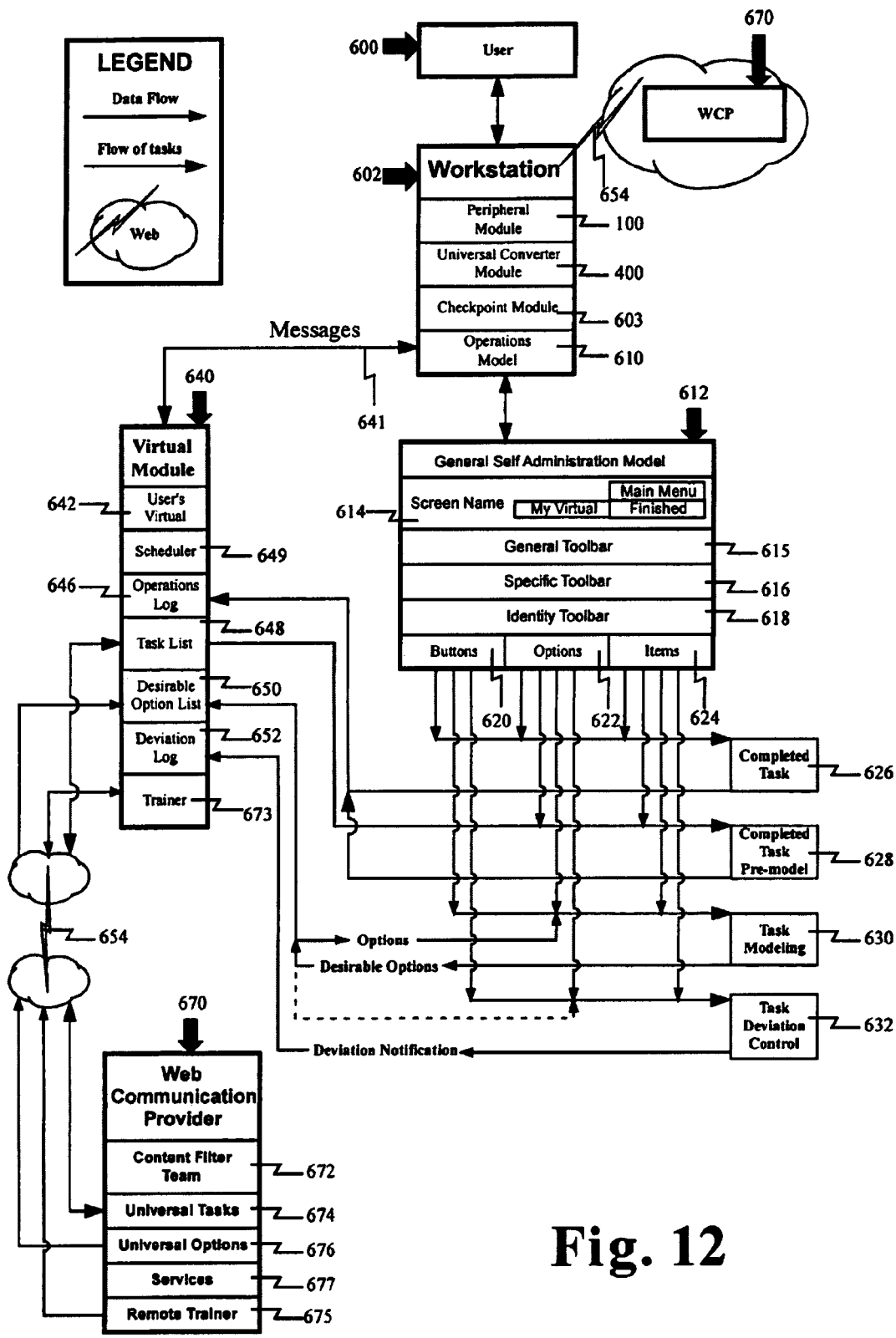
FIG. 12 is a diagram depicting an overview of the virtual module interconnected with related software and systems.

Referring now to FIG. 12, an overview of interconnections between the modules of the invention is shown.

Workstation 602 is extendible to perceive and amplify the same senses as user 600, to empower user 600 as well as to increase the awareness of user 600. The invention maintains seamless connectivity with the user to facilitate a secure recording of a true digital copy of completed tasks (T) in operation log 646. The invention together with plurality of corresponding WCP 670 forms a harmonized digital environment (HDE) that acts as a digital incubator for the user's virtual 642.

HDE is defined as a plurality of interconnected devices capable of communicating via use of CFI, basically forming a simple protocol by which intercommunication is possible by a diverse collection of software, hardware and individuals.

The term "digital incubator" as used means a HDE that supports the growth of user's virtual 642.

All information and data to repeat a task, through the use of its related procedure, being the sequence of clicking application display buttons 620, selecting from predefined input field values (options 622) and using a created or extracted document and its properties (items 624), and can be extracted from operation log 646, also revealing the user's schedules and related environmental data.

The term "item" means any item 624, i.e. any piece of work that has been created or acquired by user 600.

T can be re-enacted at any time by repeating the same procedure utilizing the task components, which represent the ability and style of user 600. Tasks and similar tasks, which consists of compatible task components, can be re-enacted based on a schedule by user 600 or the user's virtual 642.

The invention also searches universal tasks 674, contained in WCP 670, to facilitate the needs of user 600. Furthermore basic tasks, contained in OM are upgraded in task list 648 by automatically bringing new versions from universal tasks 674.

Through pragmatic analysis of operation log 646, based on the number of times that tasks have been repeated (revealing a frequency), the invention automatically sorts and indexes them in task list 648, where an indicative name is assigned to each, which is related to the task components.

The black box contains all dynamic data stored by the invention. User 600 can connect to and communicate with a community of other users of the invention, a virtual world where all talents are expressed in CFI and can gain direct access to any one's Black Box or any plurality of other users via access to a plurality of WCP 670, when permission has been granted.

The term "virtual world" means a plurality of users 600 represented in digital form on WCP 670 or the black box.

Each task can be reduced to a unique determinant number (DN), containing all of the information and data about the task. Digital Determinant Numbers of all of the user's tasks can be further reduced to one unique number referred to as DDNA, which is stored in the black box.

Tasks can be disintegrated to smaller segments by identifying a next lower level of initiator. Initiators can be narrowed to an infinitesimal low level to simulate the formulation of "digital genes", which are the units of DDNA (see FIG. 23).

Digital genes are the smallest unit where a useful initiation causes a work-step to be completed. As such larger structures can then be built from digital genes.

User 600, having vast access to all the history of the World, through exploration of the WEB, universal tasks 674, universal options 676 and being inspired by selected mentors, constitutions, or by consulting with their elected digital parliament can set priorities and constitute sets of educated options, in relation to tasks in order to move towards perfection and experience ultimate excellence. The term "digital parliament" is defined as a collection of at least one mentor represented digitally by content in universal tasks 674 or universal options 676. The term "constitutions" is defined as a predefined configuration, which can reduce the number of options visible when user 600 is working.

Thus, user's virtual 642 can, when supported by WCP 670, compare and decide the known best next step along the line of evolution for any task. At this stage, user's virtual 642 could be asked to complete tasks that have not been previously completed by the user, i.e. have no current point of reference within the black box of user 600.

User's virtual 642, by exploring the World through WCP 670 has the capability to interact with other virtual intelligences (artificial intelligences and the like) or human intelligence, in order to evolve, duplicate itself, age data or regress data.

The term "evolve" as used herein means that user's virtual 642 acquires additional information from universal tasks 674 and universal options 676.

Age data and regress data is defined as a form of modeling where conditions captured in operation log 646; task list 648 and desirable option list 650 are modified according to known or predicted conditions.

Ultimately, the invention includes all disclosed modules and models to automatically formulate user's virtual 642, which resides in a digital incubator and is therefore, able to evolve. Thus the abilities, styles and schedules of user 600 are enabled to exist and evolve indefinitely and user's virtual 642 will become substantially enduring, being able to observe and comment, while carrying forward the "essence" of user 600. The term "essence" of user 600 as used here means the data which has been captured in operation log 646, task list 648, desirable option list 650, deviation log 652 and other data related to documents and information created or acquired by user 600 during use of the invention.

Thus, the sum total of information that can be captured from a user is their total output correspondingly becoming input to the present invention. The output when captured and recorded forms a "digital autobiography", which forms the basis for a digital representative to be able to substitute user 600.

Referring to FIG. 12, user 600 may use the invention through means of a suitable user interface. The user interface can be contained in any device such as a Personal Digital Assistant (PDA), Personal Computer (PC) such as a desktop or laptop computer, or smart mobile telephone and the like, web server, network server and other distributed systems, all being devices which can support virtual module 640.

User 600 may also use Workstation 602, a device comprising peripheral module 100 (see FIG. 1), universal converter 400 and a software application referred to as operations model 610, exemplified by GSAM 612. Workstation 602 therefore, depicts, as described on FIG. 1, a laptop computer and a plurality of input/output peripherals, all of which benefit from integration with the invention.

Workstation 602 also has the ability, like any modern computing device, to connect to the World Wide Web (WWW) and interact with WCP 670.

Services 677 consists of all subscriptions corresponding to the invention, such as an e-mail account, mobile telephone connection charges and the like, technical support contracts, data storage facilities and other on-line services offered to user 600. Illustrative examples of services 677 are NET2PHONE, for voice over IP communication, global web dial-up access, provision of a SIM CARD and mobile telephone number, subscriptions to information services such as stocks, news and software updates and the like.

Work area 617 includes user interface components referred to as buttons 620 and options 622. Dialogs 700 assist the user in production of documents and other forms of work referred to as items 624. Items 624 represent any output from a software application, which can be represented by a data file or data stream.

Options 622 consists of a plurality of predefined input fields. Messages 641 consists of the CFI related to the use of task components.

Messages 641 flow to module 640 from OM enabling the work of user 600 to be recorded, such that some sequences of work can be automatically re-enacted. Messages 641 enter virtual module 640 through procedure engine 580, an analytical system that categorizes information contained in messages that relate directly to task components.

Messages 641 are collected to form user's virtual 642, a plurality of data stores comprising operations log 646, task list 648, desirable option list 650 and deviation log 652.

Virtual module 640 exists to achieve as much automation as possible for any given task. "Automation" is defined as the automatic execution of any task by user's virtual 642, a module which includes schedule 649 (see FIG. 13) such that any task, in task list 648 or operation log 646, can be automatically executed, preferably with no further interaction from user 600.

Automation increases as default values are found for inputs contained in a task, as the number of inputs from user 600 decreases the level of automation correspondingly increases. The level of automation is inversely related to the amount of manual interaction with user 600. If all manual interaction has been eliminated, a task has reached 100% automation.

Partial automation means a task, which requires some kind of interaction with 600 in order to complete. Full automation, or 100% automation, means no interaction is required with user 600 in order for a task to complete.

Operation log 646 is sequentially populated with messages 641 contained in a complete unit of work, i.e. completed task 626. Any messages 641 contained in a task which is incomplete, i.e. abandoned by user 600, are discarded.

Activity related to task components collectively form completed task 626. Completed task 626 is, any task which user 600 can complete through the use of OM.

An example of completed task 626 (T) is illustrated by describing a task, which includes the steps for creating a video clip referred to as $T_1$. A further example is then illustrated by introducing $T_2$, a task that includes the steps of forward video clip by e-mail to a recipient. T1 and T2 are described in detail in FIG. 21.

The CFI of $T_1$ is also represented by messages 641 recorded in operations log 646. If user 600 consistently repeats the steps contained in creating a video clip then $T_1$ is the to have occurred many times, as a substantially identical copy of $T_1$ is emitted by OM each time it is executed.

Each reuse of a task is referred to as completed task pre-model 628, a term which describes the re-enactment of a task as originally recorded by user 600, without any optimizations having been applied.

As illustrated in FIG. 12, uses of completed task pre-model 628, like all task executions, are continuously recorded in operations log 646.

It should also be noted that it is possible to have a task, which has no related items 624. For example, when user 600 telephones a colleague, a dialog facilitates telephone calls by selecting a contact from an address book and choosing a location (e.g. home or mobile), there is no related item (e.g. document, photograph, etc.) involved in the telephone conversation. Similarly, it is possible to have a task that has no related option groups, for example a button, which simply switches off the system would have no option groups or items.

Repetition of any variable data related to a specific task triggers a review process where user 600 is encouraged to utilize task-modeling 630. The invention is designed to encourage user 600 to improve as oppose to simply existing habitually. This is achieved by bringing user 600 to discover better values for options 622. Better values means optimal choices for options 622 related to a specific task. For example, if user 600 is e-mailing video clips to friends, then using low resolution video would be better than high resolution video as the e-mail would be transmitted and received more rapidly.

Task modeling 630 is therefore, included as a means of providing statistical information, i.e. the frequency of tasks and their values for options 622 and items 624.

The statistical information will make obvious to user 600 any pattern of consistently using certain values for options 622 when executing a specified task. Task modeling is described in further detail in FIG. 22 onwards.

When task modeling 630 is complete user 600 is able to specify preferred values for tasks, known as desirable options and these are stored in desirable options list 650.

Deviation report 583 (see FIG. 10) is produced in order to inform user 600 of the context of all deviations. Notifications can also be brought to the attention of user 600 by OM as they occur.

Trainer 673 interacts with remote trainer 675 in order to acquire tailor-made training for user 600. If OM, by means of analyzing operation log 646, detects lengthy tasks which meander around OM, or user 600 is detected to be frequently canceling work or otherwise is experiencing some detectable form of difficulty then OM can instruct trainer 673 to locate training material which most likely is available on WCP 670 which corresponds to the OM in use. As the OM in use changes, so the WCP 670 is likely to change, therefore, trainer 673 will locate corresponding remote trainer 675 to find the best support for user 600.

Communication link 654, facilitated by OM, permits user 600 to bring additional recorded tasks to task list 648, where they are made available for immediate utilization. Additional options may also be brought to desirable option list 650. This enables a plurality of user 600 to share information and expertise in a manner, which utilizes a defined protocol, something that is only just beginning to emerge in today's WWW.

Universal tasks 674 resides on WCP 670 as does universal options 676, both of which are a catalogue of all information published by a plurality of user 600. Universal tasks 674 and universal options 676 benefits from being monitored by content filter team 672. Team 672 is known to be required in order to prevent some forms of duplication and to facilitate accurate translation of options amongst a plurality of languages and locales, and to further optimize universal options 676 so that universal tasks 674 represent "best practice" for completing any task in a specified manner, again sensitive to locale.

FIG. 13 illustrates the flow of information from user 600 through to task list 648, and then highlights the loop of constant improvement in the search for best practice for any given task.

User 600 completes work 601. In the modern office environment, this typically involves use of workstation 602, a computing platform used to provide access to operations models 610. Operation models 610 is any software compliant with the invention.

General toolbar 615, specific toolbar 616 and identity toolbar 618 are dynamically configured according to the context of work, i.e. if working with a video clip, the application toolbars will be configured differently than if working with a scanned document.

Work area 617 includes predefined input fields 571. Work 601 is completed through specific instances of dialogs 700 that facilitate specific user operations 613. FIG. 13 uses block 702 to show the abstract types of operation that user 600 will normally perform on a daily basis, such as processing e-mail, faxes and telephone calls. The sum of user operations 702 can therefore, be referred to as work 601.

Block 704 indicates that the current work context of user 600 is being exemplified as processing e-mail, which typically involves opening and reading e-mail, responding to e-mail, forwarding e-mail to colleagues and archiving e-mails which are important to user 600. Block 704 being a specific operation is therefore, a specialization of block 702.

Block 706 closes in on the detail of the operation described in block 704 by highlighting a smaller unit of work referred to as a task. Processing e-mail 704 includes smaller units of work that are executed by user 600. Here, FIG. 13 shows one such task to be forwarding an e-mail attachment in block 706.

Block 708 reduces this act still further by illustrating what user 600 must do within OM in order to forward or send any e-mail, and this includes setting options for delivery method, in this case e-mail, delivery time (e.g. e-mail can be sent after 6PM), requesting a receipt (e.g. when the recipient has opened and read the e-mail), and all this is in addition to selecting the recipient of the mail.

Messages 641 flow to virtual module 640 as block 702, block 704, block 706 and block 708 are enacted. Correspondingly, virtual module classifies the messages as being having operations 710, tasks 712 and procedures 714.

If task 800 is executed many times with the same values as depicted in task 810, then all values in task 810 can be assumed as default values, such that user 600 no longer has to select them.

In the case of task 810 100% automation is possible, meaning it can be re-enacted without further intervention from user 600, as all input values are known.

FIG. 13, therefore, shows that schedule 649, contained in user's virtual 642, can be utilized to automatically trigger the execution of any operation or task contained in task list 648. In fact, schedule 649 can be utilized to automatically trigger the execution of any content contained in operation log 646, which is compatible with task list 648. Schedule 649 is known in the art as an automated diary or watchdog, which fires events according to a specified time or system event. Connector 716, therefore, represents the flow of messages 641 from user's virtual 642 back to OM.

For example, schedule 649 can execute task 810 at 7:00 am every morning, or when an event occurs, such as the arrival of e-mail messages. User 600 could, therefore, formulate a rule such that whenever e-mail arrives, it is forwarded to Jack Jackson 816 as described in task 810. Events are utilized by OM in order to provide increased automation for user 600.

Moving now to block 718, this indicates the user's constant search for perfection, meaning that the efficiency of any task can be improved through periodic use of task modeling 630.

The user interface of task modeling is completely under the control of the related operations model 610, therefore, is not shown in the figures, but the features are simple to understand.

Task modeling involves selecting any task and exploring for the most optimal values according to the wish of user 600. User 600 may be a novice user and, therefore, will often lack the knowledge as to which combination of values for options 622 is best in the context of a given goal, such as saving money or saving time.

Once optimal values for options 622 have been acquired from task modeling 670, they are stored in desirable options list 650, from where they can be extracted as a default value for corresponding options 622. As block 718 indicates, the cycle can continue indefinitely as trends alter and new values become available through WCP 670.

Task deviation control 632 monitors use of task list 648 and operation log 646 and if deviation from desirable options is detected notifications are fed to OM, as indicated by connector 717.

The use of dialogs assists in the capturing of user actions which are the basis of task recording. The recording results in databases being populated over a prolonged period of time, without the user needing to being or end the recording process, which actually never ends as long as the present invention has sufficient storage capacity.

Figure 14:
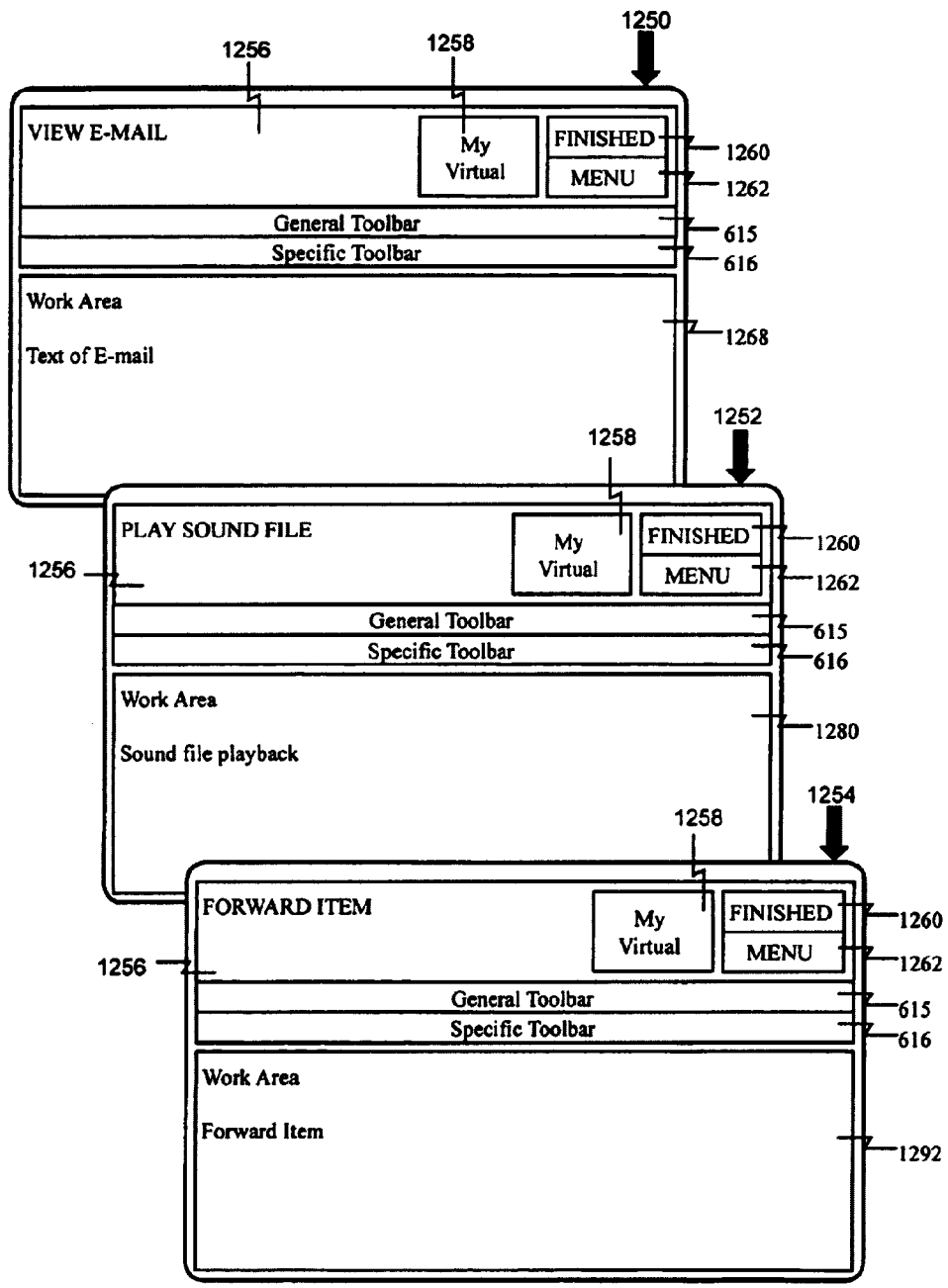
FIG. 14 is an illustration of the user interface dialogs for viewing e-mail, playing a sound file and forwarding the sound file via e-mail.

As shown in FIG. 14, a sequence of dialogs is depicted to illustrate how the invention acts independently of the display or interaction methods preferred by OM.

A flow comprising dialog 1250, dialog 1252 and dialog 1254 is illustrated, all being unique instances of dialog 700 (see FIG. 13) tailored to suit a particular task.

Figure 18:
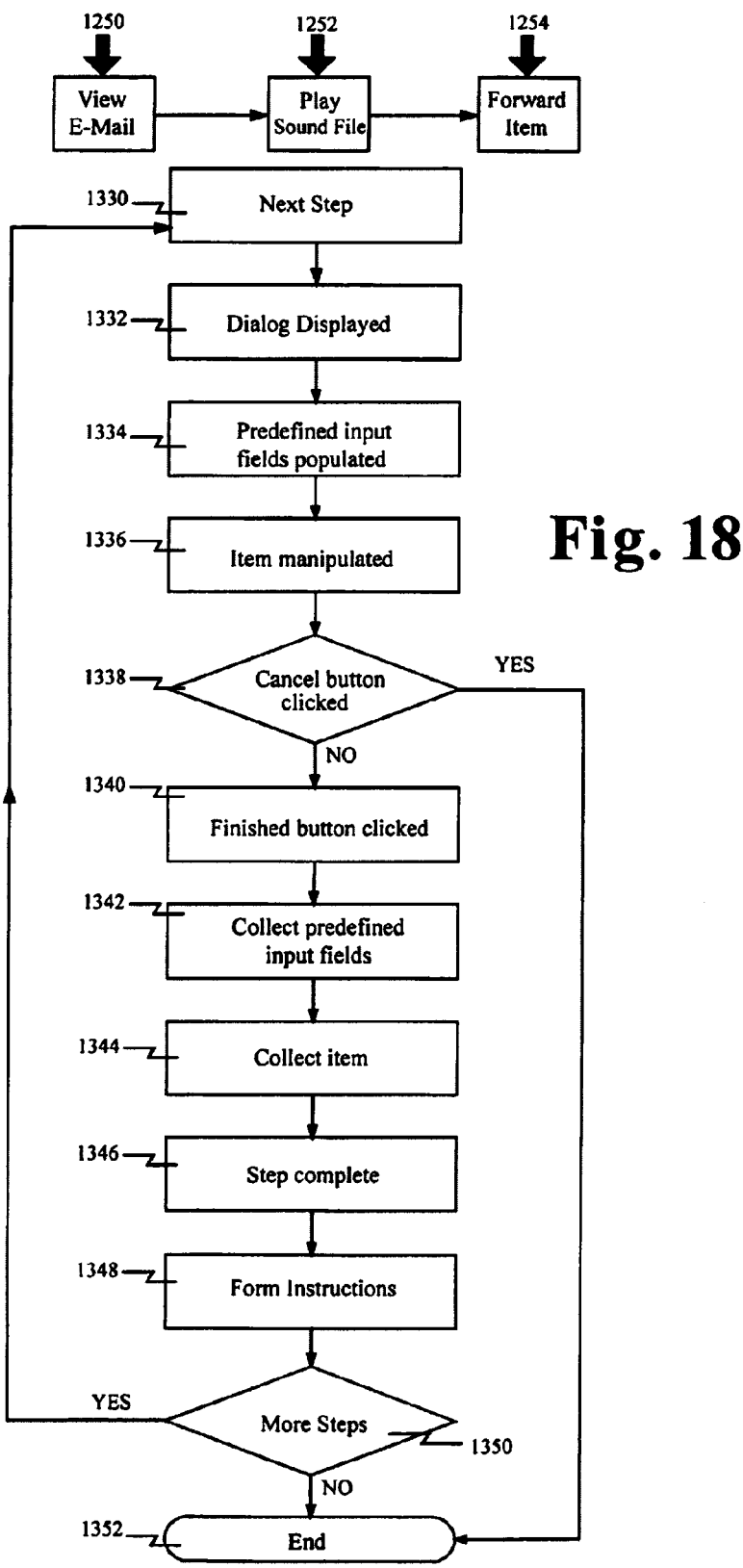
FIG. 18 is an illustration depicting the steps occurring as tasks are recorded.

The flow is designed to illustrate the required actions of OM in monitoring the actions of user 600 in order to form CFI following through to and concluding at FIG. 18.

The flow enables user 600 to open a received e-mail, to examine attachments on the e-mail, one of which is a sound file in this example, and to forward it to a selected recipient. The flow is typical for any user 600 working with e-mail when one wishes to forward a received item to another party and, therefore, is something which user 600 is likely to repeat many times.

Dialogs 1250, 1252 and 1254 consists of a unique title area such as title area 1256, where each of the dialogs displays a caption describing its functionality. Title area 1256 further includes a group of quick access buttons, my virtual 1258, finished 1260 and menu 1262, all of which are in view regardless of the dialog in use, as these are seen to be common to all dialogs.

The function of menu button 1262 is simply to allow user 600 to access the main menu from which each task begins. It is therefore, possible to begin a new task even though one is already in progress, and therefore, it is disclosed that the invention can record multiple tasks occurring substantially in parallel.

The function of my virtual 1258 is to allow user 600 to access a visual representation of task list 648 from whence additional pre-recorded tasks can be executed.

The function of finished button 1260 is to allow user 600 to signal the completion of a dialog and ultimately completion of the task. For example, on dialog 1250 clicking finished 1260 takes user 600 to the next dialog, i.e. dialog 1252, and in the same way user 600 moves from dialog 1252 to dialog 1254, where clocking finished button 1254 completes the task.

Toolbar 615 includes command buttons, which are relevant to all items, for example, regardless of whether an item represents a video file or a sound file, it can be forwarded by e-mail. If a task T2, is recorded to forward an item by e-mail, it would be appropriate for OM to place a command button representing $T_2$ (see discussion of FIG. 12 and FIG. 21) on general toolbar 615, within easy reach of user 600. When viewing any item, user 600 could instantly forward it to an e-mail recipient with a single click. Such behavior now means that user 600 can gain one-click access to any recorded task so included on a toolbar, without the need to invoke a method of displaying and selecting tasks from task list 648.

Specific toolbar 616 includes those command buttons, which are specific to the type of work being done through the current dialog. For example, if an e-mail attachment is opened and found to be an audio file then specific toolbar 616 would consists of buttons such as "play" and "rewind", whereas if the attachment was a scanned letter toolbar 616 would consists of buttons such as "O.C.R", for converting the scanned page back into a text document.

Identity toolbar 618 includes buttons specifically related to the item being worked on. In the case of an e-mail item, toolbar 618 could consists of buttons for selecting and viewing attachments. Identity toolbar 618 is not illustrated on the dialogs in order to narrow the scope of the discussion as the behavior described below applies to all toolbars 615, 616 and 618.

Dialog 1250 further includes work area 1268, suitable for reading e-mails and invoking a method of opening attachments. Dialog 1252 further includes work area 1280, suitable for playing sound files. Dialog 1254 further includes work area 1292, suitable for allowing user 600 to pick a recipient, which will receive a forwarded item by e-mail.

The flow would be impossible to totally automate as user 600 utilizes dialog 1252 to listen to a sound file being played, behavior, which the invention is not designed to replace.

The flow is, therefore, offered to illustrate problematic tasks, which the invention will find difficult to automate. However, as will be discussed in later figures, the actions of user 600 are still required to be monitored and emitted as CFI as the invention will count the frequency of use of options such as selected recipients, selected items and the like contained in OM.

FIGS. 14, 15, 16 and 17 depict common place actions, which have been facilitated through dialogs and consist of standards set out by the present method.

A larger view of dialog 1250 is provided which now makes it possible to see that general toolbar 615 includes buttons print 1300 and archive 1302, Forward 1304 and view 1306, some of which will be enabled and disabled as appropriate for the dialog 700 which is in view.

Print 1300 allows user 600 to print the text of the message contained in work area 1268. Archive 1302 allows user 600 to move the e-mail item to an archive, an act often referred to as "filing" an item. Forward 1304 allows user 600 to forward an item or an attachment to somebody and view enables user 600 to view an attachment.

Specific toolbar 616 COMBO BOX 1308 containing the names of attached items.

Forward 1304 allows user 600 to forward the selected attachment, currently WELCOME.WAV as indicated in COMBO BOX 1308.

When user 600 no longer needs to utilize dialog 1250, finished button 1260 is clicked and the dialog is dismissed.

Figure 15:
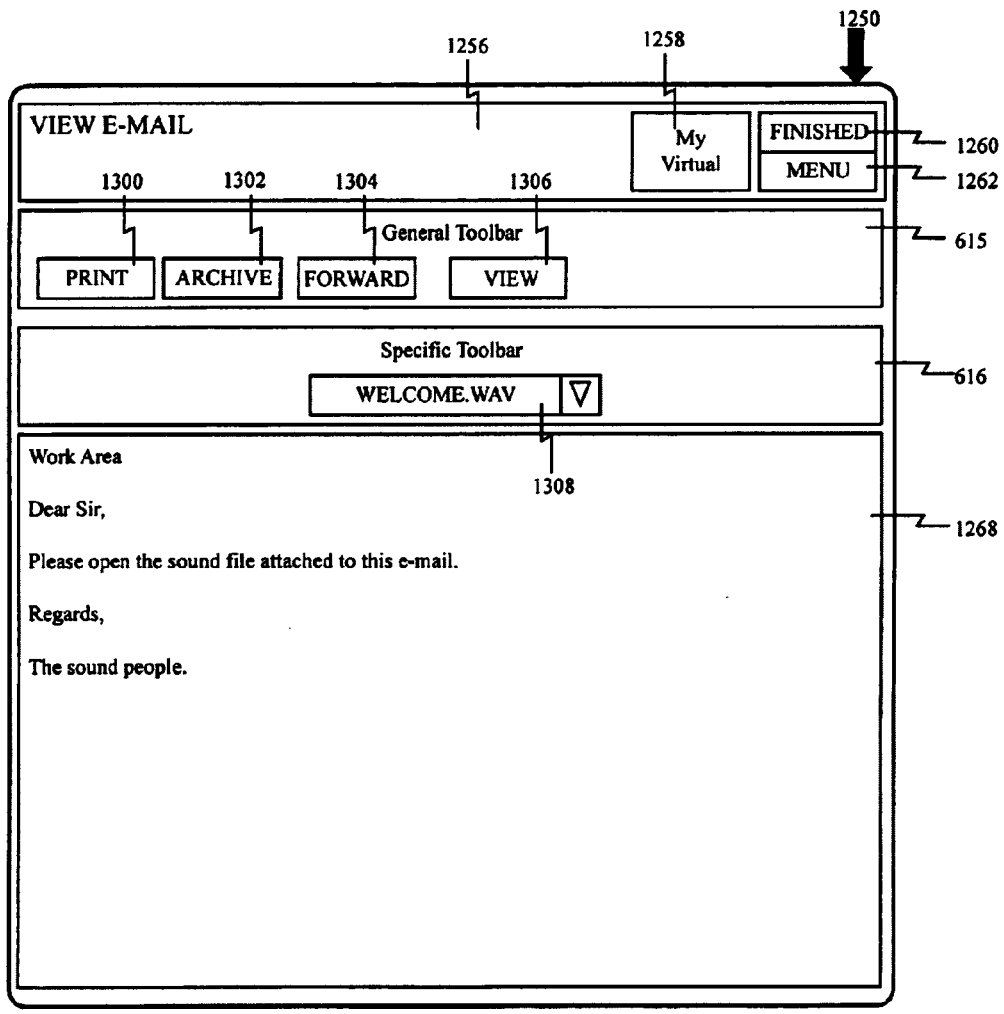
FIG. 15 is a detailed view of the e-mail step of FIG. 14.
Figure 16:
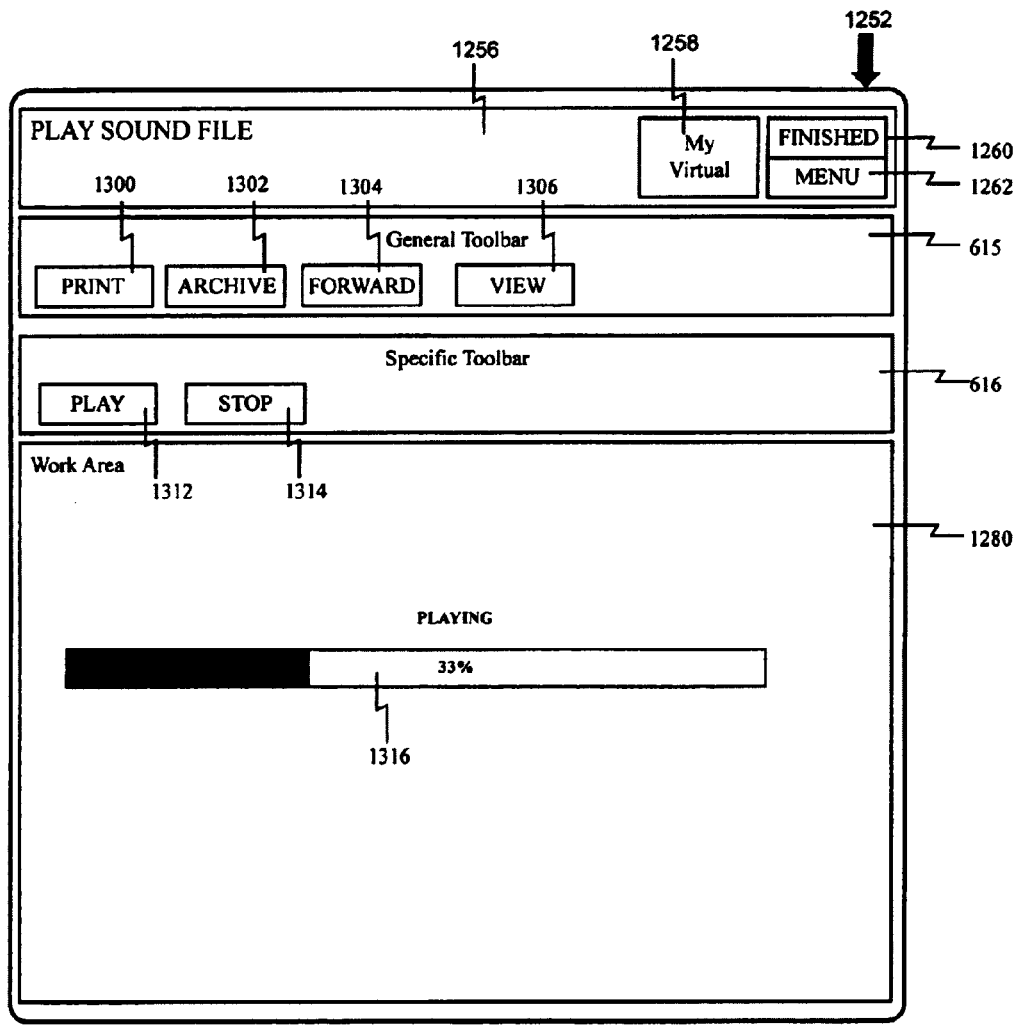
FIG. 16 is a detailed view of the play sound file step of FIG. 14.

Referring to FIG. 16, the concept of opening an attachment using dialog 1252, first shown in FIG. 15, is expanded.

Specific toolbar 616 is now configured for playing sound files and, therefore, includes play 1312 and stop 1314, to enable user 600 to control the attached sound file. Progress bar 1316 enables user 600 to see how much of the attached sound file has been played so far.

When user 600 has heard the attached sound file being played, finished button 1260 is clicked and the dialog is dismissed, returning user 600 to dialog 1250 (see FIG. 16).

Figure 17:
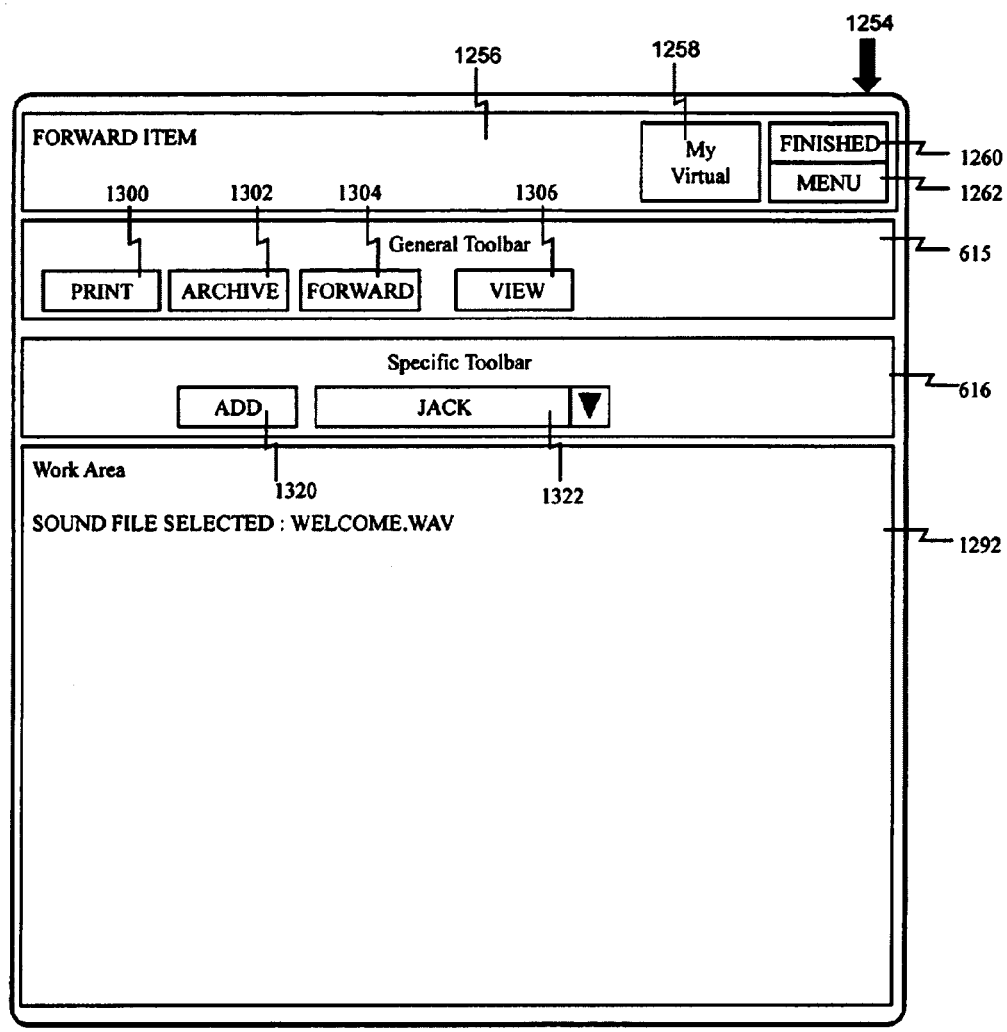
FIG. 17 is a detailed view of the forward voice recording step of FIG. 14.

FIG. 17 expands the concept of forwarding an item through the use of dialog 1254, which is reached when user 600 clicks forward 1304 (see FIG. 16).

Work area 1292 now contains a description of the attachment being viewed.

Specific toolbar 616 includes add 1320, a button which allows user 600 to add a new contact, and COMBO 1322 which provides a means of selecting any contact from the address book. The contact receiving the e-mail is Jack, as indicated by COMBO BOX 1322.

When user 600 clicks finished 1260 the sound file is placed in the out-tray and will be transmitted when user 600 next sends and receives e-mail in OM. When finished button 260 is clicked the task is complete and user 600 is returned to the main menu of OM.

Throughout FIGS. 15, 16 and 17, the flow first depicted in FIG. 14 has been followed and user actions have been recorded according to the method depicted in FIG. 18. Usage of options selected on dialog 1254, being a recipient, is accumulated to form a frequency of use for each value as discussed in subsequent figures.

If user 600 had not listened to the sound file as described in FIG. 16, then substantially more automation could be provided by the invention. However, the example is used to illustrate inherent restrictions apparent in all forms of automation where user interaction is required.

FIG. 18 depicts optional logic required in OM, which monitors the actions of user 600 and formulates CFI.

Figure 19:
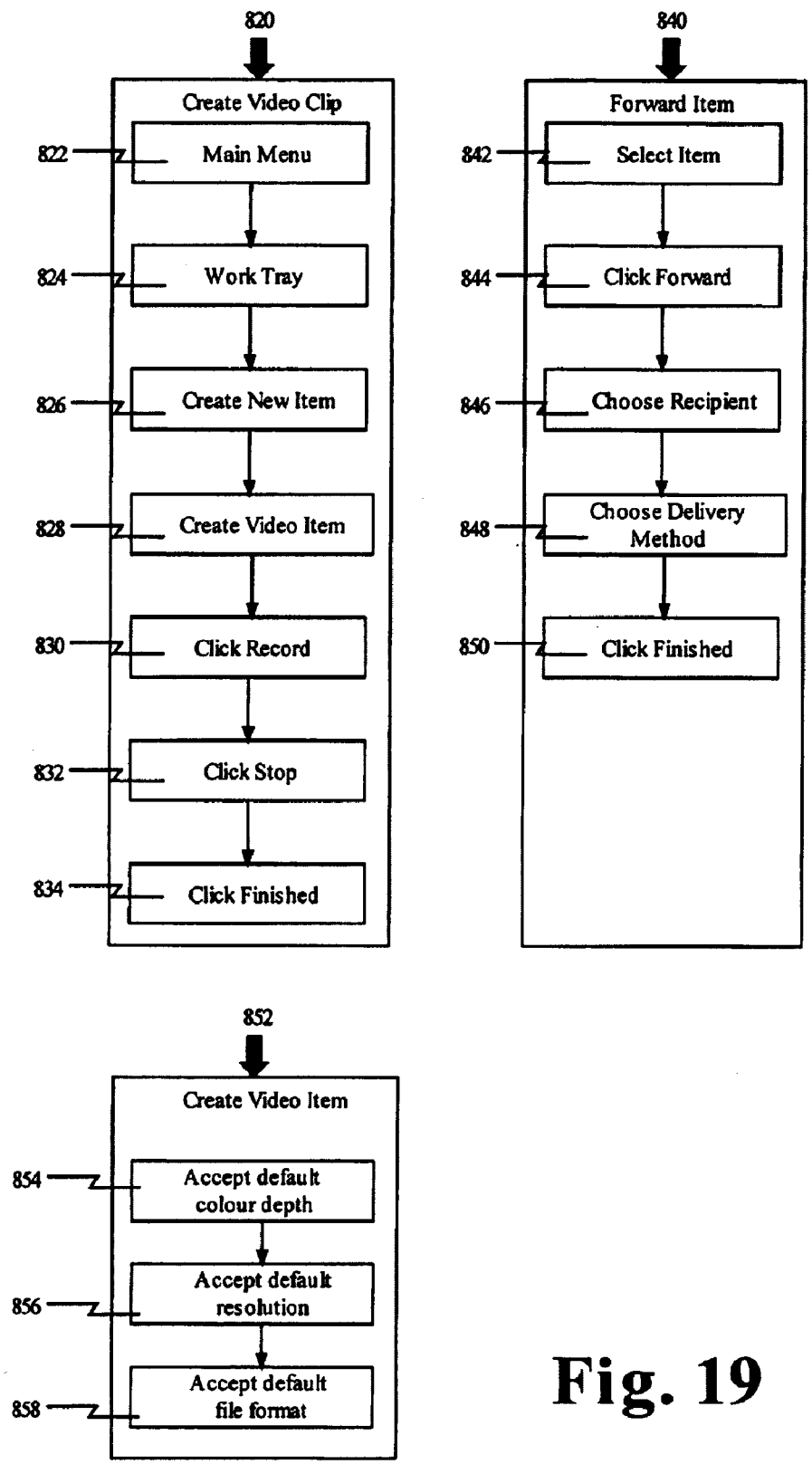
FIG. 19 is an illustration describing the two-step process as viewed by the user.

FIG. 19 corresponds to the overall flow in and around dialog 1250, dialog 1252 and dialog 1254 as regardless of the dialog in view the recording process, where OM formulates and emits CFI to virtual module 640, is the same.

Flow, therefore, begins at block 1330 where any button, which causes a new dialog to show, is deemed to begin a next step. Clicking an option on the main menu of OM is such an act, therefore, it is implied that flow initially came to block 1330 from the main menu of OM at which point a new task began.

Flow moves to block 1332 where the appropriate dialog is displayed according to the steps depicted in FIG. 15. At block 1334 user 600 enters any relevant data and selects options in predefined input fields 571, comprising the option groups and any other user interface component that collects data from user 600. Flow then moves to block 1336 where user 600 can manipulate a document or other item if relevant to the current dialog.

Decision block 1338 detects if user 600 has clicked a cancel button, which immediately abandons the creation of work and therefore, cancels recording of any new task. If OM detects that cancel has been clicked then all CFI are discarded and flow moves to 1352 where the flow ends.

If user 600 clicks finished button 1260, then, at block 1340, the use of a specific dialog has ended, and potentially, if the dialog is the last in a sequence a task has been completed.

In any case, flow moves to block 1342 where predefined input fields 571 now contain values, which are collected and flow moves to block 1344 where the item reference is collected. At block 1346, the step is complete and at block 1348 CFI are formed.

Decision block 1350 yields a YES response if there are further dialogs 700 to be processed, which would cause flow to move back to block 1330. Otherwise CFI are emitted to virtual module 640 and flow ends at block 1352.

As shown in FIG. 19, a collection of user actions is depicted to create a video recording and forward it to a recipient. This is another illustrative flow to show that OM can consist of complex flows through dialogs 700 in order to get a simple job done.

Figure 20:
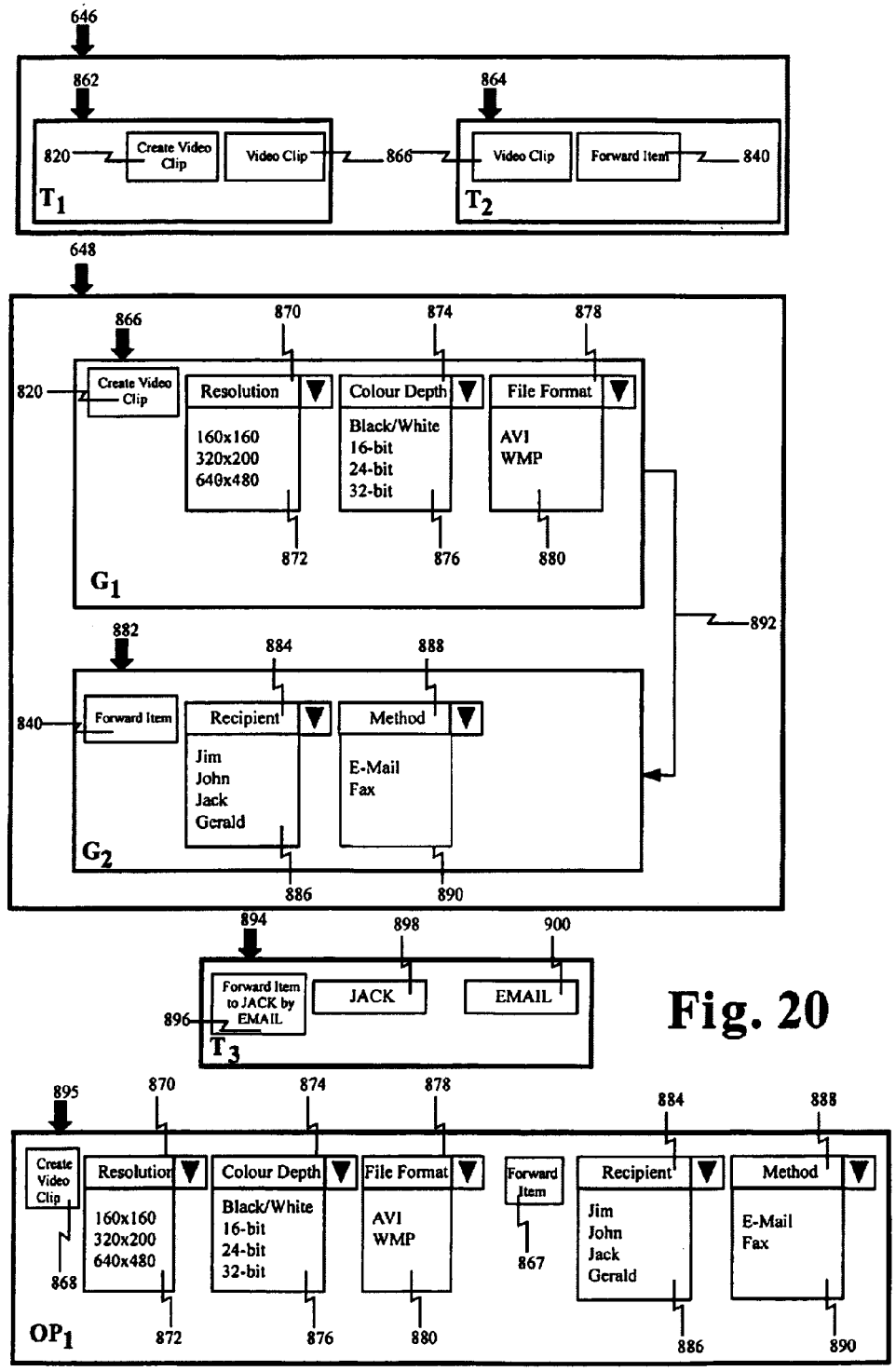
FIG. 20 is a table depicting optimization of a single task to ultimately form a single-click operation.

Two work flows are depicted in FIG. 20, namely create video clip 820 and forward item 840. Create video item 828 is expanded in block 852 to show it includes steps where values must be selected, in this example user 600 accepts default values for color depth 854, image resolution 856 and data file format 858, as any novice user is likely to do.

These separate work flows, being examples of user operations 613 (see FIG. 13) will ultimately be having an operation referred to as send video mail (see FIG. 20).

The initiator for these processes is that user 600 wishes to send video mail, a function, which OM does not provide. However, OM provides a means of recording a video clip in an area known as work tray and also provides a means of forwarding any selected item in work tray, to a recipient. Forwarding in this example will require the use of e-mail as an appropriate carrier for the video item type.

Beginning then with create video clip 820 which begins with user 600 selecting an item from main menu 822 in OM causing work tray 824 to be displayed, utilizing an instance of dialog 700 which includes general toolbar 615 to offer command buttons to create a new item. User 600 clicks a command button indicating a new item is to be created so flow moves to create new item 826, a further toolbar is displayed asking which type of item user 600 requires and the response of create video item 828 is given. Upon receiving the instruction to create a new video item OM displays another instance of dialog 700 tailored for creating video recordings from a web camera connected to workstation 602, and comprising at least a record button and stop button in order that user 600 can begin and end the video recording process.

User 600 therefore, clicks record 830 and a video recording is accumulated until user 600 clicks stop 832. The video clip has been captured and at block 834 user 600 clicks finished 1260 (see FIG. 15), contained in all instances of dialog 700, and the recording process is completed therefore, all dialogs are closed and user 600 is returned to work tray 824 where the newly created video item is listed.

Flow now moves to forward item 840 where user 600 selects the video item in block 842 and then clicks a command button indicating the desire to forward the item in block 844. Whenever an item is forwarded, a recipient is selected therefore, user 600 selects a recipient in block 846, and, then, choose delivery method 848 selects e-mail and finally, in block 850, clicks finished button 1260, ending the flow and placing a new e-mail item in the out-tray of OM.

Two distinct user operations 613 have been executed as described in block 820 and block 840 but combined they form a pattern of work 601 (see FIG. 13). User 600 would not tend to view the pattern of work as two distinct acts, this paradigm is forced upon user 600 by the design employed in the construction of OM. What user 600 needs is a way of offering the two user operations 613 in useful forms, which can be re-enacted rapidly.

FIG. 20 defines the task toolbar and the aforementioned user operations 613 are discussed and generic tasks and an operation are formed.

Task list 648 is a simplified view of operations log 646. Simplification is achieved by reducing repeated tasks of the same merit in operation log 646 to a single generic task having task list 648. In other words, tasks of the same merit are compounded to form generic tasks.

The preferred notation for tasks in operation log 646 is $T_N$; these are specific tasks with set values for their task components. The preferred notation for generic tasks in task list 648 is $G_N$.

Block 646 includes two tasks, $T_1$ in block 862 and $T_2$ in block 864. The purpose of $T_1$ is to create video clips, but in order to do so GSAM 612 requires that user 600 selects values for three option groups, illustrated in block 866. Once the options have been selected, a clip can be recorded and is represented by video clip 866, a data file containing a video clip recording. The purpose of $T_2$ is to forward an item, in this case video clip 866, but in order to do so, GSAM 612 requires user 600 to select a delivery method and recipient as illustrated in block 882.

When user 600 has created many video clips the selections in block 866 will have had to be selected over and over again. If for convenience the notation $T_{1.1}$, $T_{1.2}$ through $T_{1.N}$ is used to illustrate that $T_1$ is being executed and recorded many times in operation log 646, then it can be seen that $T_1$ is a frequently executed task.

The purpose of procedure engine 580 (see FIG. 10) is to spot the repetitious use of tasks in operation log 646. If a different row was added to task list 648 for every combination of a task with every combination of values related to its task components, the invention would not be useful.

As $T_{1.1}$ through $T_{1.N}$ are tasks of the same merit, i.e. consists of the same task components, they can be compounded into a single row and displayed in task toolbar (see block 866, block 882 and block 895), where all the various values for resolution 870, color depth 874 and file format 878 are correspondingly compounded to form selection lists. At first glance, this does not appear to be more useful than the original method for creating video clips provided by GSAM 612, but closer analysis is required.

Video settings consists of resolution 870, color depth 874 and file format 878. Video options consists of list 872, list 876 and list 880 and correspond to values available for video settings.

The compounding process occurs when $T_{1.N}$ reaches $F_{TASK}$. Recall that $T_{1.N}$ represents the number of times $T_1$ has been executed by user 600. $F_{TASK}$ is a value in the invention, which can be configured by OM, and states the number of repetitions of tasks of the same merit, which are required to occur before a generic task is compounded and placed in task list 648.

As each task recording, $T_{1.1}$ through $T_{1.N}$, is placed in operation log 646, now embodied as a database table, a SQL statement is formed to find all tasks of the same merit, and can be facilitated through use of MICROSOFT ACCESS, MICROSOFT SQL SERVER or other SQL compatible databases:

SELECT    OperationLog.TaskID,    OperationLog.CFI FROM

OperationLog WHERE OperationLog.CFI LIKE "*B1*" AND

OperationLog.CFI LIKE "*O1*"

OperationLog.CFI LIKE "*O2*"

OperationLog.CFI LIKE "*O3*"

Assuming the CFI for $T_{1.N}$ is as follows:

$$T_{1.N}(B_1+O_{1.1}+O_{2.1}+O_{3.1})$$

Where:

$B_1$ represents clicking a button which enters a dialog for recording video clips, $O_1$ corresponds to resolution 870, $O_2$ corresponds to color depth 874 and $O_3$ corresponds to file format 878, therefore, $O_{1.1}$ corresponds to 320×200 a value from list 872, $O_{2.1}$ corresponds with 16-bit from list 876 and $O_{3.1}$ corresponds with AVI from list 880.

The above query must find all tasks that specifically consists of $B_1$, $O_1$, $O_2$ and $O_3$ in any order. Further analysis must be made through string parsing is firstly used to ensure that the only task components having returned tasks are $B_1$, $O_1$, $O_2$ and $O_3$, and, secondly, it enables discovery of the specific values assigned to task components (i.e. $O_{1.1}$ etc.)

The specific values from all tasks are compounded into their individual groups, e.g. $O_{1.1}$, $O_{1.2}$ and $O_{1.3}$ are compounded into group $O_1$, the same processing is required for $O_2$ and $O_3$, and then the generic task $G_1$, having block 866 can be written to task list 648 which is embodied as a separate database table.

The compounding discussion of $T_{1.1}$ through $T_{1.N}$ is exactly applicable to $T_2$ in order to form $G_2$ in block 882. G2 contains the compounded values for all executions of $T_2$ where recipient 884 and method 888 had to be set from values having list 886 and 890 respectively.

OM makes a request for procedure engine 580 to return the contents of task list 648 and receives a collection of lines of CFI in response, each one representing a single generic task or operation.

Each line of CFI is then represented as a task toolbar all having a single dialog 700 within OM. When OM receives CFI it must use string parsing to cut out each task component in order to decide how to represent each task component on the task toolbar.

The manner in which task list 648 is represented by the task toolbar is under the control of OM. The preferred embodiment represents each task component with a suitable VISUAL BASIC CONTROL as illustrated on FIG. 20, using a method known as dynamically loading CONTROLS on FORMS.

The CFI below represents a generic task comprising one button and one option group, where the values for the option group are also having the line of CFI:

$$T_1(B_1+(O_{1.1}, O_{1.2}, O_{1.3})) I_N(\text{"Telephone Contact"})$$

The above CFI should be acted upon thus; $B_1$ should be drawn as a COMMAND BUTTON with the indicative name represented by $I_N$, followed by a COMBO BOX containing the string representations of $O_{1.1}$, $O_{1.2}$ and $O_{1.3}$, all of which are known to OM, as it originally encoded the CFI. When user 600 clicks $B_1$, the action of calling a contact selected from amongst contacts $O_{1.1}$, $O_{1.2}$ and $O_{1.3}$, where $O_1$ represents contacts, is executed by OM.

Similarly if multiple option groups are received $$T_1(B_1+(O_{1.1}, O_{1.2}, O_{1.3})) I_N(\text{"Telephone Contact"})$$

Whenever a COMMAND button such as $B_1$ is clicked, OM can either immediately execute the functionality represented by $B_1$, for example take photograph (using a web camera etc.), or can take user 600 to the original dialog that $B_1$ came from, for example the dialog for taking photographs. The preferred method of the invention is to immediately execute the functionality and reduce the use of dialogs 700 to a minimum.

To clarify, in GSAM 612, if $B_1$ takes a photograph and user 600 is currently looking at the task toolbar and can, therefore, see $B_1$, clicking $B_1$ would immediately take a photograph and would not require user 600 to use work in-process 555, or any other intermediate dialogs 700.

OM is not required to provide a task toolbar if it does not wish to display task list 648 in part or in whole. However, the purpose of task toolbar is fundamentally to allow user 600 to do the same work as was done via a collection of dialogs in the minimum number of clicks. If OM does consists of task toolbar then it will be more distinguishable from other devices that don't.

When the frequency of use for a task reaches a pre-defined frequency, the existing TI is automatically hidden from view in task toolbar and merged with its comprising task. Thus, the same task will be executed by one command (click) less. At this stage any one of remaining task components can become TI and the cycle continues. The invention aims to complete tasks through a single command. User 600 can by utilizing task modeling 630 optimize a task to a single command at any time, where feasible.

When the frequency of use of an option in relation to a specific task, reaches a pre-defined frequency, user 600 is automatically requested to revise it through task modeling 630. The revised option is given an indicative name describing the nature of the item(s) it relates to, and is automatically indexed in desirable option list 650 with a new pre-defined frequency.

As such, the user's abilities are digitally captured and options and schedules for doing tasks are dynamically and automatically up-graded and optimized. User 600 is persuaded to adopt an evolving life as opposed to the habitual. Thus, the cycle of perfection and standardization for the user and their virtual begins.

$T_3$ in block 894 now represents $G_2$ from block 882, where all input values have a default due to the fact that user 600 utilized $G_2$ with Jack 898 and e-mail 900 so frequently, therefore, it is desirable for OM to offer user 600 the functionality of $G_2$ with preset values, all provided by a single click.

Indicative name 896 can be used on a button for a toolbar in OM, where a single click of the button would cause $T_3$ to be executed, thus a selected item, for example in the in-tray would be forward to Jack 898 by e-mail 900.

If $T_3$ is displayed by OM in the task toolbar there would be no need to display recipient 884 or method 888, as would be the case for $G_2$, as no inputs are required for $T_3$.

As user 600 executes $G_1$ and $G_2$, by setting appropriate values prior to executing the tasks by clicking either create video clip 820 or forward item 840, the usage of each value, e.g. having video options, is counted in relation to the comprising task, e.g. $G_1$.

Therefore, if user 600 creates three video clips using 160×160 from list 872, then the value 160×160 will have a frequency of use equal to three, in relation to $G_1$.

All values for task components have an independent frequency of use (F); stating how frequently a value has been repeated with a specific task.

When a generic task such as $G_2$ has an option group represented by TI the frequency of use of each value used from the option group is counted in combination with $G_2$.

For example, a default value can be found in list 872 for resolution 870 if it is used frequently enough, similarly a default value from list 876 can be found for color depth 874 and finally a default value from list 880 can be found for file format 878. This can be done according to a discussion expanded in FIG. 21.

Furthermore the frequency of use of values in options groups can be used as a sorting order, therefore, most frequently used values can be at the top of the option group with least frequently used values at the bottom.

Thus options in an option group $\Delta_{O1}$ are sorted by frequency of use being $FN\Delta_{O1}$, for example, if $FN_{O1.1} > FN_{O1.3} > FN_{O1.2} > FN_{O1.4}$ then the order of values in option group $O_1$ according to frequency of use is O1.1, O1.3, O1.2 and finally O1.4.

When OM displays option groups they can be sorted in their natural order, as dictated by OM, such as alphabetical order, or by frequency of use. Values that have remained unused can be hidden by OM in order to restrict the number of options offered to user 600.

An interesting use of operations log 646 is to analyze usage of command buttons contained in general toolbar 615, specific toolbar 616 and identity toolbar 618, in that buttons can be hidden if they are not utilized by user 600. This behavior is evident in existing art, but operations log 646 extends this in a more intuitive manner by allowing the buttons to be hidden based on current work context.

For example, if a user creates a new word processor document item $I_1$, and during creation of $I_1$ makes frequent use of buttons that control bold and underline typeface, but does not utilize buttons for changing font, then when $I_1$ is displayed in future, buttons for bold and underline will be visible and those related to font and font size will not. Continuing, if $I_2$ is then created and the reverse situation is true, with regard to button usage, then the combination of visible buttons will alter according to whether $I_1$ or $I_2$ is being worked on by user 600. Therefore, rather than buttons just disappearing from view, those tools which are relevant to the item being worked on are brought into view and others are not, but with existing art buttons which are hidden are hidden for all items, until the user utilizes them and then they are visible for all items. The invention again extends context awareness for OM allowing it to always present a streamlined ergonomic user interface.

This is enabled if OM emits CFI comprising every single button click occurring within a task, which is the preferred method of the invention. Therefore, a coded form instruction can consists of the same button many times:

$$T_6(B_1, O1.1, B_1, O1.2, B_1, B_1, B_2, B_3, B_1, I_4)$$

This might correspond with user 600 selecting text and using a button ($B_1$) to increase the font size of selected text while creating an item ($I_4$). When $I_4$ is recalled for further work $B_1$, $B_2$ and $B_3$ would be visible, but other buttons that were not used could be hidden by OM.

Block 895 now shows how $G_1$ and $G_2$ can be compounded to make an operation, where an operation includes at least one task.

Connector 892 can be used by user 600 to state that the output of $G_1$ is to be the input of $G_2$. Therefore, the operation $OP_1$ is formed in block 895 and includes all inputs and button clicks from $G_1$ and $G_2$. Over time, default values will be found for inputs in OP1 and again user 600 will have access to extensive functionality with the minimum number of clicks.

FIG. 21 depicts a table which will explain the successive reduction of input to task $T_1$.

Beginning with block 2500, a graphical description of the terms procedure and task is provided. Procedure 2502 can be seen to dictate the sequence of TI followed by task components 2506, while task 2504 requires the assignment of specific values to the task components 2506. The line of task 2504 clearly indicates each value that is assigned to the corresponding option group.

Block 2508 includes $T_1$ where block 2510 illustrates that the values from option groups contained in block 2506 have been brought down to form $T_1$. At block 2512 the following pseudo code is depicted:

Declare variablefn as integer
Declare variable$FN_{TI}$ as integer
$FN_{T1}$=value assigned by OM (i.e. $FN_{TI1}$, $FN_{TI2}$ . . . )
fn=0
Repeat
   Execute $T_1$ with a value for TI
   fn=fn+1 (relates to frequency of use for the value just assigned to TI)
Until fn=$FN_{TI}$
Create list of unique values assigned to TI
Count number of times each unique value has been assigned to TI
Take value with highest count and assign as default value for TI In the above, code fn represents the frequency of the most commonly used value for TI. When TI represents an option group, there will be many possible values for the option group, therefore, many possible values for TI. The invention is seeking the most frequently used value in order to use it as a default for TI. The pseudo code counts the use of each value assigned to TI. When $FN_{TI}$–fn=0 then repetitions of $T_1$ have occurred where $FN_{TI}$ has been assigned to TI sufficient times to assume it as a default value. Block 2514 indicates a default value has been found from an option group contained in procedure 2502, which is represented as $TI_1$, being the current initiator at this stage of the discussion. In block 2516 $TI_1$ is assigned B1.3 as the default value found in block 2514.

At this stage, the value of fn, related to the use of TI with $T_1$, is reset to zero and the cycle continues. Before the cycle begins again the option group used by user 600 to begin $T_1$, typically, but not restricted to being, the option group immediately to the right of the previous TI is now assigned as TI.

In block 2520, $TI_2$ is found a default value when $FN_{TI}$–fn=0 is once again found to be true. Therefore, block 2518 includes two default values, one from the previous TI ($TI_1$) and one from the current TI ($TI_2$). The cycle progresses through block 2524, taking default value from block 2522, block 2528 taking default value from block 2526, block 2532 taking default value from block 2530 and finally block 2536 taking default value from 2534, which ultimately means all option groups have been found default values.

Frequently used tasks and operations, having task list 648 are offered to OM such that they can be accessed by a single click.

The frequency of use and schedule of execution for all tasks is a basis for analysis the user's habits.

Figure 22:
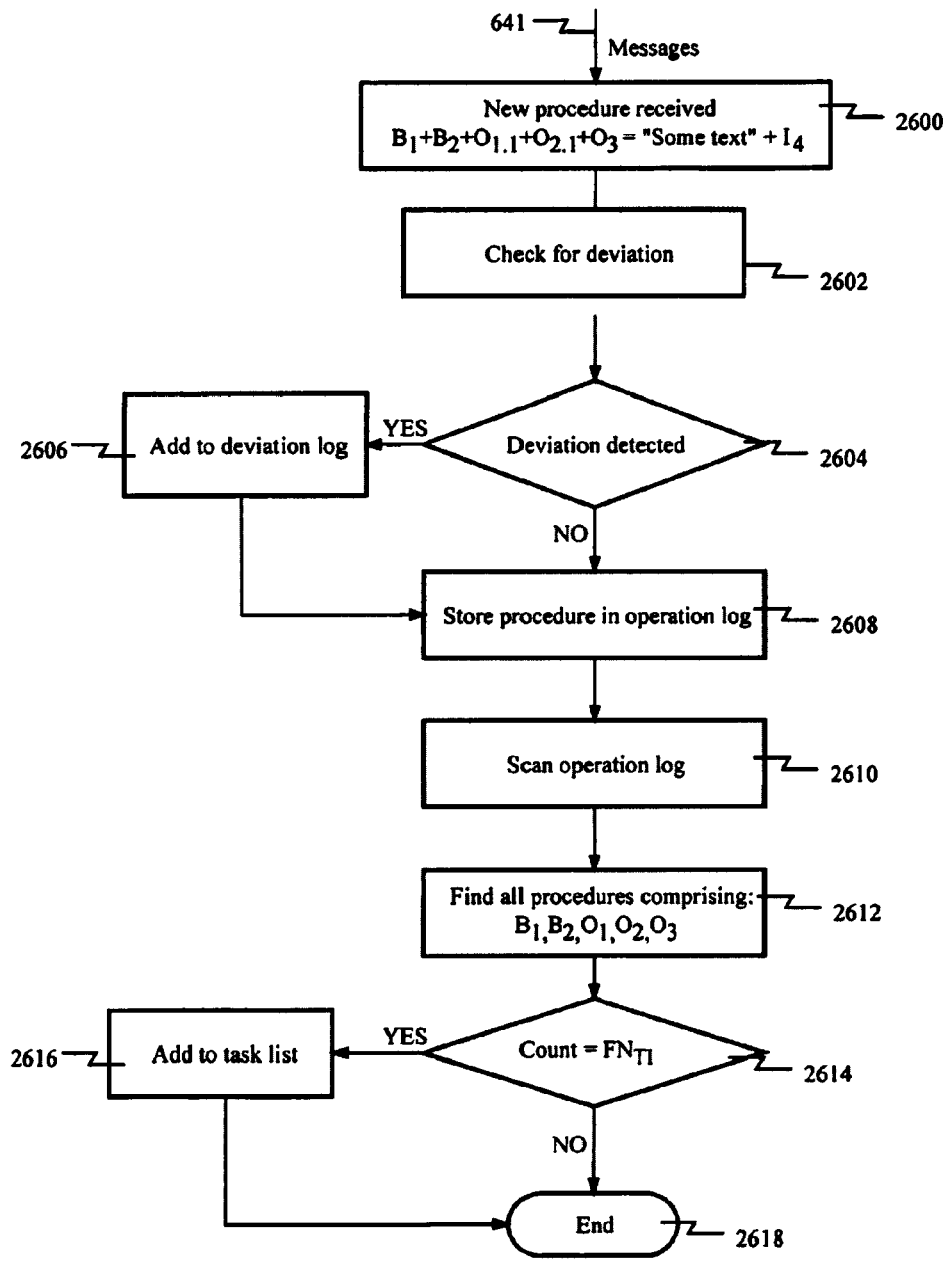
FIG. 22 is an illustration summarizing the operation log.

FIG. 22 summarizes activity for operation log 646 as new tasks enter the invention or are executed from task list 648.

As described, messages 641 enter the invention from OM, arriving at block 2600, which represents the CFI, transmitted from OM.

Task deviation control 632 is invoked at block 2602 to facilitate validation of values having the procedure arriving in block 2600. If a deviation is detected, then block 2604 yields a YES response and flow is diverted to block 2606 where a notification is added to deviation log 652 at which point OM is informed and can act accordingly.

Flow then continues to block 2608 where the procedure from block 2600 is stored. Stored is defined to mean the coded form of instruction is substantially permanently saved, in order to protect the lifetime content of the dynamic data stores comprising recorded information and statistics. It is this information which is of value and represents the virtual personality of the user, i.e. user's virtual 642. Any suitable method of storage format can be used for this purpose such as a text file, relational database such as MICROSOFT ACCESS or other forms of ISAM DATABASE. The text file storage method is preferred as it is the easiest to implement for operation log 646, as sequential scanning from top to bottom is done more frequently than random access searching. The overhead of database indexes, which require constant updates, would potentially slow the system down. However, the relational database can potentially reduce development overhead and assist in further forms of rapid analysis often referred to as data mining, which facilitate further discovery of patterns and habits exhibited by user 600.

At block 2612 operation log 646 is scanned and all procedures, which consists of the same task components, are found and counted. At block 2614 if the count=$F_{TASK}$ then the procedure represented at block 2600 has been executed sufficient times to warrant a new generic task being created in task list 648, which occurs in block 2616. Flow then ends at block 2618.

Figure 23:
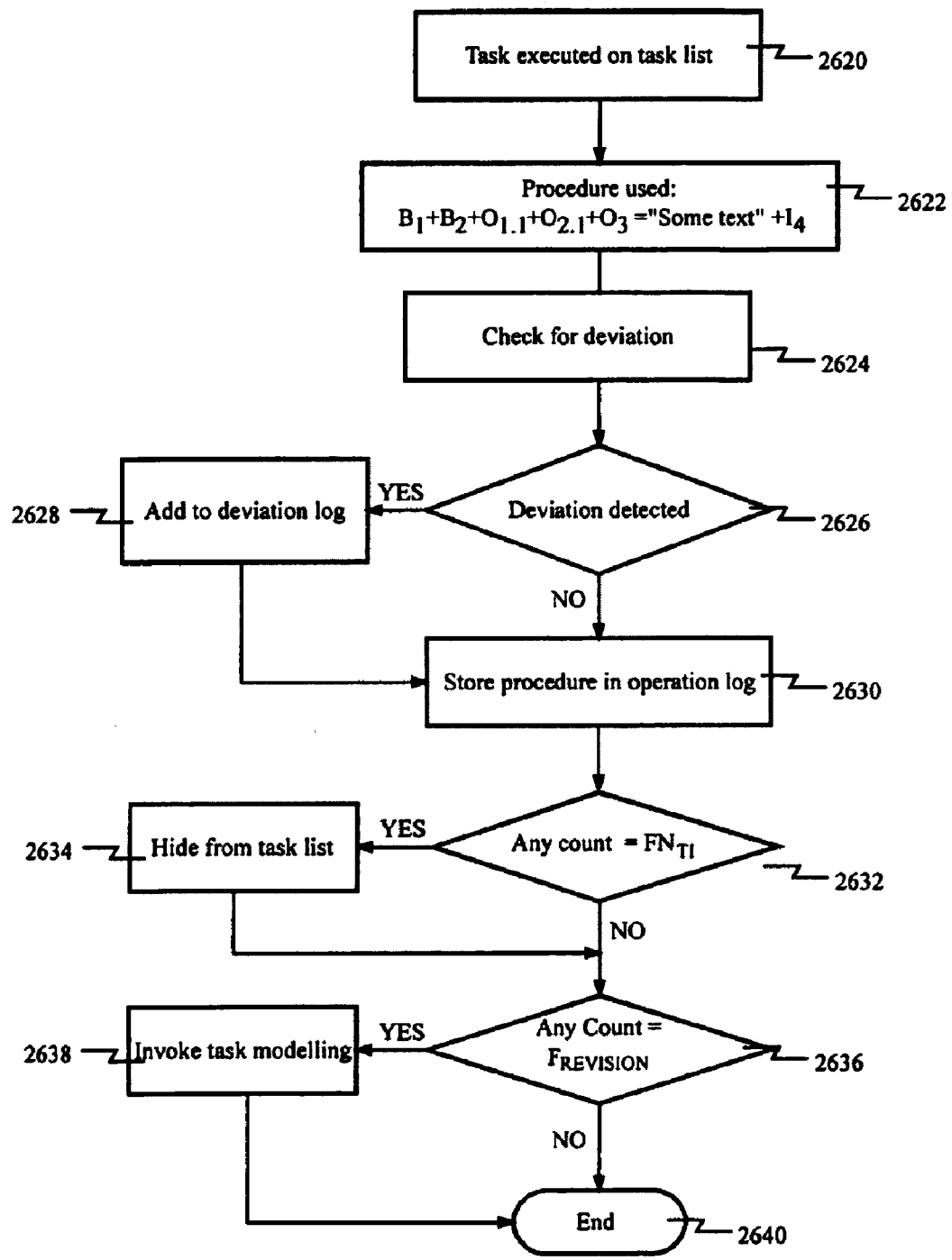
FIG. 23 is an illustration summarizing the task list.

FIG. 23 summarizes the activity related to task list 648. Any task being executed on task list 648 brings execution to block 2620 where flow continues to block 2622, which represents the task executed on task list 648. Like all task executions, task deviation control 632 is invoked at block 2624 and if block 2626 yields a YES response then deviation has occurred causing flow to move to block 2628, where notification is stored in deviation log 652 and again OM is informed.

Every execution of a task is recorded in operation log 646, therefore, at block 2630 the task having block 2622 is similarly stored and all task components are scanned and their corresponding frequency counters are incremented, where simultaneous cascading frequency updates are performed on any parent tasks. Block 2632 yields a YES response if any task component contained in the task in block 2622 reaches $FN_{TT}$. A YES response causes flow to move to block 2634 where flags are set to provide OM with the option of hiding any relevant items.

Flow then continues to decision block 2636 which brings to light a constant referred to as $F_{REVISION}$, which causes task modeling to be invoked for any task comprising at least one task component whose frequency of use for any value meets or exceeds $F_{REVISION}$. If so then flow moves to block 2638 where task modeling is invoked in cooperation with OM. Flow then ends at block 2640.

Figure 24:
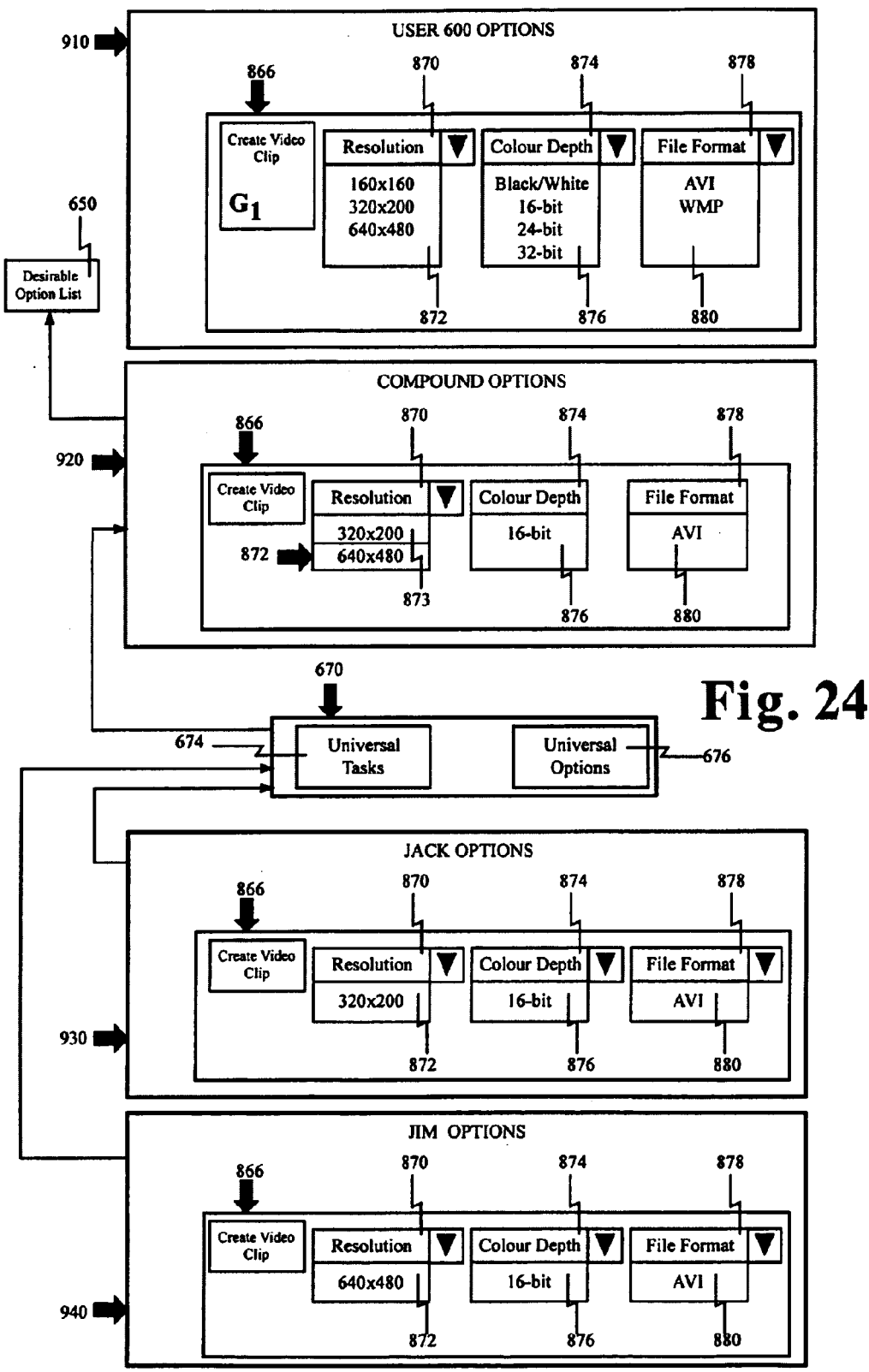
FIG. 24 is an illustration showing the information extracted and processed by task modeling.

FIG. 24 illustrates how task modeling 630 assists in the optimization of tasks. WCP 670 potentially plays a major role in the life of user 600, as organized expertise can now be gained rapidly and utilized to achieve a diverse collection of completed tasks, not previously achievable by a novice user 600. Such a facility substantially shortens the learning curve involved in getting the invention or its related OM to function at full potential.

In this context, FIG. 22 shows that WCP 670 is central to a plurality of user 600, which share expertise by publishing tasks to universal tasks 674 and related options to universal options 676.

Two users have made available their preferred options for capturing a video clip. The first set of options is published by Jack 930 and is optimized to provide a good quality video clip using low resolution, so the resultant data file is as small as possible. The second is Jim 940 whose options are optimized for better quality, but still paying attention to file size.

Note that neither Jack 930 nor Jim 940 have recommended using 160×160 for option group resolution 870, nor have they selected 32-bit color or 24-bit color for option group color depth 874, so they are deemed to agree that 16-bit color is a good option for color depth 874, and they agree that AVI as oppose to WMP is a good file format to use for video clips. However they have not agreed on which resolution is best.

Jack 930 says that 320×200 resolution is best for him, as he frequently e-mails video clips to friends so desires a smaller data file from the video recording process. Jim 940, however, uses video clips on his web site so requires better quality, but still not the best quality, as visitors to his web site want quality video images but do not want to spend hours downloading them.

User 600 now considers the variety of options presented in block 910, but is uncertain as to which combination would be best. Therefore, task modeling provides compound options 920 by eliminating all options, which are not used by chosen mentors, comprising Jack 930 and Jim 940. User 600 is able to search WCP 670 and find mentors whose personal profiles contain expertise, which is of use to user 600. Profiles for mentors can automatically be formed by a WCP by summarizing the tasks, which are uploaded by each mentor. In this case user 600 nominated the mentors for their expertise on video clip recording.

Task modeling recovered the video clip recommendations of the mentors from WCP 670 and formulated compound options 920. Each option group is analyzed and where mentors agree on an option value all other options in the group are eliminated. Where they disagree, the chosen options of each mentor are compounded and all other remaining options in that option group are eliminated. Note how 160×160 has been eliminated from compound options resolution 870, as neither Jack options 930 nor Jim options 940 recommend this value for video clip recording.

User 600 can now easily choose 16-bit color and AVI file format as recommended in compound options 920. The only choice remains with respect to resolution. User 600 is assisted though because the number of choices is now fewer.

Task modeling 630 allows user 600 to opt for one of resolution 320×200 or 640×480 and use this as a default, but alternatively just the two recommended options can be offered in future uses of create video clip 866 and 160×160 resolution will not then be offered.

Thus, task modeling 630 is able to assist OM in reducing the burden on user 600, who has to filter through many options lists in order to make educated decisions.

Figure 25:
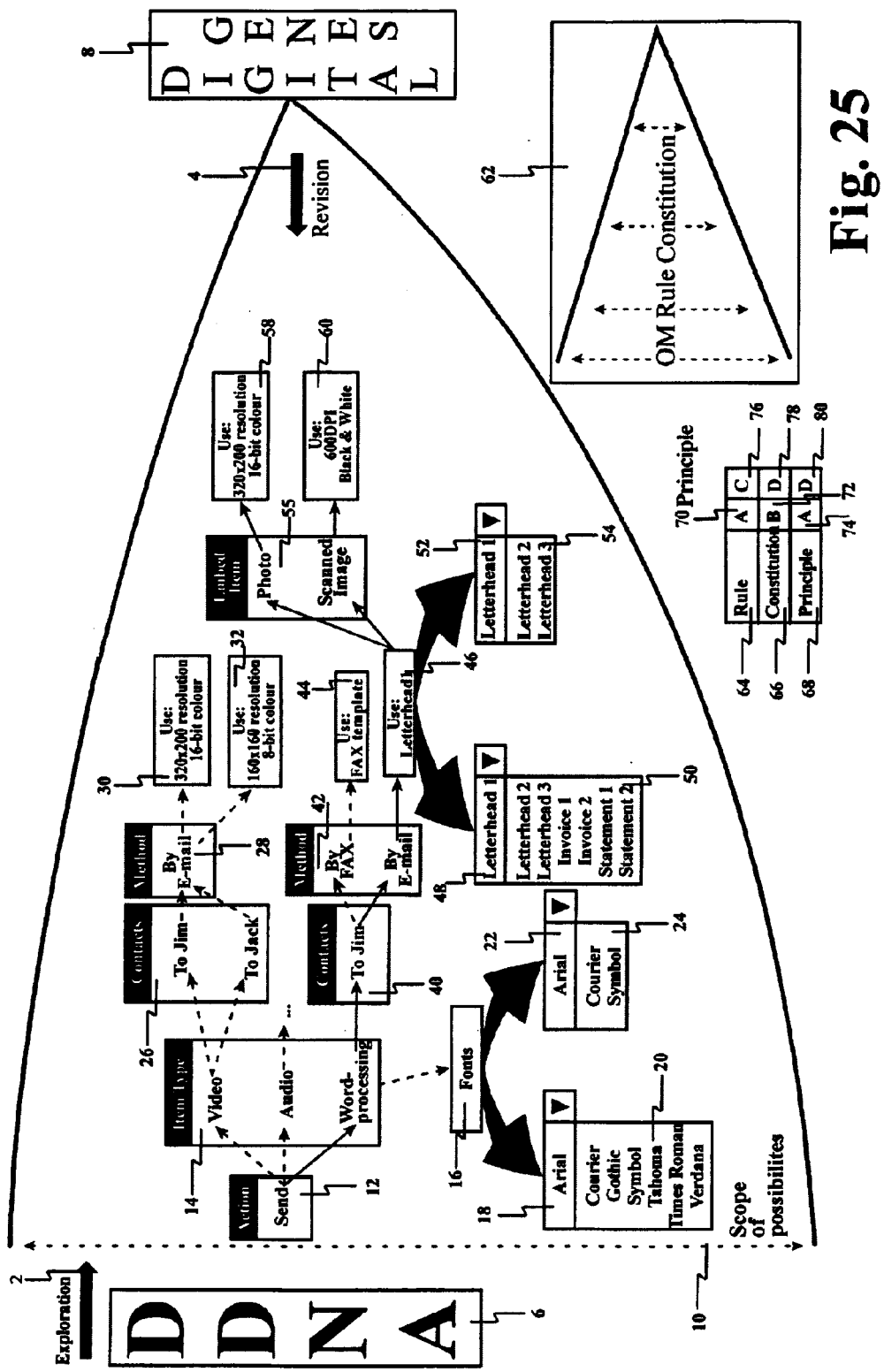
FIG. 25 is an illustration summarizing task modeling.

FIG. 25 illustrates an extension to the embodiment of task modeling 630. On the left of FIG. 25, DDNA 6 is shown which is the sum total of all work ever carried out by user 600. On the right of FIG. 25, digital genes 8 is shown which is the smallest unit of activity in the invention and can be related to things like assigning a value to a task component. As FIG. 25 is scanned left to right the number of possible values for any task component reduces and the reduction of DDNA to digital genes is observed.

OM can be viewed as a complex software package where many options are presented to user 600. Task modeling 630 assists OM with simplification, or in other words assists in narrowing the scope of possibilities 10. Narrowing the scope of possibilities 10 means that user 600 is faced with an overwhelming range of options for task components and therefore, wishes to reduce the number of possible combinations, which will ultimately lead to a more consistent style for any given item of work.

At least two distinct triggers will cause task modeling 630 to be initiated. First, if user 600 wishes to find default values manually or wants to reduce the number of available options, then exploration mode 2 occurs where user 600 is free to examine options available in all parts of OM. Second, Revision mode 4, which is triggered either by OM or the invention, occurs when any value used in relation to a task has been used $F_{REVISION}$ times.

$F_{REVISION}$ is a value set by OM, which informs the invention of when task modeling 630 is to be automatically invoked. All unique values assigned to task components are counted and their frequency of use is monitored. When the frequency of use of a value is equal to $F_{REVISION}$ task modeling 630 requires user 600 to revise their habitual use of the value to ensure best practice is being employed.

Send 12 represents one type of work which user 600 can do through GSAM 512, which is sending items to contacts. When user 600 has done this many times task modeling 630 is able to display a map of all activities of a particular type, assisted by OM.

Dotted arrows in FIG. 23 relate to exploration mode 2 where user 600 is viewing all manner of work related to send 12. Continuous arrows illustrate the path of a specific task or tasks of the same merit comprising a task component, which has reached $F_{REVISION}$.

Item type 14 tells user 600 that, so far, three types of work items have generally been created or used in relation to send 12, being video, audio and word-processing. Video has been used in connection with sending video clips to contacts 26 comprising Jim and Jack. The video clips have been delivered using delivery method 28 comprising e-mail. Settings 30, comprising 320×200 resolution, etc. were used in connection with Jim in contacts 26. Settings 32 were used in connection with Jack in contacts 26.

Contacts 26 consists of only those contacts used in connection with video and send 12. Therefore, user 600 is clearly able to see the related sets of options in for send 12.

Task modeling 630 now allows user 600 to switch the selection between Jim and Jack, which will correspondingly cause either settings 30 or settings 32 to be highlighted. User 600 could then say for all future use of video in connection with send 12 that either settings 30 or settings 32 should be used, to increase consistency.

Returning to send 12 where flow moves to word-processing having item type 14. Word processing has thus far only been used in connection with Jim from contacts, which narrows the overall number of people having contacts 40. Flow then moves to delivery method 42 where user 600 sees that Jim has received word-processing documents by fax and by e-mail. Those documents sent by fax were structured from FAX document template 44, where those sent by e-mail consists of letterhead 1 46. When letterhead 1 46 has been utilized word-processing enabled user 600 to insert embedded items 56 comprising photo and scanned image. When photo was inserted into the document settings 58 were used and when scanned image was inserted into the document settings 60 were used.

User 600 has a clear map to discover how any particular piece of work was constructed, showing which options were used and how they related to the overall operation of sending various documents to different people.

The example in FIG. 23 is basically showing how consistent communication can occur with various contacts, where the same method of contact and the same style of documents constantly flow to a recipient, which is desirable for example in order for user 600 to maintain a professional image with clients.

Returning to word-processing, many fonts 16 are available for use in a document. MICROSOFT WORD particularly makes dozens of fonts available. Many users make the mistake of over using fonts, thinking the reader of their documents will understand the meaning of why many font changes occur throughout a document. Often it is best to use a single font, other times a handful at most should be used. Therefore, user 600 can take two views of font list 16. First, all fonts 18 can be viewed, which presents a list of all available fonts 20. Second, user 600 can choose to see those fonts used during work, which are contained in fonts 22 and those fonts 24 which were actually used in stored documents. User 600 can then, as shown in previous discussion, choose just the fonts, which are relevant to work, rather than having to scroll through dozens of fonts to get to the "vital few".

Similarly, when creating documents in connection with document templates user 600 can see the document template 46 used for a specific item or can choose to see all templates 50 and can choose a default template 48 from such a list, or alternatively user 600 can see templates 54, actually used in stored documents, and can assign a default template 52 from this narrower list.

Therefore, user 600 can over a period of time, through use of revision mode 4 or exploration mode 2, narrow the scope of options available, increasing consistency and optimizing working patterns.

User 600 may view exploration mode 2 and revision mode 4 as time consuming and can therefore, acquire a constitution from WCP 670. As noted above, a constitution is a predefined configuration, which can reduce the number of options visible when user 600 is working. Alternatively, a constitution is used simply as a cross check to notify user 600, via task deviation control 632, if any values are used which are not specified in a selected constitution.

Referring to block 62, OM again has a wide range of options available which user 600 can use. User 600 can narrow these available options using rules, which consists of the behavior described above.

A mentor can design a constitution to hide many options, which they feel are unnecessary in a certain arena of work. User 600 will then state principles, which means the decision process of choosing between something user 600 prefers or something, which the constitution states is good practice.

Rule 64 contains two abstract options A 70 and C 76. Constitution 66 contains two abstract options B 72 and D 78, which are alternatives to those contained in rule 64. User 600 will choose one value from rule 64 or constitution 66. Correspondingly, principle 68 illustrates that A 74 is to be used, taken from rule 64 and D 80 is to be used from constitution 66.

Constitutional values could all be accepted as defaults, but the ability to use rules to override constitutions, forming overall personal principles provides much more flexibility.

The preferred method of the invention is that only significant B and significant O are displayed during task modeling activities.

Customizations performed by user 600 can be transported amongst all compatible operation models 610. This can be achieved by expansion of universal converter 400, which can be customized to accept CFI between incompatible OM's, or by developers of OM's reaching agreement on the methods of abstracting information having CFI.

For example, many applications consists of "Ok", "Cancel", "Abort", "Next", "Save", "Load", "Left Justify", "Cut", "Paste", and a multitude of similar commands. If each of these common commands where assigned the same abstract name by every OM then disparate OM's would become increasingly compatible, where CFI recorded by one would be useful to all. The simple step of agreeing $B_1$="Load", $B_2$="Save" and $O_1$="Contact Name", and so on, is all that is required to enable OM to exchange CFI with a plurality of other OM and the overall benefits to user 600 are substantial.

With this in mind it is known that simple expansion of operation log 646 and task list 648 would enable each CFI to be stamped with the unique identity of the OM, which recorded it. When task list 648 is then shared, all user 600 having a compatible OM will then be able to leverage the expertise offered by all user 600 operating compatible OM's.

What is claimed is:

1. A self-adjusting, self-optimizing method of information processing using a central processing unit associated with a server connected to additional central processing units and associated with at least one operation model, said method comprising the steps of:
   recording at least one coded form instruction provided by the at least one operation model based on analysis of the user's interaction with said central processing unit;
   storing the at least one coded form instruction representing a completed task having at least one task component;

placing said at least one completed task with its associated sequence of predefined input fields and work items necessary to complete said completed task into an operation log;

counting the frequency of use of the at least one task component;

comparing the frequency of use of the at least one task component to a first predefined frequency;

inserting the at least one coded form instruction in a task list if the frequency of use of the at least one task component is greater than or equal to the first predefined frequency; wherein said task list is continually updated and optimized dynamically by extracting frequently used tasks from said operation log;

wherein said method comprising the output steps:

selecting at least one coded form instruction for the task list:

transmitting the at least one coded form instruction to the at least one operation model;

wherein the at least one operation model repeats the at least one task component.

2. The method of claim 1 further comprising the step of reducing the number of manual inputs by providing the at least one default value in place of the at least one task component.

3. The method of claim 2 wherein if frequency of use of the at least one default value exceeds a second predefined frequency, a mandatory review process is initiated, said mandatory review process comprising the steps of:

displaying the at least one task component and other task components encompassed within the at least one coded form instruction;

offering previously used values for the at least task component; and selecting one of the previously used values as replacement default value for the at least one task component.

4. The method of claim 3 wherein said previously used values for the at least one task component of said offering step is replaced by the use of recommended values which have been stored on a network.

5. The method of claim 3 wherein said mandatory review process is manually initiated.

6. The method of claim 4 wherein said mandatory review process is manually initiated.

7. The method of claim 5 wherein said mandatory review process is manually initiated.

8. The method of claim 1 wherein said recording, storing, counting, comparing and inserting steps to obtain said task list are instead provided by a default task list included in said operational model.

9. The method of claim 3 such that if said default value for the at least one task component is not used, then the method further comprises the step of notifying the operation model that a deviation has occurred.

10. The method of claim 9 further comprising the steps of:

storing the notification which was issued to the operation model;

counting the frequency at which the deviation occurs; and presenting a help package when the counted deviation frequency exceeds s third predefined frequency.

11. The method of claim 1 further providing universal conversion of one format of communication to at least one other format of communication requiring at least two intermediary steps of conversion, said method comprising the steps of:

selecting a plurality of communication tools, wherein each of said communication conversion tools has at least one input format and at least one output format;

networking said communication conversion tools together such that a conversion matrix is provided, wherein said conversion matrix connects like output formats to like input formats of said communication conversion tools;

generating at least one dynamic inter-lingua from said networking step;

inputting a communication format;

informing said network the communication format of said inputted communication format;

choosing an output communication format;

matching said input communication format to said output communication format via said at least one dynamically generated inter-lingua; and outputting the chosen communication format.

12. The method of claim 11 wherein said input format is converted into at least two output formats utilizing at least two dynamically generated inter-lingua such that dynamically generated inter-lingua common to the at least two output formats are utilized only once in the conversion process to the at least two output formats.

13. The method of claim 1 wherein said server maintains a comprehensive and evolving list of all possible tasks and options, published by all users connected to said server such that the transference of expertise, experience and best practice is made available to all users.

* * * * *